US009784582B2

United States Patent
Georgy et al.

(10) Patent No.: US 9,784,582 B2
(45) Date of Patent: Oct. 10, 2017

(54) METHOD AND APPARATUS FOR NAVIGATION WITH NONLINEAR MODELS

(75) Inventors: Jacques Georgy, Calgary (CA);
Aboelmagd Noureldin, Calgary (CA);
Zainab Syed, Calgary (CA); Chris Goodall, Calgary (CA)

(73) Assignee: InvenSense, Inc., San Jose, CA (US)

( * ) Notice: Subject to any disclaimer, the term of this patent is extended or adjusted under 35 U.S.C. 154(b) by 294 days.

(21) Appl. No.: 14/345,170

(22) PCT Filed: Feb. 15, 2012

(86) PCT No.: PCT/CA2012/000125
§ 371 (c)(1),
(2), (4) Date: Aug. 25, 2014

(87) PCT Pub. No.: WO2013/037034
PCT Pub. Date: Mar. 21, 2013

(65) Prior Publication Data
US 2014/0372026 A1    Dec. 18, 2014

Related U.S. Application Data

(60) Provisional application No. 61/534,745, filed on Sep. 14, 2011.

(51) Int. Cl.
*G01S 19/22* (2010.01)
*G01S 19/47* (2010.01)
(Continued)

(52) U.S. Cl.
CPC .......... *G01C 21/18* (2013.01); *G01C 21/165* (2013.01); *G01S 19/47* (2013.01); *G01S 19/49* (2013.01)

(58) Field of Classification Search
None
See application file for complete search history.

(56) References Cited

U.S. PATENT DOCUMENTS 6,731,237 B2   5/2004   Gustafon et al.
7,643,939 B2 * 1/2010   Zeng .................... G01C 21/165
                                              342/357.59
(Continued)

OTHER PUBLICATIONS

Jacques Georgy et al., "Modeling the Stochastic Drift of a MEMS-Based Gyroscope in Gyro/Odometer/GPS Integrated Navigation," IEEE Transactions of Intelligent Transportation Systems, vol. 11, No. 4, Dec. 2010.
(Continued)

*Primary Examiner* — Thomas G Black
*Assistant Examiner* — Demetra Smith-Stewart
(74) *Attorney, Agent, or Firm* — Bay Area Technology Law Group PC

(57) ABSTRACT

A navigation module and method for providing an INS/GNSS navigation solution for a device that can either be tethered or move freely within a moving platform is provided, comprising a receiver for receiving absolute navigational information from an external source (e.g., such as a satellite), an assembly of self-contained sensors capable of obtaining readings (e.g. such as relative or non-reference based navigational information) about the device, and further comprising at least one processor, coupled to receive the output information from the receiver and sensor assembly, and operative to integrate the output information to produce an enhanced navigation solution. The at least one processor may operate to provide a navigation solution by benefiting from nonlinear models and filters that do not suffer from approximation or linearization and which enhance the navigation solution of the device.

27 Claims, 3 Drawing Sheets

(51) Int. Cl.
  *G01C 21/00* (2006.01)
  *G01C 21/16* (2006.01)
  *G01C 21/18* (2006.01)
  *G01S 19/49* (2010.01)

(56) References Cited

U.S. PATENT DOCUMENTS

| | | | |
|---|---|---|---|
| 8,004,930 B2* | 8/2011 | Welker | G01V 1/3835 |
| | | | 367/16 |
| 8,825,435 B2* | 9/2014 | Smid | G01C 21/165 |
| | | | 702/141 |
| 2005/0251328 A1* | 11/2005 | Merwe | G01S 19/49 |
| | | | 701/472 |
| 2008/0059068 A1* | 3/2008 | Strelow | G05D 1/0246 |
| | | | 701/469 |
| 2008/0167814 A1* | 7/2008 | Samarasekera | G01C 21/165 |
| | | | 701/469 |
| 2009/0138200 A1* | 5/2009 | Hunter | G01C 21/265 |
| | | | 701/472 |
| 2010/0019963 A1* | 1/2010 | Gao | G01S 5/0027 |
| | | | 342/357.31 |
| 2010/0198511 A1 | 8/2010 | Hunter et al. | |
| 2010/0274444 A1* | 10/2010 | Williamson | B64D 39/00 |
| | | | 701/29.8 |
| 2011/0238308 A1* | 9/2011 | Miller | G01C 21/28 |
| | | | 701/472 |

OTHER PUBLICATIONS

Jacques Georgy et al., "Low-Cost Three-Dimensional Navigation Solution for RISS/GPS Integration Using Mixture Prticle Filter," IEEE Transactions on Vehicular Technology, vol. 59, No. 2, Feb. 2010.

Isaac Skog et al., "In-Car Positioning and Navigation Technologies—A Survey," IEEE Transactions of Intelligent Transportation Systems, vol. 10, No. 1, Mar. 2009.

* cited by examiner

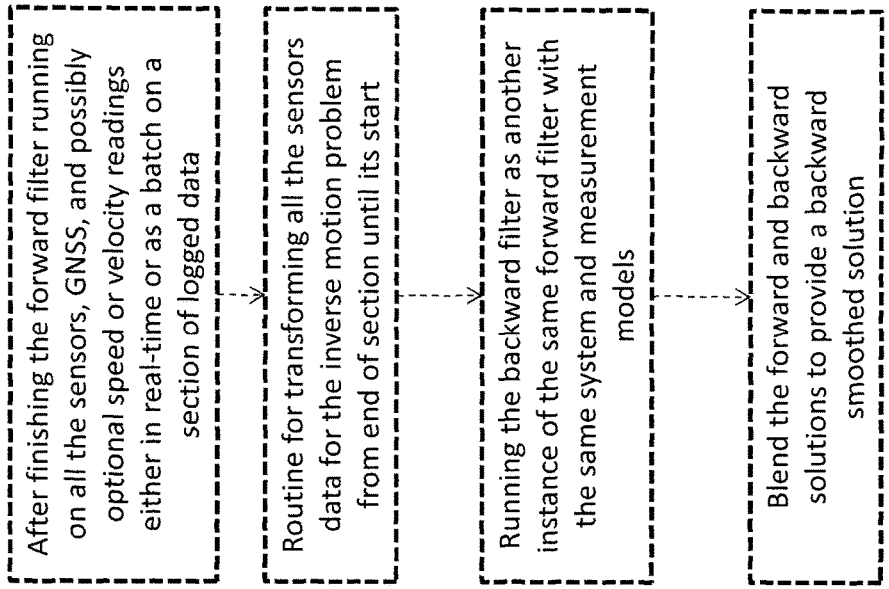

METHOD AND APPARATUS FOR NAVIGATION WITH NONLINEAR MODELS

TECHNICAL FIELD

Positioning and navigation systems for a device within a moving platform is provided, wherein mobility of the device may be constrained or unconstrained within the platform, and the systems may be adapted for use in environments with good, degraded, or denied satellite-based navigation signals.

BACKGROUND

The positioning of a moving platform, such as, wheel-based platforms/vehicles or individuals, is commonly achieved using known reference-based systems, such as the Global Navigation Satellite Systems (GNSS). The GNSS comprises a group of satellites that transmit encoded signals to receivers on the ground that, by means of trilateration techniques, can calculate their position using the travel time of the satellites' signals and information about the satellites' current location. Such positioning techniques are also commonly utilized to position a device (such as for example, among others, a mobile phone) within or on the moving platform, whether such device is tethered or non-tethered to the moving platform.

Currently, the most popular form of GNSS for obtaining absolute position measurements is the global positioning system (GPS), which is capable of providing accurate position and velocity information provided that there is sufficient satellite coverage. However, where the satellite signal becomes disrupted or blocked such as, for example, in urban settings, tunnels and other GNSS-degraded or GNSS-denied environments, a degradation or interruption or "gap" in the GPS positioning information can result.

In order to achieve more accurate, consistent and uninterrupted positioning information, GNSS information may be augmented with additional positioning information obtained from complementary positioning systems. Such systems may be self-contained and/or "non-reference based" systems within the device or the platform, and thus need not depend upon external sources of information that can become interrupted or blocked.

One such "non-reference based" or relative positioning system is the inertial navigation system (INS). Inertial sensors are self-contained sensors within the device or platform that use gyroscopes to measure rate of rotation/angle, and accelerometers to measure specific force (from which acceleration is obtained). Using initial estimates of position, velocity and orientation angles of the device or platform as a starting point, the INS readings can subsequently be integrated over time and used to determine the current position, velocity and orientation angles of the device and its relative misalignment within the platform. Typically, measurements are integrated once for gyroscopes to yield orientation angles and twice for accelerometers to yield position of the device or platform incorporating the orientation angles. Thus, the measurements of gyroscopes will undergo a triple integration operation during the process of yielding position. Inertial sensors alone, however, are unsuitable for accurate positioning because the required integration operations of data results in positioning solutions that drift with time, thereby leading to an unbounded accumulation of errors.

Further problems in providing accurate position or navigation information about a mobile device can arise where the device is capable of moving freely (e.g. without any constraints) or can move with some constraints within the moving platform. Inaccuracies can arise in such cases because the coordinate frame of the inertial sensors (accelerometers and gyroscopes) of the device is not aligned with the coordinate frame of the moving platform. The device and the moving platform can be misaligned with respect to one another, and such misalignment can change over time. For example, where the device moves freely without constraint, the misalignment of the device and the platform can change without constraint. Where the device is capable of constrained movement, the misalignment of the device and the platform can also change, wherein the change is subject to constraints. Where the mobile device is mounted within the platform, there may still be a misalignment where such mounting results in a misalignment between the coordinate frame of the device and the coordinate frame of the platform (although such misalignment would not change over time). It should be noted that a skilled person would know and understand that the misalignment between a mobile device and a moving platform does not equate or relate to misalignment that might occur where a navigation module for positioning a moving platform is positioned incorrectly within the moving platform, thereby resulting in a misalignment between the module and the moving platform Where available, another known complementary "non-reference based" system is a system for measuring speed/velocity information such as, for example, odometric information from a odometer within the platform. Odometric data can be extracted using sensors that measure the rotation of the wheel axes and/or steer axes of the platform (in case of wheeled platforms). Wheel rotation information can then be translated into linear displacement, thereby providing wheel and platform speeds, resulting in an inexpensive means of obtaining speed with relatively high sampling rates. Where initial position and orientation estimates are available, the odometric data are integrated thereto in the form of incremental motion information over time.

Given that the positioning techniques described above (whether INS/GNSS or INS/GNSS/Speed Information) may suffer loss of information or errors in data, common practice involves integrating the information/data obtained from the GNSS with that of the complementary system(s). For instance, to achieve a better positioning solution, INS and GPS data may be integrated because they have complementary characteristics. INS readings are accurate in the short-term, but their errors increase without bounds in the long-term due to inherent sensor errors. GNSS readings are not as accurate as INS in the short-term, but GNSS accuracy does not decrease with time, thereby providing long-term accuracy. Also, GNSS may suffer from outages due to signal blockage, multipath effects, interference or jamming, while INS is immune to these effects.

Although available, integrated INS/GNSS is not often used commercially for low cost applications because of the relatively high cost of navigational or tactical grades of inertial measurement units (IMUs) needed to obtain reliable independent positioning and navigation during GNSS outages. Low cost, small, lightweight and low power consumption Micro-Electro-Mechanical Systems (MEMS)-based inertial sensors may be used together with low cost GNSS receivers, but the performance of the navigation system will degrade very quickly in contrast to the higher grade IMUs in areas with little or no GNSS signal availability due to time-dependent accumulation of errors from the INS.

Speed information from the odometric readings, or from any other source, may be used to enhance the performance of the MEMS-based integrated INS/GNSS solution by providing velocity updates, however, current INS/Odometry/GNSS systems continue to be plagued with the unbounded growth of errors over time during GNSS outages.

One reason for the continued problems is that commercially available navigation systems using INS/GNSS integration or INS/Odometry/GNSS integration rely on the use of traditional Kalman Filter (KF)-based techniques for sensor fusion and state estimation. The KF is an estimation tool that provides a sequential recursive algorithm for the estimation of the state of a system when the system model is linear.

As is known, the KF estimates the system state at some time point and then obtains observation "updates" in the form of noisy measurements. As such, the equations for the KF fall into two groups:

Time update or "prediction" equations: used to project forward in time the current state and error covariance estimates to obtain an a priori estimate for the next step, or Measurement update or "correction" equations: used to incorporate a new measurement into the a priori estimate to obtain an improved posteriori estimate.

While the commonly used Linearalized KF (LKF) and Extended KF (EKF) can provide adequate solutions when higher grade IMUs are utilized by linearizing the originally nonlinear models, the KF generally suffers from a number of major drawbacks that become influential when using low cost MEMS-based inertial sensors, as outlined below.

The INS/GNSS integration problem at hand has nonlinear models. Thus, in order to utilize the linear KF estimation techniques in this type of problem, the nonlinear INS/GNSS model has to be linearized around a nominal trajectory. This linearization means that the original (nonlinear) problem be transformed into an approximated problem that may be solved optimally, rather than approximating the solution to the correct problem. The accuracy of the resulting solution can thus be reduced due to the impact of neglected nonlinear and higher order terms. These neglected higher order terms are more influential and cause error growth in the positioning solution, in degraded and GNSS-denied environments, particularly when low cost MEMS-based IMUs are used.

Further, the KF requires an accurate stochastic model of each of the inertial sensor errors, which can be difficult to obtain, particularly where low cost MEMS-based sensors are used because they suffer from complex stochastic error characteristics. The KF is restricted to use only linear low-order (low memory length) models for these sensors' stochastic errors such as, for example, random walk, Gauss-Markov models, first order Auto-Regressive models or second order Auto-Regressive models. The dependence of the KF on these inadequate models is also a drawback of the KF when using low cost MEMS-based inertial sensors.

As a result of these shortcomings, the KF can suffer from significant drift or divergence during long periods of GNSS signal outages, especially where low cost sensors are used. During these periods, the KF operates in prediction mode where errors in previous predictions, which are due to the stochastic drifts of the inertial sensor readings not well compensated by linear low memory length sensors' error models and inadequate linearized models, are propagated to the current estimate and summed with new errors to create an even larger error. This propagation of errors causes the solution to drift more with time, which in turn causes the linearization effect to worsen because of the drifting solution used as the nominal trajectory for linearization (in both LKF and EKF cases). Thus, the KF techniques suffer from divergence during outages due to approximations during the linearization process and system mis-modeling, which are influential when using MEMS-based sensors.

In addition, the traditional INS typically relies on a full inertial measurement unit (IMU) having three orthogonal accelerometers and three orthogonal gyroscopes. This full IMU setting has several sources of error, which, in the case of low-cost MEMS-based IMUs, will cause severe effects on the positioning performance. The residual uncompensated sensor errors, even after KF compensation, can cause position error composed of three additive quantities: (i) proportional to the cube of GNSS outage duration and the uncompensated horizontal gyroscope biases; (ii) proportional to the square of GNSS outage duration and the three accelerometers uncompensated biases, and (iii) proportional to the square of GNSS outage duration, the horizontal speed, and the vertical gyroscope uncompensated bias.

The foregoing drawbacks of the KF have resulted in increased investigation into alternative methods of INS/GNSS integration models, such as, for example, nonlinear artificial intelligence techniques. However, there is a need for enhancing the performance of low-end systems relying on low cost MEMS-based INS/GNSS sensors and for mitigating the effect of all sources of errors to provide a more adequate navigation solution for a device within a moving platform. This causes a need for a technique capable of using robust nonlinear models without linearization or approximation. Furthermore the needed technique should be able to cope with varying misalignment between the device and platform such as discussed earlier, especially in the case where the device moves freely without constraints within the moving platform.

SUMMARY

A navigation module and method for providing an integrated inertial sensors/absolute navigation information (such as, for example, GNSS) navigation solution for a device, are provided, wherein the device may be within a moving platform. The device may be mobile (e.g. capable of moving freely with or without constraints within the moving platform), or tethered to the moving platform.

For example, a navigation module and method for providing an integrated navigation solution for a device (such as for example, a mobile phone) within a moving platform (e.g. person, vehicle or other moving platform), is provided. It should be noted that the module may determine the navigation solution of the device as well as its relative misalignment with respect to a first moving platform (e.g. a person) and/or a subsequent second moving platform (e.g. where the person enters a vehicle and begins driving the vehicle, or vice versa.

The module comprises a receiver for receiving absolute navigational information about the device from an external source (e.g., such as a satellite), and producing an output of navigational information indicative thereof.

The module further comprises an assembly of self-contained sensors, including at least three accelerometers and at least three gyroscopes, capable of obtaining readings (e.g., such as relative or non-reference based navigational information) about the device and producing an output indicative thereof for generating navigational information, wherein said sensor readings may contain sensor errors. The sensor assembly may further comprise magnetometers, barometers, and any other self-contained sensing means that are capable of generating navigational information.

Finally, the module further comprises at least one processor. The processor may be programmed to utilize a filtering technique, such as a non-linear filtering technique (e.g., a Mixture Particle Filter), and the integration of the information from different sources may be done in either loosely or tightly coupled integration schemes. The filtering algorithm utilizes a system model and a measurement model. The system and measurement models utilized by the present navigation module may comprise nonlinear models, such as nonlinear error-state or total-state models, that do not suffer from approximation or linearization and can enhance the navigation solution of the device when using very low-cost low-end inertial sensors, even in circumstances of degraded or denied GNSS information.

In one embodiment, the at least one processor may be,
  coupled to receive and integrate the output information from the absolute receiver and the sensor assembly,
  operative to produce an enhanced navigation solution for the device, the navigation solution consisting of estimated position, velocity and attitude, and
  programmed to utilize a nonlinear error-state model to reduce errors in the estimated position, velocity and attitude,
  wherein the processor predicts the errors in the position, velocity and attitude and the sensor errors, and utilizes the nonlinear error-state model to relate:
    the errors in the estimated position and velocity, and
    the errors in the estimated attitude and the sensor errors,
  and to utilize the output information from the receiver to improve the estimation of the errors in the position and velocity, and whereby the relation of a) and b) indirectly improves the estimation of the errors in the attitude and the sensor errors.

In another embodiment, the at least one processor may be
  coupled to receive and integrate the information from the receiver and the readings from the sensor assembly, and
  operative to produce an enhanced navigation solution for the device, the navigation solution consisting of estimated position, velocity and attitude, and
  programmed to utilize a nonlinear total-state model and updates for at least the errors of the at least three accelerometers and the errors of the at least three gyroscopes, wherein the updates are derived from the output information from the receiver.

A first method for determining an integrated navigation solution for a device within a moving platform is further provided, comprising the steps of:
  a) receiving absolute navigational information about the device from an external source and producing output readings indicative thereof;
  b) obtaining readings relating to navigational information about the device, at a self-contained sensor assembly comprising at least three accelerometers and at least three gyroscopes, wherein said readings may contain sensor errors, and producing an output indicative thereof; and
  c) providing at least one processor:
    capable of processing and filtering the absolute navigational information and sensor readings,
    operative to produce an enhanced navigation solution for the device, wherein the navigation solution consists of estimated position, velocity and attitude, and
    programmed to utilize a nonlinear error-state model to reduce errors in the estimated position, velocity and attitude,
    predicts the errors in the estimated position, velocity and attitude and the sensor errors and utilize the nonlinear error-state model to relate:
      a) the estimated errors in the position and velocity, and
      b) the estimated errors in the attitude errors and the sensor errors,
    wherein the output information from the receiver is utilized to improve the estimation of the errors in the position and velocity, and whereby the relation of a) and b) indirectly improves the estimation of the error in the attitude and sensor errors.

A second method for determining an integrated navigation solution for a device within a moving platform is further provided, comprising the steps of:
  a) receiving absolute navigational information about the device from an external source and producing output readings indicative thereof,
  b) obtaining readings relating to navigational information about the device, at a self-contained sensor assembly comprising at least three accelerometers and at least three gyroscopes, wherein said readings may contain sensor errors, and producing an output indicative thereof, and
  c) providing at least one processor:
    capable of processing and filtering the absolute navigational information and sensor readings,
    operative to produce an enhanced navigation solution for the device, the navigation solution consisting of estimated position, velocity and attitude, and
    programmed to utilize a nonlinear total-state model and updates for at least the errors of the at least three accelerometers and the errors of the at least three gyroscopes, wherein the updates are derived from the absolute navigation information.

Where the navigation module comprises a nonlinear state estimation or filtering technique, such as, for example, Mixture Particle Filter for performing inertial sensors/absolute navigation information (such as for example, GNSS) integration, the module may be optionally enhanced to provide advanced modeling of inertial sensors errors together with the derivation of measurement updates for such errors.

The module may be optionally enhanced to calculate misalignment between the coordinate frame of the sensor assembly of the module (i.e. the device, such as for example a cell phone) and the coordinate frame of the moving platform (such as for example, person or vehicle). If the device is non-tethered, the misalignment module will run regularly to detect and estimate any changing misalignment that can vary with time.

The module may be optionally programmed to detect and assess the quality of GNSS information received by the module and, where degraded, automatically discard or discount the information.

The module may be optionally enhanced to automatically switch between a loosely coupled integration scheme and a tightly coupled integration scheme.

The module may be optionally enhanced to automatically assess measurements from each external source, or GNSS satellite visible to the module in case of a tightly coupled integration scheme, and detect degraded measurements.

The module may be optionally enhanced to perform a mode detection routine to detect the mode of conveyance, such as for example, walking mode or driving mode.

The module may be further optionally enhanced to perform pitch and roll measurement updates from accelerometer-derived pitch and roll in a manner depending on the detected mode of conveyance.

The module may be optionally enhanced to perform pedestrian dead-reckoning (PDR) if walking mode is detected, and use the positioning results of PDR as measurements updates for the main navigation solution.

The module may be optionally enhanced to perform zero speed detection or static period detection, and may use zero velocity updates as measurement updates.

The module may be optionally enhanced to benefit from motion constraints on the moving platform, such as adaptive non-holonomic constraints.

The module may optionally have the capability to obtain speed information about the platform using a wired or wireless connection to the module.

The module may be optionally enhanced to perform a backward or post-mission process to calculate a solution subsequent to the forward navigation solution, and to blend the two solutions to provide an enhanced backward smoothed solution.

The module may be optionally enhanced to perform one or more of any of the foregoing options.

DESCRIPTION OF THE DRAWINGS

FIG. 2B: A flow chart diagram demonstrating the optional post-mission embodiment of the present navigation module defined herein.

DESCRIPTION OF THE EMBODIMENT

An improved navigation module and method for providing an integrated inertial sensors/absolute navigation information (such as, for example, GNSS) navigation solution for a device, where the device is either tethered to a moving platform or non-tethered and can move freely without constraints (for example, and without limitation, a mobile phone) within another moving platform (for example, and without limitation, a person, vehicle or any other platform) are presented. More specifically, the present navigation module and method for providing a navigation solution may be used as a means of overcoming inadequacies of: (i) traditional full IMU/GNSS integration; (ii) commonly used linear state estimation techniques where low cost inertial sensors are used, particularly in circumstances where positional information from the GNSS is degraded or denied, such as in urban canyons, tunnels and other such environments. Despite such degradation or loss of GNSS information, the present navigation module and method of producing an enhanced navigation solution may provide uninterrupted navigational information about the device by integrating the inertial sensors/absolute navigation information, utilizing state estimation or filtering techniques relying on nonlinear models without approximation or linearization. The enhancements caused by the reduction in the errors in the estimated navigation solution may be achieved either by: (i) using nonlinear error-state models without approximation to provide accurate prediction of the errors in the navigation states as well as the sensor's errors benefiting from the relation implied by the error model between the position and velocity errors and the tilt angle's errors as well as the sensor's errors, so that the models can indirectly take advantage from the absolute measurement update that directly benefits the position and velocity errors; or (ii) using nonlinear total-state models but with a mandatory update for at least the errors of the at least three accelerometers and the errors of the at least three gyroscopes, wherein these updates are derived from the absolute measurement update when suitable.

Navigation Module

Figure 1:
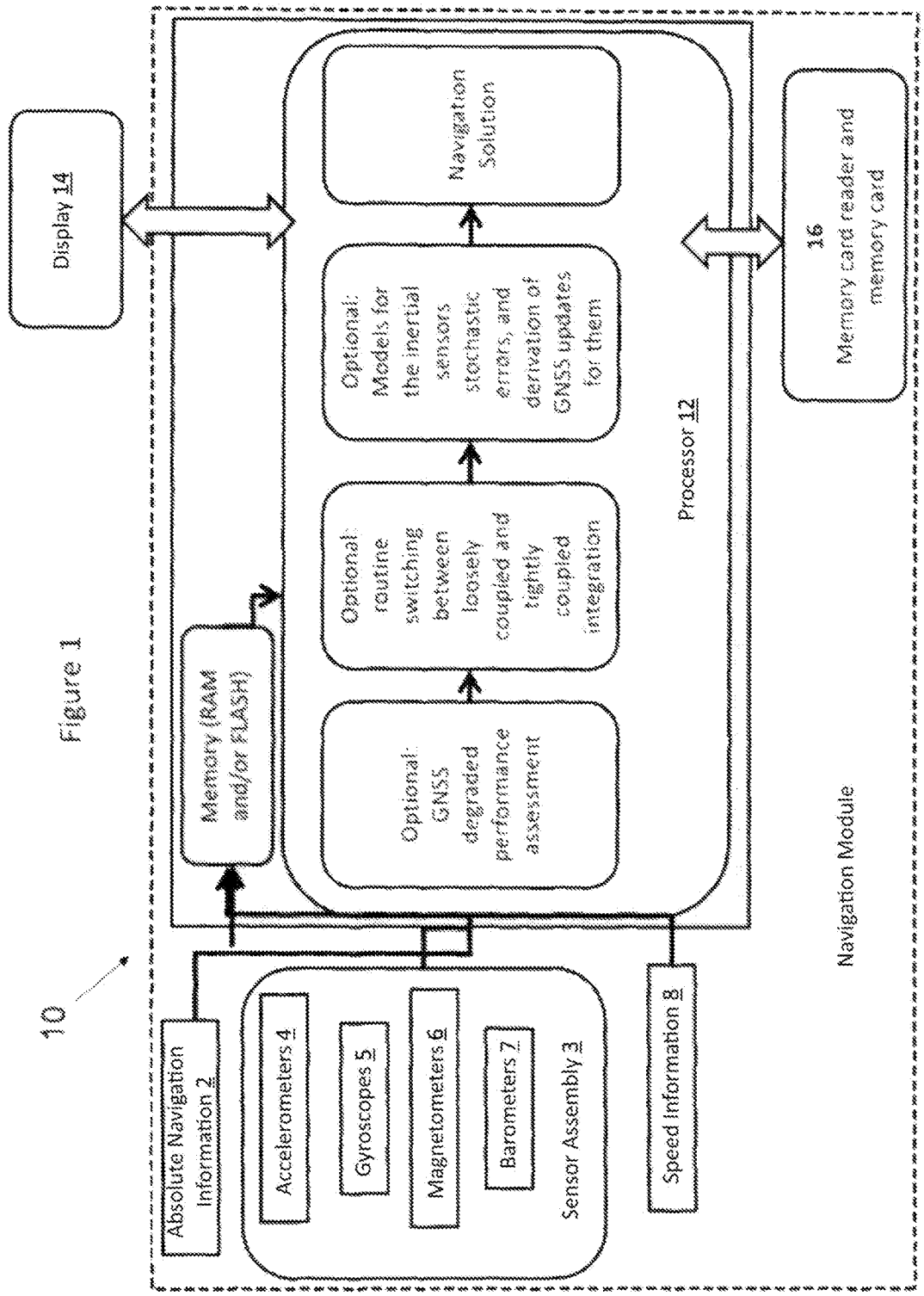
FIG. 1: A diagram demonstrating the present navigation module as defined herein.

The present navigation module 10 (FIG. 1) may comprise means for receiving "absolute" or "reference-based" navigation information 2 about a device or a moving platform from external sources, such as satellites, whereby the receiving means is capable of producing an output indicative of the navigation information. For example, the receiver means may be a GNSS receiver capable of receiving navigational information from GNSS satellites and converting the information into position, and velocity information about the device or moving platform. The GNSS receiver may also provide navigation information in the form of raw measurements such as pseudoranges and Doppler shifts.

In one embodiment, the GNSS receiver may be a Global Positioning System (GPS) receiver, such as a uBlox LEA-5T receiver module. It is to be understood that any receiver means may be used including, for example and without limitation, a SiRFstar IV GPS receiver, a Trimble Copernicus II GPS receiver.

The present navigation module may also comprise self-contained sensor means 3, in the form of a sensor assembly, capable of obtaining or generating "relative" or "non-reference based" readings relating to navigational information about the device, and producing an output indicative thereof. For example, the sensor assembly may comprise at least three accelerometers 4, for measuring accelerations, and at least three gyroscopes 5, for measuring turning rates of the device. Optionally, the sensor assembly may also comprise other self-contained sensors such as, without limitation, magnetometers 6, for measuring magnetic field strength for establishing heading, barometers 7, for measuring pressure to establish altitude. Furthermore, the sensor assembly might contain any other sources of "relative" navigational information.

In one embodiment, the sensor assembly may comprise three orthogonal Micro-Electro-Mechanical Systems (MEMS) accelerometers, and three MEMS gyroscopes, such as, for example, accelerometer triad from Analog Devices Inc. (ADI) Model No. ADIS16240 or ADXL312, and such as a gyroscope triad from Invensense Model No. ITG-3200, and may or may not include orthogonal magnetometers available in the same package as accelerometer or in another package such as, for example model HMC5883L from Honeywell, and barometers such as, for example, model MS5803 from Measurement Specialties.

Figure 2A:
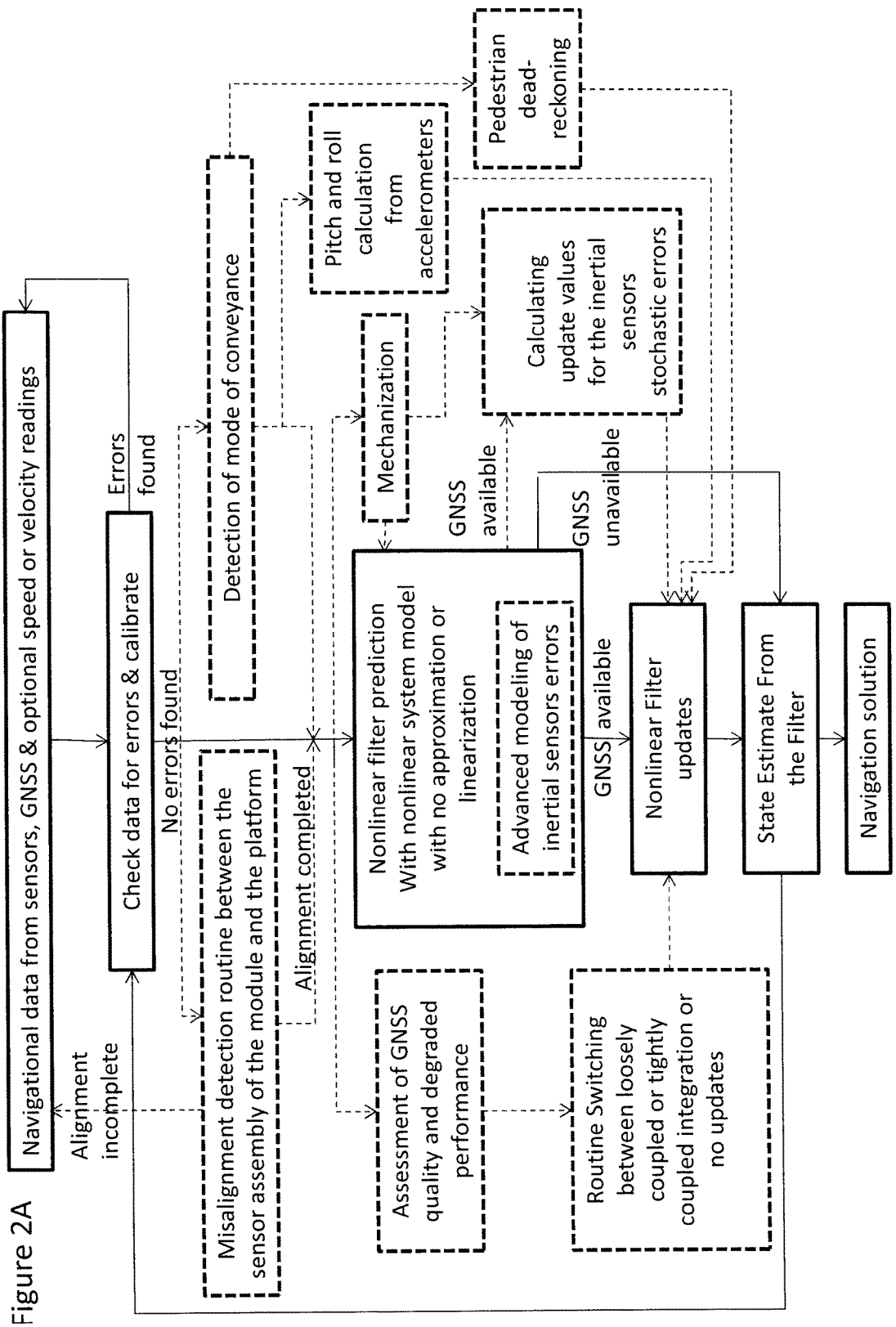
FIG. 2A: A flow chart diagram demonstrating the present navigation module of FIG. 1(dashed lines and arrows depict optional processing).

Finally, the present navigation module 10 may comprise at least one processor 12 or microcontroller coupled to the module for receiving and processing the foregoing absolute navigation 2 and sensor assembly 3, of integrating said information, and of determining a navigation solution output relying on state estimation or filtering technique that uses nonlinear models without approximation or linearization (see FIG. 2A).

The present navigation module may comprise optional means for obtaining speed and/or velocity information 8 of the device or moving platform, wherein said means are capable of further generating an output or "reading" indicative thereof. While it is understood that such means can be either speed and/or velocity information, said means shall only be referenced herein as "speed means". In one embodiment, the means of speed readings might be related to the moving platform and transferred to the mobile device therewithin (whether the mobile device is tethered or freely moving within the platform). In another embodiment, the means of speed readings might be related to the mobile device (such as when the device is non-tethered and freely moving and has a mean for obtaining its speed reading). In one embodiment, means for generating speed information may comprise an odometer, a wheel-encoder, shaft or motor encoder of any wheel-based or track-based platform within which the portable device is positioned, or to any other source of speed and/or velocity readings (for example, those derived from Doppler shifts of any type of transceiver) that can be attached either to the device or to the moving platform. It should be understood that when the means for generating speed/velocity information is about the moving platform, it may be connected to the navigation module (in the portable device) via wired or wireless connection.

The navigation solution determined by the present navigation module 10 may be communicated to a display or user interface 14. It is contemplated that the display 14 be part of the module 10, or separate therefrom (e.g., connected wired or wirelessly thereto). The navigation solution determined in real-time by the present navigation module 10 may further be stored or saved to a memory device/card 16 operatively connected to the module 10 or on any other storage available on the device.

In one embodiment, a single processor such as, for example, ARM Cortex R4 or an ARM Cortex A8 may be used to integrate and process the signal information. In another embodiment, the signal information may initially be captured and synchronized by a first processor such as, for example, an ST Micro (STM32) family or other known basic microcontroller, before being subsequently transferred to a second processor such as, for example, ARM Cortex R4 or ARM Cortex A8.

The processor may be programmed to use known state estimation or filtering techniques to provide the navigation solution. In one embodiment, the state estimation technique may be a non-linear technique. In a preferred embodiment, the processor may be programmed to use the Particle Filter (PF) or the Mixture PF.

It is an object of the present navigation module 10 to produce three dimensional (3D) position, velocity and orientation information for any device whether tethered to a moving platform or portable device that can move freely without any constraints within a moving platform.

It is known that there are three main types of INS/GNSS integration that have been proposed to attain maximum advantage depending upon the type of use and choice of simplicity versus robustness. This leads to three main integration architectures:
1. Loosely coupled
2. Tightly coupled
3. Ultra-tightly coupled (or deeply coupled).

The first type of integration, which is called loosely coupled, uses an estimation technique to integrate inertial sensors data with the position and velocity output of a GNSS receiver. The distinguishing feature of this configuration is a separate filter for the GNSS. This integration is an example of cascaded integration because of the two filters (GNSS filter and integration filter) used in sequence.

The second type, which is called tightly coupled, uses an estimation technique to integrate inertial sensors readings with raw GNSS data (i.e. pseudoranges that can be generated from code or carrier phase or a combination of both, and pseudorange rates that can be calculated from Doppler shifts) to get the vehicle position, velocity, and orientation. In this solution, there is no separate filter for GNSS, but there is a single common master filter that performs the integration.

For the loosely coupled integration scheme, at least four satellites are needed to provide acceptable GNSS position and velocity input to the integration technique. The advantage of the tightly coupled approach is that less than four satellites can be used as this integration can provide a GNSS update even if fewer than four satellites are visible, which is typical of a real life trajectory in urban environments as well as thick forest canopies and steep hills. Another advantage of tightly coupled integration is that satellites with poor GNSS measurements can be detected and rejected from being used in the integrated solution.

For the third type of integration, which is ultra-tight integration, there are two major differences between this architecture and those discussed above. Firstly, there is a basic difference in the architecture of the GNSS receiver compared to those used in loose and tight integration. Secondly, the information from INS is used as an integral part of the GNSS receiver, thus, INS and GNSS are no longer independent navigators, and the GNSS receiver itself accepts feedback. It should be understood that the present navigation solution may be utilized in any of the foregoing types of integration.

It is to be noted that the state estimation or filtering techniques used for inertial sensors/GNSS integration may work in a total-state approach or in an error state approach. It would be known to a person skilled in the art that not all the state estimation or filtering techniques can work in both approaches. In the total-state approach, the state estimation or filtering technique is estimating the state of the navigation module itself (such as position, velocity, and attitude of the module), the system model or the state transition model used is the motion model itself, which in case of inertial navigation is a nonlinear model, this model is a total-state model since the estimated state is the state of the navigation module itself. In the error-state approach, the motion model is used externally in what is called inertial mechanization, which is a nonlinear model as mentioned earlier, the output of this model is the navigation states of the module, such as position, velocity, and attitude. The state estimation or filtering technique estimates the errors in the navigation states obtained by the mechanization, so the estimated state vector by this state estimation or filtering technique is for the error states, and the system model is an error-state system model which transition the previous error-state to the current error-state. The mechanization output is corrected for these estimated errors to provide the corrected navigation states, such as corrected position, velocity and attitude. The estimated error-state is about a nominal value which is the mechanization output, the mechanization can operate either unaided in an open loop mode, or can receive feedback from the corrected states, this case is called closed-loop mode. The error-state system model might be a linearized model (like the models used with KF-based solutions), or might be a nonlinear model.

In one embodiment, the present navigation module 10 may operate to determine a three dimensional (3D) navigation solution by calculating 3D position, velocity and attitude of the device, whether tethered to the moving platform or freely-moving within the moving platform, wherein the navigation module comprises absolute navigational information from a GNSS receiver, self-contained sensors which consist of three accelerometers and three gyroscopes, and a processor programmed to integrate the information using Mixture PF in either a loosely coupled, tightly coupled, or hybrid loosely/tightly coupled architecture, having a system and measurement model, wherein the system model is a nonlinear error-state system model without linearization or approximation that are used with the traditional KF-based solutions and their linearized error-state system models. The filter may optionally be programmed to comprise advanced modeling of inertial sensors stochastic drift. If the filter has the latter, it may be optionally further programmed to use derived updates for such drift from GNSS, where appropriate. The filter may optionally be programmed to automatically detect and assess the quality of GNSS information, and further provide a means of discarding or discounting degraded information. The filter may optionally be programmed to automatically select between a loosely coupled and a tightly coupled integration scheme. Moreover, where tightly coupled architecture is selected, the GNSS information from each available satellite may be assessed independently and either discarded (where degraded) or utilized as a measurement update. This embodiment is described in Example 1.

In another embodiment, the present navigation module 10 may operate to determine a three dimensional (3D) navigation solution by calculating 3D position, velocity and attitude of the device, whether tethered to the moving platform or freely-moving within the moving platform, wherein the navigation module comprises absolute navigational information from a GNSS receiver, self-contained sensors which consist of three accelerometers and three gyroscopes, and a processor programmed to integrate the information using Mixture PF in either a loosely coupled, tightly coupled, or hybrid loosely/tightly coupled architecture, having a system and measurement model, wherein the system model is a nonlinear total-state system model without linearization or approximation that are used with the traditional KF-based solutions and their linearized error-state system models. The filter is programmed to comprise advanced modeling of inertial sensors stochastic errors together with derived updates for such errors from GNSS, where appropriate. The filter may optionally be programmed to automatically detect and assess the quality of GNSS information, and further provide a means of discarding or discounting degraded information. The filter may optionally be programmed to automatically select between a loosely coupled and a tightly coupled integration scheme. Moreover, where tightly coupled architecture is selected, the GNSS information from each available satellite may be assessed independently and either discarded (where degraded) or utilized as a measurement update. This embodiment is described in Example 2.

In another embodiment, the present navigation module may operate to determine a 3D navigation solution by calculating position, velocity and attitude of a moving platform, wherein the module is operating as in Example 1 or as in Example 2, while a routine for detecting the mode in which the system is operating whether "walking mode" (i.e. the moving platform is a person) or "driving mode" (the moving platform is vehicle). If in driving mode, the module may use the speed of the platform either calculated from GNSS velocity readings or provided by another sensor or system connected to the navigation module via a wired or wireless connection for decoupling the actual motion from the accelerometers readings to obtain better estimates of pitch and roll, because after the decoupling the remaining accelerometers will be measuring mainly components of gravity. For this purpose the accelerometer readings have to be downsampled (for example by averaging) to be at the rate where the other source of speed or velocity readings is. If in walking mode, the accelerometer's readings are averaged either by a fixed time average (to provide lower rate downsampled accelerometers readings) or a moving average. The averaging operations decrease the noise and suppress the dynamics, so that the averaged accelerometer's readings will be measuring mainly components of gravity, and they are used to estimate pitch and roll. These pitch and roll estimates whether in driving or walking modes may be used as extra measurement updates during GNSS availability and/or during GNSS outages. This embodiment is described in Example 3. If walking mode is detected, pedestrian dead reckoning (PDR) may be used and its solution may be integrated with the main navigation solution by either: using it as an update, using least square to combine the two solutions, or using any other integration idea to combine them.

In another embodiment, the present navigation module may optionally be programmed to operate a misalignment procedure, which calculates the relative orientation between the frame of the sensor assembly (i.e. device frame) and the frame of the moving platform within which the device is either tethered or moving freely. The details of the misalignment procedure are described in Example 4.

In another embodiment, the present navigation module may optionally be programmed to detect static periods, known as zero velocity or "stopping" periods, either from the inertial sensors readings, or from the optional speed or velocity readings if they are available, or from a combination of both if the speed or velocity readings are available. The detected stopping periods may be used to perform explicit updates known as zero velocity updates or zupt updates. The detected stopping periods may be also used to automatically recalculate the biases of the inertial sensors. When the zero speed detection algorithm uses inertial sensors readings, sensor data for at least 1 s is required to detect the zero speed periods either in frequency or time domain. The zero speed detection thresholds may be calibrated by experiments or automatically selected during good GNSS signal availability. The detection can be performed on both accelerometer and gyroscope signals or on the accelerometer signal only or gyroscope signal only. By way of example, standard deviation of the readings when compared with the zero speed thresholds, provides robust stationary periods indication in time domain. The thresholds may differ according to the mode of operation whether walking mode or driving mode.

In another embodiment, the present navigation module may optionally be programmed to use, when appropriate, some constraints on the motion of the moving platform such as adaptive Non-holonomic constraints, for example, those that keep a platform from moving sideways or vertically jumping off the ground. The usage of these constraints differs according to the mode of operation whether walking mode or driving mode. These constraints can be used as an extra update, in such case the standard deviation for these updates will differ according to the mode of operation.

In another embodiment, the present navigation module may optionally be programmed to determine a low-cost backward smoothed positioning solution, such a positioning solution might be used, for example, by mapping systems (see Example 5). In one embodiment, the foregoing navigation module with nonlinear filtering technique and nonlinear models, may be further enhanced by exploiting the fact that mapping problem accepts post-processing and that nonlinear backward smoothing may be achieved (see FIG. 2B). The post-processing might happen (i) after the mission (i.e. after finishing data logging and the forward navigation solution) whether on-site or any time afterward, or (ii) within the mission by having blocks of logged receiver and sensor readings as well as forward filtering results, and either run the backward smoothing (a) in a background routine or on another processor or core, or (b) during intentional stopping periods aimed especially for the purpose of running backward smoothing.

It is contemplated that the present navigation module can use coning and sculling to enhance the navigation solution based on the inertial sensors. In the embodiment that uses a separate mechanization and nonlinear error-state system model, the coning and sculling will be used in the mechanization routine which implements the motion equations. In the embodiment that uses a nonlinear total-state system model, the coning and sculling will be used within the nonlinear system model itself, this model comprises the motion equations together with process noise, the coning and sculling will be added to the motion equations.

It is contemplated that the optional embodiments presented above can be used with other sensors combinations (i.e. different system and measurement models) not just those used in the present navigation module and method. The optional embodiments are the advanced modeling of inertial sensors errors, the derivation of possible measurements updates for them from GNSS when appropriate, the automatic assessment of GNSS solution quality and detecting degraded performance, the automatic switching between loosely and tightly coupled integration schemes, the assessment of each visible GNSS satellite when in tightly coupled mode, the mode detection module, the pitch and roll updates module, the misalignment detection module, the automatic zupt detection with its possible updates and inertial sensors bias recalculations, the non-holonomic updates module, and finally the backward smoothing technique.

It is further contemplated that the present navigation module can also be used together with modeling (whether with linear or nonlinear, short memory length or long memory length) and/or automatic calibration for the other errors of inertial sensors (not just the stochastic drift). It is also contemplated that modeling (whether with linear or nonlinear, short memory length or long memory length) and/or calibration for the other sensors in the sensor assembly (such as, for example the barometer and magnetometer) can be used. It is also contemplated that modeling (whether with linear or nonlinear, short memory length or long memory length) and/or calibration for the errors in the optional speed or velocity readings can be used.

It is further contemplated that the other sensors in the sensor assembly such as, for example, the barometer (e.g. with the altitude derived from it) and magnetometer (e.g. with the heading derived from it) can be used in one or more of different ways such as: (i) as control input to the system model of the filter (whether with linear or nonlinear filtering techniques); (ii) as measurement update to the filter either by augmenting the measurement model or by having an extra update step; (iii) in the routine for automatic GNSS degradation checking; (iv) in the misalignment estimation procedure that calculates the orientation of the housing or frame of the sensor assembly within the frame of the moving platform.

It is further contemplated that the optional speed readings about the platform (that are sent wired or wirelessly to the module) can be used by the module to: (i) help obtaining misalignment between the platform and module if this misalignment was not already resolved; (ii) help calculating better pitch and roll of the module, if the misalignment is already resolved, the better values for pitch and roll can be in turn used as better measurement updates for pitch and roll; (iii) obtain velocity updates, which will be especially helpful when the absolute navigational information are inadequate or interrupted.

It is further contemplated that the hybrid loosely/tightly coupled integration scheme option in the present navigation module electing either way can be replaced by other architectures that benefits from the advantages of both loosely and tightly coupled integration. Such other architecture might be doing the raw GNSS measurement updates from one side (tightly coupled updates) and the loosely coupled GNSS-derived heading update (if misalignment was resolved or there is no misalignment in a certain application) and inertial sensors errors updates from the other side: (i) sequentially in two consecutive update steps, or (ii) in a combined measurement model with corresponding measurement covariances.

It is further contemplated that the misalignment calculation option between the frame of the sensor assembly (the coordinate frame of the device) and the coordinate frame of the moving platform can be either augmented or replaced by other techniques for calculating the misalignment between the two frames. Some misalignment calculation techniques, which can be used, are able to resolve all tilt and heading misalignment of a free moving unit containing the sensors within the moving platform.

It is further contemplated that the present navigation module in the optional case of running a backward smoothed solution may use any other backward smoothing technique that can be used with nonlinear filtering, not just the one used in Example 5.

It is further contemplated that the present navigation module may be further programmed to run, in the background, a routine to simulate artificial outages in the absolute navigational information and estimate the parameters of another instance of the state estimation technique used for the solution in the present navigation module to optimize the accuracy and the consistency of the solution. The accuracy and consistency is assessed comparing the temporary background solution during the simulated outages to a reference solution. The reference solution may be one of the following examples: the absolute navigational information (e.g. GNSS), the forward integrated navigation solution in the present navigation module integrating the available sensors with the absolute navigational information (e.g. GNSS) and possibly with the optional speed or velocity readings, a backward smoothed integrated navigation solution (such as those presented in Example 5) integrating the available sensors with the absolute navigational information (e.g. GNSS) and possibly with the optional speed or velocity readings. The background processing can be running either on the same processor as the forward solution processing or on another processor that can communicate with the first processor and can read the saved data from a shared location. The outcome of the background processing solution can benefit the real-time navigation solution in its future run (i.e. real-time run after the background routine has finished running), for example, by having improved values for the parameters of the forward state estimation technique used for navigation in the present module.

It is further contemplated that the present navigation module can be further integrated with maps (such as steep maps, indoor maps or models, or any other environment map or model in cases of applications that have such maps or models available), and a map matching or model matching routine. Map matching or model matching can further enhance the navigation solution during the absolute navigation information (such as GNSS) degradation or interruption. In the case of model matching, a sensor or a group of sensors that acquire information about the environment can be used such as, for example, Laser range finders, cameras and vision systems, or sonar systems. These new systems can be used either as an extra help to enhance the accuracy of the navigation solution during the absolute navigation information problems (degradation or absence), or they can totally replace the absolute navigation information in some applications.

It is further contemplated that the present navigation module, when working either in a tightly coupled scheme or the hybrid loosely/tightly coupled option, need not be bound to utilize pseudorange measurements (which are calculated from the code not the carrier phase, thus they are called code-based pseudoranges) and the Doppler measurements (used to get the pseudorange rates). The carrier phase measurement of the GNSS receiver can be used as well, for example: (i) as an alternate way to calculate ranges instead of the code-based pseudoranges, or (ii) to enhance the range calculation by incorporating information from both code-based pseudorange and carrier-phase measurements, such enhancements is the carrier-smoothed pseudorange.

It is further contemplated that the present navigation module can also be used in a system that implements an ultra-tight integration scheme between GNSS receiver and these other sensors and speed readings.

It is further contemplated that the present navigation module and method described herein can be used with various wireless communication systems that can be used for positioning and navigation either as an additional aid (that will be more beneficial when GNSS is unavailable) or as a substitute for the GNSS information (e.g. for applications where GNSS is not applicable). Examples of these wireless communication systems used for positioning are, such as, those provided by cellular phone towers, radio signals, television signal towers, WiFi, or Wimax. For example, for cellular phone based applications, an absolute coordinate from cell phone towers and the ranges between the indoor user and the towers may utilize the methodology described herein, whereby the range might be estimated by different methods among which calculating the time of arrival or the time difference of arrival of the closest cell phone positioning coordinates. A method known as Enhanced Observed Time Difference (E-OTD) can be used to get the known coordinates and range. The standard deviation for the range measurements may depend upon the type of oscillator used in the cell phone, and cell tower timing equipment and the transmission losses. Another example, for WiFi positioning applications different methods might be used with different accuracies, such as for example, time of arrival, time difference of arrival, angles of arrival, received signal strength, and fingerprinting techniques, among others. The wireless communication system used for positioning may use different techniques for modeling the errors in the ranging, angles, or signal strength from wireless signals, and may use different multipath mitigation techniques. All the above mentioned ideas, among others, are also applicable in a similar manner for other wireless positioning techniques based on wireless communications systems.

It is further contemplated that the present navigation module and method described herein can be used with aiding information from other moving devices. This aiding information can be used as additional aid (that will be more beneficial when GNSS is unavailable) or as a substitute for the GNSS information (e.g. for applications where GNSS is not applicable). One example of aiding information from other devices may be capable of relying on wireless communication systems between different devices. The underlying idea is that the devices that have better positioning or navigation solution (for example having GNSS with good availability and accuracy) can help the devices with degraded or unavailable GNSS to get an improved positioning or navigation solution. This help relies on the well-known position of the aiding devices and the wireless communication system for positioning the device(s) with degraded or unavailable GNSS. This contemplated variant refers to the one or both circumstance(s) where: (i) the device(s) with degraded or unavailable GNSS utilize the module and method described herein and get aiding from other devices and communication system, (ii) the aiding device with GNSS available and thus a good navigation solution utilize the module and method described herein. The wireless communication system used for positioning may rely on different communication protocols, and it may rely on different methods, such as for example, time of arrival, time difference of arrival, angles of arrival, and received signal strength, among others. The wireless communication system used for positioning may use different techniques for modeling the errors in the ranging and/or angles from wireless signals, and may use different multipath mitigation techniques.

It is contemplated that the present navigation module can use various types of inertial sensors, other than MEMS based sensors described herein by way of example.

Without any limitation to the foregoing, the present navigation module and method of determining a navigation solution are further described by way of the following examples.

EXAMPLES

Example 1

Mixture Particle Filter with Non-Linear Error-State Models

In the present example, the navigation module is utilized to determine a three dimensional (3D) navigation solution by calculating 3D position, velocity and attitude of a moving platform. Specifically, the module comprises absolute navigational information from a GNSS receiver, relative navigational information from MEMS-based inertial sensors consisting of three orthogonal accelerometers and three orthogonal gyroscopes, and a processor programmed to integrate the information using a nonlinear state estimation technique, such as for example, Mixture PF having the system and measurement models defined herein below. Thus, in this example, the present navigation module targets a 3D navigation solution employing MEMS-based inertial sensors/GPS integration using Mixture PF.

In this example the absolute navigational information from a GNSS receiver and the self-contained sensors which consist of three accelerometers and three gyroscopes are integrated using Mixture PF in either a loosely coupled, tightly coupled, or hybrid loosely/tightly coupled architecture, having a system and measurement model, wherein the system model is a nonlinear error-state system model without linearization or approximation that are used with the traditional KF-based solutions and their linearized error-state system models. The filter may optionally be programmed to comprise advanced modeling of inertial sensors stochastic drift. If the filter has the last option, it may optionally be further programmed to use derived updates for such drift from GNSS, where appropriate. The filter may optionally be programmed to automatically detect and assess the quality of GNSS information, and further provide a means of discarding or discounting degraded information. The filter may optionally be programmed to automatically select between a loosely coupled and a tightly coupled integration scheme. Moreover, where tightly coupled architecture is selected, the GNSS information from each available satellite may be assessed independently and either discarded (where degraded) or utilized as a measurement update.

Navigation Solution

The state of the device whether tethered or non-tethered to the moving platform is $x_k=[\phi_k,\lambda_k,h_k,v_k^E,v_k^N,v_k^U,p_k,r_k,A_k]^T$, where $\phi_k$ is the latitude of the vehicle, $\lambda_k$ is the longitude, $h_k$ is the altitude, $v_k^E$ is the velocity along East direction, $v_k^N$ is the velocity along North direction, $v_k^U$ is the velocity along Up vertical direction, $p_k$ is the pitch angle, $r_k$ is the roll angle, and $A_k$ is the azimuth angle.

Since this is an error-state approach, the motion model is used externally in what is called inertial mechanization, which is a nonlinear model as mentioned earlier, the output of this model is the navigation states of the module, such as position, velocity, and attitude. The state estimation or filtering technique estimates the errors in the navigation states obtained by the mechanization, so the estimated state vector by this state estimation or filtering technique is for the error states, and the system model is an error-state system model which transition the previous error-state to the current error-state. The mechanization output is corrected for these estimated errors to provide the corrected navigation states, such as corrected position, velocity and attitude. The estimated error-state is about a nominal value which is the mechanization output, the mechanization can operate either unaided in an open loop mode, or can receive feedback from the corrected states, this case is called closed-loop mode. The error-state system model commonly used is a linearized model (to be used with KF-based solutions), but the work in this example uses a nonlinear error-state model to avoid the linearization and approximation.

The motion model used in the mechanization is given by $$x_k=f_{mech}(x_{k-1},u_{k-1})$$

where $u_{k-1}$ is the control input which is the inertial sensors readings that correspond to transforming the state from time epoch k−1 to time epoch k, this will be the convention used in this explanation for the sensor readings just used for nomenclature purposes.

The nonlinear error-state system model (also called state transition model) is given by $$\delta x_k=f(\delta x_{k-1},u_{k-1},w_{k-1})$$

where $w_k$ is the process noise which is independent of the past and present states and accounts for the uncertainty in the platform motion and the control inputs. The measurement model is $$\delta z_k=h(\delta x_k,v_k)$$

where $v_k$ is the measurement noise which is independent of the past and current states and the process noise and accounts for uncertainty in GNSS readings.

In order to discuss some advantages of Mixture PF, which is the filtering technique used in this example, some aspects of the basic PF called Sampling/Importance Resampling (SIR) PF are first discussed. In the prediction phase, the SIR PF samples from the system model, which does not depend on the last observation. In MEMS-based INS/GNSS integration, the sampling based on the system model, which depends on inertial sensor readings as control inputs, makes the SIR PF suffers from poor performance because with more drift this sampling operation will not produce enough samples in regions where the true probability density function (PDF) of the state is large, especially in the case of MEMS-based sensors. Because of the limitation of the SIR PF, it has to use a very large number of samples to assure good coverage of the state space, thus making it computationally expensive. Mixture PF is one of the variants of PF that aim to overcome this limitation of SIR and to use much less number of samples while not sacrificing the performance. The much lower number of samples makes Mixture PF applicable in real time.

As described above, in the SIR PF the samples are predicted from the system model, and then the most recent observation is used to adjust the importance weights of this prediction. The Mixture PF adds to the samples predicted from the system model some samples predicted from the most recent observation. The importance weights of these new samples are adjusted according to the probability that they came from the samples of the last iteration and the latest control inputs.

For the application at hand, in the sampling phase of the Mixture PF used in the present embodiment proposed in this example, some samples predicted according to the most recent observation are added to those samples predicted according to the system model. The most recent observation is used to adjust the importance weights of the samples predicted according to the system model. The importance weights of the additional samples predicted according to the most recent observation are adjusted according to the probability that they were generated from the samples of the last iteration and the system model with latest control inputs. When GNSS signal is not available, only samples based on the system model are used, but when GNSS is available both types of samples are used which gives better performance and thus leads to a better performance during GNSS outages. Also adding the samples from GNSS observation leads to faster recovery to true position after GNSS outages.

A set of common reference frames is used in this example for demonstration purposes, other definitions of reference frames may be used. The body frame of the vehicle has the X-axis along the transversal direction, Y-axis along the forward longitudinal direction, and Z-axis along the vertical direction of the vehicle completing a right-handed system. The local-level frame is the ENU frame that has axes along East, North, and vertical (Up) directions. The inertial frame is Earth-centered inertial frame (ECI) centered at the center of mass of the Earth and whose the Z-axis is the axis of rotation of the Earth. The Earth-centered Earth-fixed (ECEF) frame has the same origin and z-axis as the ECI frame but it rotates with the Earth (hence the name Earth-fixed).

Mechanization

Mechanization is a process of converting the output of inertial sensors into position, velocity and attitude information. Mechanization is a recursive process which processes the data based on previous output (or some initial values) and the new measurement from the inertial sensors.

The rotation matrix that transforms from the vehicle body frame to the local-level frame at time k−1 is $$R^l_{b,k-1} =$$

$$\begin{bmatrix} \cos A_{k-1}\cos r_{k-1} + \\ \sin A_{k-1}\sin p_{k-1}\sin r_{k-1} & \sin A_{k-1}\cos p_{k-1} & \cos A_{k-1}\sin r_{k-1} - \\ -\sin A_{k-1}\cos r_{k-1} + & & \sin A_{k-1}\sin p_{k-1}\cos r_{k-1} \\ \cos A_{k-1}\sin p_{k-1}\sin r_{k-1} & \cos A_{k-1}\cos p_{k-1} & \cos A_{k-1}\sin p_{k-1}\cos r_{k-1} \\ -\cos p_{k-1}\sin r_{k-1} & \sin p_{k-1} & \cos p_{k-1}\cos r_{k-1} \end{bmatrix}$$

The mechanization version of this matrix is shown in equation (1) in Appendix 1.

To describe the mechanization nonlinear equations, which is here the motion model for the navigation states, the control inputs are first introduced. The measurement provided by the IMU is the control input; $u_{k-1} = [f_{k-1}^x \; f_{k-1}^y \; f_{k-1}^z \; \omega_{k-1}^x \; \omega_{k-1}^y \; \omega_{k-1}^z]^T$ where $f_{k-1}^x$, $f_{k-1}^y$, and $f_{k-1}^z$ are the readings of the accelerometer triad, and $\omega_{k-1}^x$, $\omega_{k-1}^y$, and $\omega_{k-1}^z$ are the readings of the gyroscope triad. As mentioned earlier these are the sensors' readings that correspond to transforming the state from time epoch k−1 to time epoch k, this is the convention used in this explanation for the sensor readings just used for nomenclature purposes.

Initialization

The initialization procedure may differ from one application to another. First the initialization of position and velocity will be discussed. In some applications, position may be initialized using a platform's last known position before it started to move, this may be used in applications where the platform does not move when the navigation system is not running. For the systems where inertial sensors are integrated with absolute navigation information, such as for example GNSS, initial position may be provided by the absolute navigation system. In some cases, the starting point may be known a priori (pre-surveyed location) which can be used as an initial input. Velocity initialization may be made with zero input, if the platform is stationary. If moving, the velocity may be provided from an external navigation source such as for example, GNSS or odometer.

For attitude initialization, when the device is stationary, accelerometers measure the components of reaction to gravity because of the pitch and roll angles (tilt from horizontal plane). The accelerometers measurement are given by $$\begin{bmatrix} f^x \\ f^y \\ f^z \end{bmatrix} = R^b_l \begin{bmatrix} 0 \\ 0 \\ g \end{bmatrix} = (R^l_b)^T \begin{bmatrix} 0 \\ 0 \\ g \end{bmatrix} = \begin{bmatrix} -g\cos p\sin r \\ g\sin p \\ g\cos p\cos r \end{bmatrix}$$

where g is the gravity acceleration. If three accelerometers along the X, Y, and Z directions are utilized, the pitch and the roll angles can be calculated as follows:

$$p = \tan^{-1}\left(\frac{f^y}{\sqrt{(f^x)^2 + (f^z)^2}}\right)$$

$$r = \tan^{-1}\left(\frac{-f^x}{f^z}\right)$$

In case the device is not stationary, a time averaging can be used on the accelerometer readings to suppress the motion components, then the above formulas may be used with the averaged accelerometers data to initialize pitch and roll. The length of the time frame used for averaging may depend on the application or the mode where the navigation system works (such as for example walking or driving).

In case the device is not stationary and either GNSS or the optional source of speed or velocity readings (such as for example odometer) is available and in case initial misalignment is resolved (such as in Example 4) or there is no misalignment in a certain application, then the motion obtained from these sources may be decoupled from the accelerometer readings, so that the remaining quantity measured by these accelerometers are components of gravity, which enables the calculation of pitch and roll as follows:

$$p = \tan^{-1}\left(\frac{f^y - Acc}{\sqrt{(f^x + \text{Speed}\cdot\omega^z)^2 + (f^z)^2}}\right)$$

$$r = \tan^{-1}\left(\frac{-f^x + \text{Speed}\cdot\omega^z}{f^z}\right)$$

where the speed and acceleration derived from form GNSS or other source are labelled Speed and Acc.

For the azimuth angle, one possible way of initializing it is to obtain it from the absolute navigation information. In the case velocities are available and the device starts to move, the azimuth angle can be calculated as follows:

$$A = \tan^{-1}\left(\frac{v^E}{v^N}\right)$$

This initial azimuth is the moving platform azimuth, and it may be used together with the initial misalignment (such as the one described in Example 4) to get the initial device heading.

If velocity is not available from the absolute navigation receiver, then position differences over time may be used to approximate velocity and consequently calculate azimuth. In some applications, azimuth may be initialized using a platform's last known azimuth before it started to move, this may be used in applications where the platform does not move when the navigation system is not running.

The Attitude Equations

One possible way to calculate the attitude angles is to use quaternions through the following equations. The relation between the vector of quaternion parameters and the rotation matrix from body frame to local-level frame is as follows $$q_{k-1} = \begin{bmatrix} q^1_{k-1} \\ q^2_{k-1} \\ q^3_{k-1} \\ q^4_{k-1} \end{bmatrix} = \begin{bmatrix} 0.25\{R^{l,Mech}_{b,k-1}(3,2) - R^{l,Mech}_{b,k-1}(2,3)\}/q^4_{k-1} \\ 0.25\{R^{l,Mech}_{b,k-1}(1,3) - R^{l,Mech}_{b,k-1}(3,1)\}/q^4_{k-1} \\ 0.25\{R^{l,Mech}_{b,k-1}(2,1) - R^{l,Mech}_{b,k-1}(1,2)\}/q^4_{k-1} \\ 0.5\sqrt{1 + R^{l,Mech}_{b,k-1}(1,1) + R^{l,Mech}_{b,k-1}(2,2) + R^{l,Mech}_{b,k-1}(3,3)} \end{bmatrix}$$

The three gyroscopes readings should be compensated for the stochastic errors as well as the Earth rotation rate and the change in orientation of the local-level frame. The latter two are monitored by the gyroscope and form a part of the readings, so they have to be removed in order to get the actual turn. These angular rates are assumed to be constant in the interval between time steps k−1 and k and they are integrated over time to give the angular increments corresponding to the rotation vector from the local-level frame to the body frame depicted in the body frame, as follows:

$$\begin{bmatrix} \theta_x \\ \theta_y \\ \theta_z \end{bmatrix} = \begin{bmatrix} \omega_{k-1}^x \\ \omega_{k-1}^y \\ \omega_{k-1}^z \end{bmatrix} \Delta t - (R_{b,k-1}^{l,Mech})^T \begin{bmatrix} \frac{-v_{k-1}^{N,Mech}}{R_{M,k-1}^{Mech} + h_{k-1}^{Mech}} \\ \omega^e \cos\varphi_{k-1}^{Mech} + \frac{v_{k-1}^{E,Mech}}{R_{N,k-1}^{Mech} + h_{k-1}^{Mech}} \\ \omega^e \sin\varphi_{k-1}^{Mech} + \frac{v_{k-1}^{E,Mech} \tan\varphi_{k-1}^{Mech}}{R_{N,k-1}^{Mech} + h_{k-1}^{Mech}} \end{bmatrix} \Delta t$$

where $\omega^e$ is the Earth rotation rate, $R_M$ is the Meridian radius of curvature of the Earth's reference ellipsoid and is given by $$R_{M,k-1}^{Mech} = \frac{a(1-e^2)}{(1-e^2\sin^2(\varphi_{k-1}^{Mech}))^{3/2}}$$

$R_N$ is the normal radius of curvature of the Earth's reference ellipsoid and is given by $$R_{N,k-1}^{Mech} = \frac{a}{(1-e^2\sin^2(\varphi_{k-1}^{Mech}))^{1/2}}$$

$\Delta t$ is the sampling time, a is the semimajor axis (equatorial radius) of a Meridian ellipse of the Earth's ellipsoid a=6,378,137.0171, e is the eccentricity $$e = \sqrt{\frac{a^2 - b^2}{a^2}} = \sqrt{f(2-f)} = 0.08181919,$$

b is the semiminor axis of a Meridian ellipse of the Earth's ellipsoid b=a(1−f)=6356752.3142 m, and f is the flatness $$f = \frac{a-b}{a} = 0.00335281.$$

The quaternion parameters are propagated with time as follows $$q_k = \begin{bmatrix} q_k^1 \\ q_k^2 \\ q_k^3 \\ q_k^4 \end{bmatrix} = \begin{bmatrix} q_{k-1}^1 \\ q_{k-1}^2 \\ q_{k-1}^3 \\ q_{k-1}^4 \end{bmatrix} + \frac{1}{2}\begin{bmatrix} 0 & \theta_z & -\theta_y & \theta_x \\ -\theta_z & 0 & \theta_x & \theta_y \\ \theta_y & -\theta_x & 0 & \theta_z \\ -\theta_x & -\theta_y & -\theta_z & 0 \end{bmatrix}\begin{bmatrix} q_{k-1}^1 \\ q_{k-1}^2 \\ q_{k-1}^3 \\ q_{k-1}^4 \end{bmatrix}$$

The definition of the quaternion parameters implies that $$(q_k^1)^2 + (q_k^2)^2 + (q_k^3)^2 + (q_k^4)^2 = 1$$

Due to computational errors, the above equality may be violated. To compensate for this, the following special normalization procedure is performed. If the following error exists after the computation of the quaternion parameters $$\Delta = 1 - ((q_k^1)^2 + (q_k^2)^2 + (q_k^3)^2 + (q_k^4)^2)$$

then the vector of quaternion parameters should be updated as follows $$q_k = \frac{q_k}{\sqrt{1-\Delta}}$$

The new rotation matrix from body frame to local-level frame is computed as follows $$R_{b,k}^{l,Mech} = \begin{bmatrix} R_{b,k}^{l,Mech}(1,1) & R_{b,k}^{l,Mech}(1,2) & R_{b,k}^{l,Mech}(1,3) \\ R_{b,k}^{l,Mech}(2,1) & R_{b,k}^{l,Mech}(2,2) & R_{b,k}^{l,Mech}(2,3) \\ R_{b,k}^{l,Mech}(3,1) & R_{b,k}^{l,Mech}(3,2) & R_{b,k}^{l,Mech}(3,3) \end{bmatrix}$$

$$= \begin{bmatrix} (q_k^1)^2 - (q_k^2)^2 - (q_k^3)^2 + (q_k^4)^2 & 2(q_k^1 q_k^2 - q_k^3 q_k^4) & 2(q_k^1 q_k^3 + q_k^2 q_k^4) \\ 2(q_k^1 q_k^2 + q_k^3 q_k^4) & (q_k^2)^2 - (q_k^1)^2 - (q_k^3)^2 + (q_k^4)^2 & 2(q_k^2 q_k^3 - q_k^1 q_k^4) \\ 2(q_k^1 q_k^3 - q_k^2 q_k^4) & 2(q_k^2 q_k^3 + q_k^1 q_k^4) & (q_k^3)^2 - (q_k^1)^2 - (q_k^2)^2 + (q_k^4)^2 \end{bmatrix}$$

The attitude angles are obtained from this rotation matrix as follows $$p_k^{Mech} = \tan^{-1}\left(\frac{R_{b,k}^{l,Mech}(3,2)}{\sqrt{(R_{b,k}^{l,Mech}(1,2))^2 + (R_{b,k}^{l,Mech}(2,2))^2}}\right)$$

$$r_k^{Mech} = \tan^{-1}\left(\frac{-R_{b,k}^{l,Mech}(3,1)}{R_{b,k}^{l,Mech}(3,3)}\right)$$

$$A_k^{Mech} = \tan^{-1}\left(\frac{R_{b,k}^{l,Mech}(1,2)}{R_{b,k}^{l,Mech}(2,2)}\right)$$

Another solution for attitude angles calculation is as follows:

The skew symmetric matrix of the angle increments corresponding to the rotation vector from the local-level frame to the body frame depicted in the body frame is calculated as follows:

$$S_{lb,k}^{b,Mech} = \begin{bmatrix} 0 & -\theta_z & \theta_y \\ \theta_z & 0 & -\theta_x \\ -\theta_y & \theta_x & 0 \end{bmatrix}$$

The new $R_{b,k}^l$ matrix is calculated as follows:

$$R_{b,k}^{l,Mech} = (R_{b,k-1}^{l,Mech})\exp(S_{lb,k}^{b,Mech})$$

where $\theta_k^{Mech} = \sqrt{(\theta_x)^2 + (\theta_y)^2 + (\theta_z)^2}$ and $\exp(S_{lb,k}^{b,Mech})$ may be either the exponential of a matrix implemented numerically or may be calculated as follows:

$$\exp(S_{lb,k}^{b,Mech}) = I + S_{lb,k}^{b,Mech}\left(\frac{\sin\theta_k^{Mech}}{\theta_k^{Mech}}\right) + (S_{lb,k}^{b,Mech})^2\left(\frac{1-\cos\theta_k^{Mech}}{(\theta_k^{Mech})^2}\right)$$

The attitude angles are then obtained from this $R_{b,k}^{l,Mech}$ matrix as mentioned above.

the Position and Velocity Equations

The velocity is calculated as shown in equation (2) in Appendix 1, where $g_k$ is the acceleration of the gravity, that may be calculated through a model, such as for example:

$$g_k^{Mech} = a_1(1+a_2\sin^2\phi_k^{Mech}+a_3\sin^4\phi_k^{Mech})+(a_4+a_5\sin^2\phi_k^{Mech})h_k^{Mech}+a_6(h_k^{Mech})^2$$

where, the coefficients $a_1$ through $a_6$ for Geographic Reference System (GRS) 1980 are defined as: $a_1$=9.7803267714 m/s²; $a_2$=0.0052790414; $a_3$=0.0000232718; $a_4$=−0.000003087691089 1/s²; $a_5$=0.000000004397731 1/s²; $a_6$=0.000000000000721 1/ms².

One possible calculation for the latitude may be as follows:

$$\varphi_k^{Mech} = \varphi_{k-1}^{Mech} + \frac{d\varphi}{dt}\bigg|_{k-1}^{Mech}\Delta t = \varphi_{k-1}^{Mech} + \frac{v_{k-1}^{N,Mech}}{R_{M,k-1}^{Mech}+h_{k-1}^{Mech}}\Delta t$$

Similarly, one possible calculation for the longitude may be expressed as:

$$\lambda_k^{Mech} = \lambda_{k-1}^{Mech} + \frac{d\lambda}{dt}\bigg|_{k-1}^{Mech}\Delta t = \lambda_{k-1}^{Mech} + \frac{v_{k-1}^{E,Mech}}{(R_{N,k-1}^{Mech}+h_{k-1}^{Mech})\cos\varphi_{k-1}^{Mech}}\Delta t$$

One possible calculation for the altitude may be given by:

$$h_k^{Mech} = h_{k-1}^{Mech} + \frac{dh}{dt}\bigg|_{k-1}^{Mech}\Delta t = h_{k-1}^{Mech} + v_{k-1}^{Up,Mech}\Delta t$$

In general, it has to be noted that the mechanization equations for attitude, velocity and position may be implemented differently, such as for example, using a better numerical integration technique for position. Furthermore, coning and sculling may be used to provide more precise mechanization output.

The System Model

The system model is the state transition model, since this is an error state system model, this system model transition from the error state of the previous iteration k−1 to the error state of the current iteration k.

To describe the system model utilized in the present navigation module, which is the nonlinear error-state system model, the error state vector has to be described first. The error state consist of the errors in the navigation states, the errors in the rotation matrix $R_b^l$ that transforms from the device body frame to the local-level frame, the errors in the sensors readings (i.e. the errors in the control input). The errors in the navigation states are $[\delta\phi_k, \delta\lambda_k, \delta h_k, \delta v_k^E, \delta v_k^N, \delta v_k^U, \delta p_k, \delta r_k, \delta A_k]^T$, which are the errors in latitude, longitude, altitude, velocity along East, North, and Up RU directions, pitch, roll, and azimuth, respectively. The errors in $R_b^l$ are the errors in the nine elements of this 3×3 matrix, the 3×3 matrix of the errors will be called $\delta R_b^l$. The errors associated with the different control inputs (the sensors' errors): $[\delta f_k^x\ \delta f_k^y\ \delta f_k^z\ \delta\omega_k^x\ \delta\omega_k^y\ \delta\omega_k^z]^T$ where $\delta f_k^x$, $\delta f_k^y$, and $\delta f_k^z$ are the stochastic errors in accelerometers readings, and $\delta\omega_k^x$, $\delta\omega_k^y$, and $\delta\omega_k^z$ are the stochastic errors in gyroscopes readings.

Modeling the Sensors' Errors

A system model for the sensors' errors may be used. For example the traditional model for these sensors errors in the literature, is the first order Gauss Markov model, which can be used here, but other models as well can be used. For example, a higher order Auto-Regressive (AR) model to model the drift in each one of the inertial sensors may be used and is demonstrated here. The general equation of the AR model of order p is in the form $$y_k = -\sum_{n=1}^{p}\alpha_n y_{k-n} + \beta_0\omega_k$$

where $\omega_k$ is white noise which is the input to the AR model, $y_k$ is the output of the AR model, the α's and β are the parameters of the model. It should be noted that such a higher order AR model is difficult to use with KF, despite the fact that it is a linear model. This is because for each inertial sensor error to be modeled the state vector has to be augmented with a number of elements equal to the order of the AR model (which is 120). Consequently, the covariance matrix, and other matrices used by the KF will increase drastically in size (an increase of 120 in rows and an increase of 120 in columns for each inertial sensor), which make this difficult to realize.

In general, if the stochastic gyroscope drift is modeled by any model such as for example Gauss Markov (GM), or AR, in the system model, the state vector has to be augmented accordingly. The normal way of doing this augmentation will lead to, for example in the case of AR with order 120, the addition of 120 states to the state vector. Since this will introduce a lot of computational overhead and will require an increase in the number of used particles, another approach is used in this work. The flexibility of the models used by PF was exploited together with an approximation that experimentally proved to work well. The state vector in PF is augmented by only one state for the gyroscope drift. So at the k-th iteration, all the values of the gyroscope drift state in the particle population of iteration k−1 will be propagated as usual, but for the other previous drift values from k−120 to k−2, only the mean of the estimated drift will be used and propagated. This implementation makes the use of higher order models possible without adding a lot of computational overhead. The experiments with Mixture PF demonstrated that this approximation is valid.

If 120 states were added to the state vector, i.e. all the previous gyroscope drift states in all the particles of the population of iteration k−120 to k−1 were to be used in the k-th iteration, then the computational overhead would have been very high. Furthermore, when the state vector is large PF computational load is badly affected because a larger number of particles may be used. But this is not the case in this implementation because of the approximation discussed above.

Modeling the Errors in the Rotation Matrix that Transforms from the Device Body Frame to the Local-Level Frame As mentioned earlier $R_b^l$ is the rotation matrix that transforms from the device body frame to the local-level frame. The following is the needed steps to get the error states of the $R_b^l$ from all the error states of the previous iteration, this part of the system model get the full error in $R_b^l$ and not an approximation or a linearization.

First the errors in the Meridian and normal radii of curvature of the Earth's ellipsoid are calculated from the mechanization-derived version of these radii and the corrected version of these radii as follows:

$$R_{M,k}^{Mech} = \frac{a(1-e^2)}{(1-e^2\sin^2(\varphi_k^{Mech}))^{3/2}}$$

$$R_{N,k}^{Mech} = \frac{a}{(1-e^2\sin^2(\varphi_k^{Mech}))^{1/2}}$$

$$R_{M,k-}^{Correct} = \frac{a(1-e^2)}{(1-e^2\sin^2(\varphi_k^{Mech}-\delta\varphi_{k-1}))^{3/2}}$$

$$R_{N,k-}^{Correct} = \frac{a}{(1-e^2\sin^2(\varphi_k^{Mech}-\delta\varphi_{k-1}))^{1/2}}$$

$$\delta R_{M,k-} = R_{M,k}^{Mech} - R_{M,k-}^{Correct}$$

$$\delta R_{N,k-} = R_{N,k}^{Mech} - R_{N,k-}^{Correct}$$

The rotation vector from the inertial frame to the local-level frame depicted in the local-level frame from the mechanization is given as follows:

$$\omega_{il,k}^{l,Mech} = \omega_{ie,k}^{l,Mech} + \omega_{el,k}^{l,Mech} = \begin{bmatrix} 0 \\ \omega^e \cos(\varphi_k^{Mech}) \\ \omega^e \sin(\varphi_k^{Mech}) \end{bmatrix} + \begin{bmatrix} \frac{-v_k^{N,Mech}}{R_{M,k}^{Mech} + h_k^{Mech}} \\ \frac{v_k^{E,Mech}}{(R_{N,k}^{Mech} + h_k^{Mech})} \\ \frac{v_k^{E,Mech}\tan(\varphi_k^{Mech})}{(R_{N,k}^{Mech} + h_k^{Mech})} \end{bmatrix}$$

The rotation vector from the inertial frame to the local-level frame depicted in the body frame of the device from the mechanization is given as follows:

$$\omega_{il,k}^{b,Mech} R_{l,k}^{b,Mech} \omega_{il,k}^{l,Mech} = (R_{b,k}^{l,Mech})^T \omega_{il,k}^{l,Mech}$$

The error in the rotation vector from the inertial frame to the ECEF frame depicted in the local-level frame is calculated as follows:

$$\delta\omega_{ie,k-}^{l} = \begin{bmatrix} 0 \\ \omega^e \delta\cos(\varphi_k) \\ \omega^e \delta\sin(\varphi_k) \end{bmatrix} = \begin{bmatrix} 0 \\ \omega^e(\cos(\varphi_k^{Mech}) - \cos(\varphi_k^{Mech} - \delta\varphi_{k-1})) \\ \omega^e(\sin(\varphi_k^{Mech}) - \sin(\varphi_k^{Mech} - \delta\varphi_{k-1})) \end{bmatrix}$$

The error in the rotation vector from the Earth-fixed Earth-centered (ECEF) frame to the local-level frame depicted in the local-level frame is calculated as follows:

$$\delta\omega_{ie,k-}^{l} = \begin{bmatrix} -\left(\frac{v_k^{N,Mech}}{R_{M,k}^{Mech}+h_k^{Mech}} - \frac{v_k^{N,Mech}-\delta v_{k-1}^{N}}{R_{M,k}^{Mech}-\delta R_{M,k-}+h_k^{Mech}-\delta h_{k-1}}\right) \\ \frac{v_k^{E,Mech}}{(R_{N,k}^{Mech}+h_k^{Mech})} - \frac{v_k^{E,Mech}-\delta v_{k-1}^{E}}{(R_{N,k}^{Mech}-\delta R_{N,k-}+h_k^{Mech}-\delta h_{k-1})} \\ \frac{v_k^{E,Mech}\tan(\varphi_k^{Mech})}{(R_{N,k}^{Mech}+h_k^{Mech})} - \frac{(v_k^{E,Mech}-\delta v_{k-1}^{E})\tan(\varphi_k^{Mech}-\delta\varphi_{k-1})}{(R_{N,k}^{Mech}-\delta R_{N,k-}+h_k^{Mech}-\delta h_{k-1})} \end{bmatrix}$$

The error in the rotation vector from the inertial frame to the local-level frame depicted in the local-level frame is calculated as follows:

$$\delta\omega_{il,k-}^{l} = \delta\omega_{ie,k-}^{l} + \delta\omega_{el,k-}^{l}$$

The gyroscope readings that cause the system to transition from the state at time epoch k−1 to time epoch k will be noted as follows:

$$\omega_{ib,k}^{b,Mech} = \begin{bmatrix} \omega_{k-1}^{x} \\ \omega_{k-1}^{y} \\ \omega_{k-1}^{z} \end{bmatrix}$$

The stochastic error in the gyroscope readings is noted as follows:

$$\delta\omega_{ib,k}^{b} = \begin{bmatrix} \delta\omega_k^x \\ \delta\omega_k^y \\ \delta\omega_k^z \end{bmatrix}$$

The intermediate estimate of the corrected $R_b^l$ matrix, from the previous iteration estimate of the error in this matrix can be obtained as follows:

$$R_{b,k-}^{l,Correct} = R_{b,k}^{l,Mech} - \delta R_{b,k-1}^{l}$$

The corrected rotation vector from the inertial frame to the local-level frame depicted in the local-level frame is calculated as follows:

$$\omega_{il,k}^{l,Correct} = \omega_{il,k}^{l,Mech} \delta\omega_{il,k}^{l}$$

The corrected rotation vector from the inertial frame to the local-level frame depicted in the body frame is calculated as follows:

$$\omega_{il,k}^{b,Correct} = R_{l,k-}^{b,Correct}\omega_{il,k}^{l,Correct} = (R_{b,k-}^{l,Correct})^T \omega_{il,k}^{l,Correct}$$

The error in the rotation vector from the inertial frame to the local-level frame depicted in the body frame is calculated as follows:

$$\delta\omega_{il,k}^{b} = \omega_{il,k}^{b,Mech} - \omega_{il,k}^{b,Correct}$$

The error in the angle increment corresponding to the error in the rotation vector from the local-level frame to the body frame depicted in the body frame is calculated as follows:

$$\delta\theta_{lb,k}^{b} = (\delta\omega_{ib,k}^{b} - \delta\omega_{il,k}^{b})\Delta t$$

The angle increment corresponding to the rotation vector from the local-level frame to the body frame depicted in the body frame from the mechanization is calculated as follows:

$$\theta_{lb,k}^{b,Mech} = \omega_{lb,k}^{b,Mech}\Delta t$$

The corrected angle increment corresponding to the corrected rotation vector from the local-level frame to the body frame depicted in the body frame is calculated as follows:

$$\theta_{lb,k}^{b,Correct} = \theta_{lb,k}^{b,Mech} - \delta\theta_{lb,k}^{b}$$

$$\theta_{lb,k}^{b,Correct} = \begin{bmatrix} \theta_{lb,k}^{b,Correct} & (1) \\ \theta_{lb,k}^{b,Correct} & (2) \\ \theta_{lb,k}^{b,Correct} & (3) \end{bmatrix}$$

The skew symmetric matrix of the corrected angle increment corresponding to the corrected rotation vector from the local-level frame to the body frame depicted in the body frame is calculated as follows:

$$S_{lb,k}^{b,Correct} = \begin{bmatrix} 0 & -\theta_{lb,k}^{b,Correct}(3) & \theta_{lb,k}^{b,Correct}(2) \\ \theta_{lb,k}^{b,Correct}(3) & 0 & -\theta_{lb,k}^{b,Correct}(1) \\ -\theta_{lb,k}^{b,Correct}(2) & \theta_{lb,k}^{b,Correct}(1) & 0 \end{bmatrix}$$

The error in the $R_b^l$ matrix is calculated as follows:

$$\delta R_{b,k}^l = R_{b,k}^{l,Mech} - (R_{b,k-1}^{l,Mech} - \delta R_{b,k-1}^l)\exp(S_{lb,k}^{b,Correct})$$

where $\theta_k^{Correct} = \sqrt{(\theta_{lb,k}^{b,Correct}(1))^2 + (\theta_{lb,k}^{b,Correct}(2))^2 + (\theta_{lb,k}^{b,Correct}(3))^2}$ and $\exp(S_{lb,k}^{b,Correct}) =$ $$I + S_{lb,k}^{b,Correct}\left(\frac{\sin\theta_k^{Correct}}{\theta_k^{Correct}}\right) + (S_{lb,k}^{b,Correct})^2\left(\frac{1-\cos\theta_k^{Correct}}{(\theta_k^{Correct})^2}\right)$$

Obtaining the Errors in Attitude

The corrected $R_b^l$ matrix is calculated as follows:

$$R_{b,k}^{l,Correct} = R_{b,k}^{l,Mech} - \delta R_{b,k}^l$$

Thus, the corrected attitude angles are calculated as follows:

$$p_k^{Correct} = \tan^{-1}\left(\frac{R_{b,k}^{l,Correct}(3,2)}{\sqrt{(R_{b,k}^{l,Correct}(1,2))^2 + (R_{b,k}^{l,Correct}(2,2))^2}}\right)$$

$$r_k^{Correct} = \tan^{-1}\left(\frac{-R_{b,k}^{l,Correct}(3,1)}{R_{b,k}^{l,Correct}(3,3)}\right)$$

$$A_k^{Correct} = \tan^{-1}\left(\frac{R_{b,k}^{l,Correct}(1,2)}{R_{b,k}^{l,Correct}(2,2)}\right)$$

The attitude errors are calculated as follows:

$$\delta p_k = p_k^{Mech} - p_k^{Correct}$$

$$\delta r_k = r_k^{Correct} - r_k^{Correct}$$

$$\delta A_k = A_k^{Mech} - A_k^{Correct}$$

Modeling the Errors in Velocity

The discrete version of the derivative of the velocity from mechanization may be computed as follows:

$$v\_deriv_k^{L,Mech} = \frac{v_k^{L,Mech} - v_{k-1}^{L,Mech}}{\Delta t} = \frac{1}{\Delta t}\begin{bmatrix} v_k^{E,Mech} - v_{k-1}^{E,Mech} \\ v_k^{N,Mech} - v_{k-1}^{N,Mech} \\ v_k^{U,Mech} - v_{k-1}^{U,Mech} \end{bmatrix}$$

It is to be noted that other more accurate numerical methods for derivates may be used in all the discrete versions of derivatives in this patent like the above one, and they can be accommodated by the Particle filter.

The discrete version of the derivative of the corrected velocity can be calculated as follows:

$$v\_deriv_k^{L,Corrected} = (R_{b,k}^{l,Mech} - \delta R_{b,k}^l)\begin{bmatrix} f_{k-1}^x - \delta f_k^x \\ f_{k-1}^y - \delta f_k^y \\ f_{k-1}^z - \delta f_k^z \end{bmatrix} -$$

$$\Omega^{temp}\begin{bmatrix} v_k^{E,Mech} - \delta v_{k-1}^E \\ v_k^{N,Mech} - \delta v_{k-1}^N \\ v_k^{U,Mech} - \delta v_{k-1}^U \end{bmatrix} + \begin{bmatrix} 0 \\ 0 \\ -(g_k^{Mech} - \delta g_k) \end{bmatrix}$$

where $\Omega_k^{temp}$ is the skew symmetric matrix of $\omega_k^{temp} = (2(\omega_{ie,k}^{l,Mech} - \delta\omega_{el,k}^l) + (\omega_{il,k}^{l,Mech} - \delta\omega_{il,k}^l))$.

Since $g_k$ is calculated by a model as a function of position, then $\delta g$ can be calculated as follows:

$$\delta g_k = a_1(1 + a_2\sin^2(\phi_k^{Mech}) + a_3\sin^4(\phi_k^{Mech})) + (a_4 + a_5\sin^2(\phi_k^{Mech}))h_k^{Mech} + a_6(h_k^{Mech})^2 - a_1(1 + a_2\sin^2(\phi_k^{Mech} - \delta\phi_{k-1}) + a_3\sin^4(\phi_k^{Mech} - \delta\phi_{k-1})) - (a_4 + a_5\sin^2(\phi_k^{Mech} - \delta\phi_{k-1}))(h_k^{Mech} - \delta h_{k-1}) - a_6(h_k^{Mech} - \delta h_{k-1})^2$$

Then $$(g_k^{Mech} - \delta g_k) = a_1(1 + a_2\sin^2(\phi_k^{Mech} - \delta\phi_{k-1}) + a_3\sin^4(\phi_k^{Mech} - \delta\phi_{k-1})) + (a_4 + a_5\sin^2(\phi_k^{Mech} - \delta\phi_{k-1}))(h_k^{Mech} - \delta h_{k-1}) + a_6(h_k^{Mech} - \delta h_{k-1})^2$$

The error in the discrete version of the derivative of the velocity can be calculated as follows:

$$\delta v\_deriv_k^L = v\_deriv_k^{L,Mech} - v\_deriv_k^{L,Corrected}$$

Thus, the error in the velocity can be calculated as follows:

$$\delta v_k^L = \begin{bmatrix} \delta v_k^E \\ \delta v_k^N \\ \delta v_k^U \end{bmatrix} = \delta v_{k-1}^L + \delta v\_deriv_k^L \Delta t$$

Modeling the Errors in Position $$\delta h_k = \delta h_{k-1} + \delta v_k^U \Delta t$$

$$\delta\varphi_k = \delta\varphi_{k-1} + \left(\frac{v_k^{N,Mech}}{R_{M,k}^{Mech} + h_k^{Mech}} - \frac{v_k^{N,Mech} - \delta v_k^N}{R_{M,k}^{Mech} - \delta R_{M,k} + h_k^{Mech} - \delta h_k}\right)\Delta t$$

$$\delta\lambda_k = \delta\lambda_{k-1} + \left(\frac{v_k^{E,Mech}}{(R_{N,k}^{Mech} + h_k^{Mech})\cos(\varphi_k^{Mech})} - \frac{(v_k^{E,Mech} - \delta v_k^E)}{(R_{N,k}^{Mech} - \delta R_{N,k} + h_k^{Mech} - \delta h_k)\cos(\varphi_k^{Mech} - \delta\varphi_k)}\right)\Delta t$$

the Measurement Model in Case of Loosely-Coupled Integration

In case loosely-coupled integration is used, position and velocity updates are obtained from the GNSS receiver. Thus the measurements are given as $z_k = [\phi_k^{GPS} \ \lambda_k^{GPS} \ h_k^{GPS} \ v_k^{E,GPS} \ v_k^{N,GPS} \ v_k^{U,GPS}]^T$ which consists of the GNSS readings for the latitude, longitude, altitude, and velocity components along East, North, and Up directions respectively. The measurement model can therefore be given as:

$$\delta z_k = \begin{bmatrix} \delta z_k^{\varphi} \\ \delta z_k^{\lambda} \\ \delta z_k^{h} \\ \delta z_k^{v_e} \\ \delta z_k^{v_n} \\ \delta z_k^{v_u} \end{bmatrix} = h(\delta x_k, v_k) = \begin{bmatrix} \varphi_k^{Mech} - \varphi_k^{GPS} \\ \lambda_k^{Mech} - \lambda_k^{GPS} \\ h_k^{Mech} - h_k^{GPS} \\ v_k^{E,Mech} - v_k^{E,GPS} \\ v_k^{N,GPS} - v_k^{N,GPS} \\ v_k^{U,GPS} - v_k^{U,GPS} \end{bmatrix} + \begin{bmatrix} v_k^{\varphi} \\ v_k^{\lambda} \\ v_k^{h} \\ v_k^{E} \\ v_k^{N} \\ v_k^{U} \end{bmatrix}$$

where $v_k = [v_k^{\varphi} \; v_k^{\lambda} \; v_k^{h} \; v_k^{V_e} \; v_k^{V_n} \; v_k^{V_u} \; v_k^{\rho} \; v_k^{\dot{r}}]^T$ is the noise in the GNSS observations used for update.

the Measurement Model in Case of Tightly-Coupled Integration

Background in Case of Tightly-Coupled Integration

In loosely-coupled integration, at least four satellites are needed to provide acceptable GNSS position and velocity, which are used as measurement updates in the integration filter. One advantage of tightly-coupled integration is that it can provide GNSS measurement updates even when the number of visible satellites is three or fewer, thereby improving the operation of the navigation system in degraded GNSS environments by providing continuous aiding to the inertial sensors even during limited GNSS satellite visibility (like in urban areas and downtown cores).

Tightly-coupled integration takes advantage of the fact that, given the present satellite-rich GPS constellation as well as other GNSS constellations, it is unlikely that all the satellites will be lost in any canyon. Therefore, the tightly coupled scheme of integration uses information from the few available satellites. This is a major advantage over loosely coupled integration with INS, which fails to acquire any aid from GNSS and considers the situation of fewer than four satellites as an outage. Another benefit of working in the tightly coupled scheme is that satellites with bad measurements can be detected and rejected.

In tightly-coupled integration, GNSS raw data is used and is integrated with the inertial sensors. The GNSS raw data used in the present navigation module in this example are pseudoranges and Doppler shifts. From the measured Doppler for each visible satellite, the corresponding pseudorange rate can be calculated. In the update phase of the integration filter the pseudoranges and pseudorange rates can be used as the measurement updates to update the position and velocity states of the vehicle. The measurement model that relates these measurements to the position and velocity states is a nonlinear model.

As is known, the KF integration solutions linearize this model. PF with its ability to deal with nonlinear models better capable of giving improved performance for tightly-coupled integration because it can use the exact nonlinear measurement model, this is in addition to the fact that the system model is always (in tightly or loosely coupled integration) a nonlinear model.

There are three main observables related to GPS: pseudoranges, Doppler shift (from which pseudorange rates are calculated), and the carrier phase. The present example utilizes only to the first two observables.

Pseudoranges are the raw ranges between satellites and receiver. A pseudorange to a certain satellite is obtained by measuring the time it takes for the GPS signal to propagate from this satellite to the receiver and multiplying it by the speed of light. The pseudorange measurement for the $m^{th}$ satellite is:

$$\rho^m = c(t_r - t_t)$$

where $\rho^m$ is the pseudorange observation from the $m^{th}$ satellite to receiver (in meters), $t_t$ is the transmit time, $t_r$ is the receive time, and c is the speed of light (in meters/sec).

For the GPS errors, the satellite and receiver clocks are not synchronized and each of them has an offset from the GPS system time. Despite the several errors in the pseudorange measurements, the most effective is the offset of the inexpensive clock used inside the receiver from the GPS system time.

The pseudorange measurement for the $m^{th}$ satellite, showing the different errors contaminating it, is given as follows:

$$\rho^m = r^m + c\delta t_r - c\delta t_s + cI^m + cT^m + \epsilon_\rho^m$$

where $r^m$ is the true range between the receiver antenna at time $t_r$ and the satellite antenna at time $t_t$ (in meters), $\delta t_r$ is the receiver clock offset (in seconds), $\delta t_s$ is the satellite clock offset (in seconds), $I^m$ is the ionospheric delay (in seconds), $T^m$ is the tropospheric delay (in seconds), $\epsilon_\rho^m$ is the error in range due to a combination of receiver noise and other errors such as multipath effects and orbit prediction errors (in meters).

The incoming frequency at the GPS receiver is not exactly the L1 or L2 frequency but is shifted from the original value sent by the satellite. This is called the Doppler shift and it is due to relative motion between the satellite and the receiver. The Doppler shift of the $m^{th}$ satellite is the projection of relative velocities (of satellite and receiver) onto the line of sight vector multiplied by the transmitted frequency and divided by the speed of light, and is given by:

$$D^m = \frac{\{(v^m - v) \cdot 1^m\} L_1}{c}$$

where $v^m = [v_x^m, v_y^m, v_z^m]$ is the $m^{th}$ satellite velocity in the ECEF frame, $v = [v_x, v_y, v_z]$ is the true receiver velocity in the ECEF frame, $L_1$ is the satellite transmitted frequency, and $$1^m = \frac{[(x - x^m), (y - y^m), (z - z^m)]^T}{\sqrt{(x - x^m)^2 + (y - y^m)^2 + (z - z^m)^2}} = [1_x^m, 1_y^m, 1_z^m]^T$$

is the true line of sight vector from the $m^{th}$ satellite to the receiver.

Given the measured Doppler shift, the pseudorange rate $\dot{\rho}^m$ is calculated as follows:

$$\dot{\rho}^m = -\frac{D^m c}{L_1}$$

After compensating for the satellite clock bias, Ionospheric and Tropospheric errors, the corrected pseudorange can be written as:

$$\rho_c^m = r^m + c\delta t_r + \tilde{\epsilon}_\rho^m$$

where, $\tilde{\epsilon}_\rho^m$ represents the total effect of residual errors. The true geometric range from $m^{th}$ satellite to receiver is the Euclidean distance and is given as follows:

$$r^m = \sqrt{(x - x^m)^2 + (y - y^m)^2 + (z - z^m)^2} = \|x - x^m\|$$

where $x = [x, y, z]^T$ is the receiver position in ECEF frame, $x^m = [x^m, y^m, z^m]^T$ is the position of the $m^{th}$ satellite at the corrected transmission time but seen in the ECEF frame at the corrected reception time of the signal. Satellite positions are initially calculated at the transmission time, and this position is in the ECEF frame which is not in the ECEF frame at the time of receiving the signal. This time difference may be approximately in the range of 70-90 milliseconds, during which the Earth and the ECEF rotate, and this can cause a range error of about 10-20 meters. To correct for this fact, the satellite position at transmission time has to be represented at the ECEF frame at the reception time not the transmission time. One can either do the correction before the measurement model or in the measurement model itself. In the present example, the satellite position correction is done before the integration filter and then passed to the filter, thus the measurement model uses the corrected position reported in the ECEF at reception time.

The details of using Ephemeris data to calculate the satellites' positions and velocities are known, and can subsequently be followed by the correction mentioned above.

In vector form, the equation may be expressed as follows:

$$\rho_c^m = \|x - x^m\| + b_r \tilde{\epsilon}_\rho^m$$

where $b_r = c \delta t_r$ is the error in range (in meters) due to receiver clock bias. This equation is nonlinear. The traditional techniques relying on KF used to linearize these equations about the pseudorange estimate obtained from the inertial sensors mechanization. PF is suggested in this example to accommodate nonlinear models, thus there is no need for linearizing this equation. The nonlinear pseudorange model for M satellites visible to the receiver is:

$$\begin{bmatrix} \rho_c^1 \\ \vdots \\ \rho_c^M \end{bmatrix} = \begin{bmatrix} \|x - x^1\| + b_r + \tilde{\epsilon}_\rho^1 \\ \vdots \\ \|x - x^M\| + b_r + \tilde{\epsilon}_\rho^M \end{bmatrix} = \begin{bmatrix} \sqrt{(x-x^1)^2 + (y-y^1)^2 + (z-z^1)^2} + b_r + \tilde{\epsilon}_\rho^1 \\ \vdots \\ \sqrt{(x-x^M)^2 + (y-y^M)^2 + (z-z^M)^2} + b_r + \tilde{\epsilon}_\rho^M \end{bmatrix}$$

But the position state x here is in ECEF rectangular coordinates, it should be in Geodetic coordinates which is part of the state vector used in the Mixture PF. The relationship between the Geodetic and Cartesian coordinates is given by:

$$\begin{bmatrix} x \\ y \\ z \end{bmatrix} = \begin{bmatrix} (R_N + h)\cos\varphi\cos\lambda \\ (R_N + h)\cos\varphi\sin\lambda \\ \{R_N(1 - e^2) + h\}\sin\varphi \end{bmatrix}$$

Where $R_N$ is the normal radius of curvature of the Earth's ellipsoid and e is the eccentricity of the Meridian ellipse. Thus the pseudorange model is:

$$\begin{bmatrix} \rho_c^1 \\ \vdots \\ \rho_c^M \end{bmatrix} = \begin{bmatrix} \sqrt{((R_N + h)\cos\varphi\cos\lambda - x^1)^2 + ((R_N + h)\cos\varphi\sin\lambda - y^1)^2 + (\{R_N + (1-e^2) + h\}\sin\varphi - z^1)^2} + b_r + \tilde{\epsilon}_\rho^1 \\ \vdots \\ \sqrt{((R_N + h)\cos\varphi\cos\lambda - x^M)^2 + ((R_N + h)\cos\varphi\sin\lambda - y^M)^2 + (\{R_N(1-e^2) + h\}\sin\varphi - z^M)^2} + b_r + \tilde{\epsilon}_\rho^M \end{bmatrix}$$

The true pseudorange rate between the $m^{th}$ satellite and receiver is expressed as $$\dot{r}^m = 1_x^m(v_x - v_x^m) + 1_y^m(v_y - v_y^m) + 1_z^m(v_z - v_z^m)$$

The pseudorange rate for the $m^{th}$ satellite can be modeled as follows:

$$\dot{\rho}^M = 1_x^m(v_x - v_x^m) + 1_y^m(v_y - v_y^m) + 1_z^m(v_z - v_z^m) + c\delta \dot{t}_r + \epsilon_{\dot{\rho}}^m$$
$$= 1_x^m(v_x - v_x^m) + 1_y^m(v_y - v_y^m) + 1_z^m(v_z - v_z^m) + d_r + \epsilon_{\dot{\rho}}^m$$

where $\delta \dot{t}_r$ is the receiver clock drift (unit-less), $d_r$ is the receiver clock drift (in meters/sec), $\epsilon_{\dot{\rho}}^m$ is the error in observation (in meters/sec).

This last equation is linear in velocities, but it is nonlinear in position. This can be seen by examining the expression for the line of sight unit vector above. Again, there is no need for linearization because of the nonlinear capabilities of PF. The nonlinear model for pseudorange rates of M satellites, again in ECEF rectangular coordinates is:

$$\begin{bmatrix} \dot{\rho}^1 \\ \vdots \\ \dot{\rho}^M \end{bmatrix} = \begin{bmatrix} 1_x^1(v_x - v_x^1) + 1_y^1(v_y - v_y^1) + 1_z^1(v_z - v_z^1) + d_r + \epsilon_{\dot{\rho}}^1 \\ \vdots \\ 1_x^M(v_x - v_x^M) + 1_y^M(v_y - v_y^M) + 1_z^M(v_z - v_z^M) + d_r + \epsilon_{\dot{\rho}}^M \end{bmatrix}$$

The velocities here are in ECEF and need to be in local-level frame because this is part of the state vector in Mixture PF. The transformation uses the rotation matrix from the local-level frame to ECEF ($R_l^e$) and is as follows:

$$\begin{bmatrix} v_x \\ v_y \\ v_z \end{bmatrix} = R_l^e \begin{bmatrix} v_e \\ v_n \\ v_u \end{bmatrix} = \begin{bmatrix} -\sin\lambda & -\sin\varphi\cos\lambda & \cos\varphi\cos\lambda \\ \cos\lambda & -\sin\varphi\sin\lambda & \cos\varphi\sin\lambda \\ 0 & \cos\varphi & \sin\varphi \end{bmatrix} \begin{bmatrix} v_e \\ v_n \\ v_u \end{bmatrix}$$

Furthermore, the line of sight unit vector from $m^{th}$ satellite to receiver will be expressed as follows:

$$1^m = \frac{[((R_N + h)\cos\varphi\cos\lambda - x^m), ((R_N + h)\cos\varphi\sin\lambda - y^m), (\{R_N(1-e^2) + h\}\sin\varphi - z^m)]^T}{\sqrt{((R_N + h)\cos\varphi\cos\lambda - x^m)^2 + ((R_N + h)\cos\varphi\sin\lambda - y^m)^2 + (\{R_N(1-e^2) + h\}\sin\varphi - z^m)^2}}$$
$$= [1_x^m, 1_y^m, 1_z^m]^T$$

The foregoing combined equations constitute the overall nonlinear model for M visible satellites.

Augmenting the System Model

The system model can be augmented with two states, namely: the bias of the GPS receiver clock $b_r$ and its drift $d_r$. Both of these are modeled as follows:

$$\begin{bmatrix} \dot{b}_r \\ \dot{d}_r \end{bmatrix} = \begin{bmatrix} d_r + w_b \\ w_d \end{bmatrix}$$

where $w_b$ and $w_d$ are the noise terms. In discrete form it can be written as:

$$\begin{bmatrix} b_{r,k} \\ d_{r,k} \end{bmatrix} = \begin{bmatrix} b_{r,k-1} + (d_{r,k-1} + w_{b,k-1})\Delta t \\ d_{r,k-1} + w_{d,k-1}\Delta t \end{bmatrix}$$

where $\Delta t$ is the sampling time. This model is used as part of either the system model described earlier.

the Measurement Model in Case of Tightly-Coupled Integration

As discussed, the measurement model in the case of tightly-coupled integration is a nonlinear model that relates the difference between the Mechanization estimate of the pseudoranges and pseudorange rates and the GPS raw measurements (pseudorange measurements and pseudorange rates) at a time epoch k, $\delta z_k$, to the states at time k, $\delta x_k$, and the GPS raw measurement noise $\epsilon_k$. First, the GPS raw measurements are $z_k = [\rho_k^1 \ldots \rho_k^M \dot{\rho}_k^1 \ldots \dot{\rho}_k^M]^T$ for M visible satellites. The nonlinear measurement model for tightly-coupled integration can be in the form:

$$\delta z_k = h(\delta x_k, \epsilon_k)$$

where $$\delta z_k = [\rho_k^{1,Mech} - \rho_{c,k}^{1,GPS} \ldots \rho_k^{M,Mech} - \rho_{c,k}^{M,GPS} \dot{\rho}_k^{1,Mech} - \dot{\rho}_k^{1,GPS} \ldots \dot{\rho}_k^{M,Mech} - \dot{\rho}_k^{M,GPS}]^T$$

$$\epsilon_k = [\tilde{\epsilon}_{\rho,k}^1 \ldots \tilde{\epsilon}_{\rho,k}^M \epsilon_{\dot{\rho},k}^1 \ldots \epsilon_{\dot{\rho},k}^M]^T$$

The part of the measurement model for the pseudoranges is as follows:

$$\begin{bmatrix} \rho_k^{1,Mech} - \rho_{c,k}^{1,GPS} \\ \vdots \\ \rho_k^{M,Mech} - \rho_{c,k}^{M,GPS} \end{bmatrix} =$$

$$\begin{bmatrix} \sqrt{(x_x^{Mech} - x_k^1)^2 + (y_k^{Mech} - y_k^1)^2 + (z_k^{Mech} - z_k^1)^2} \\ \vdots \\ \sqrt{(x_x^{Mech} - x_k^M)^2 + (y_k^{Mech} - y_k^M)^2 + (z_k^{Mech} - z_k^M)^2} \end{bmatrix} -$$

$$\begin{bmatrix} \sqrt{(x_k^{Corr} - x_k^1)^2 + (y_k^{Corr} - y_k^1)^2 + (z_k^{Corr} - z_k^1)^2} + b_{r,k} + \tilde{\epsilon}_\rho^1 \\ \vdots \\ \sqrt{(x_k^{Corr} - x_k^M)^2 + (y_k^{Corr} - y_k^M)^2 + (z_k^{Corr} - z_k^M)^2} + b_{r,k} + \tilde{\epsilon}_\rho^M \end{bmatrix}$$

where the receiver position from mechanization is $$x_k^{Mech} = \begin{bmatrix} x_k^{Mech} \\ y_k^{Mech} \\ z_k^{Mech} \end{bmatrix} = \begin{bmatrix} (R_{N,k}^{Mech} + h_k^{Mech})\cos\varphi_k^{Mech}\cos\lambda_k^{Mech} \\ (R_{N,k}^{Mech} + h_k^{Mech})\cos\varphi_k^{Mech}\sin\lambda_k^{Mech} \\ \{R_{N,k}^{Mech}(1 - e^2) + h_k^{Mech}\}\sin\varphi_k^{Mech} \end{bmatrix}$$

the corrected receiver position is:

$$x_k^{Corr} = \begin{bmatrix} x_k^{Corr} \\ y_k^{Corr} \\ z_k^{Corr} \end{bmatrix} =$$

$$\begin{bmatrix} (R_{N,k}^{Mech} - \delta R_{N,k} + h_k^{Mech} - \delta h_k)\cos(\varphi_k^{Mech} - \delta\varphi_k)\cos(\lambda_k^{Mech} - \delta\lambda_k) \\ (R_{N,k}^{Mech} - \delta R_{n,k} + h_k^{Mech} - \delta h_k)\cos(\varphi_k^{Mech} - \delta\varphi_k)\sin(\lambda_k^{Mech} - \delta\lambda_k) \\ \{(R_{N,k}^{Mech} - \delta R_{N,k})(1 - e^2) + h_k^{Mech} - \delta h_k\}\sin(\varphi_k^{Mech} - \delta\varphi_k) \end{bmatrix}$$

and $x_k^m = [x_k^m \ y_k^m \ z_k^m]^T$ is the position of the $m^{th}$ satellite at the corrected transmission time but seen in the ECEF frame at the corrected reception time of the signal.

The part of the measurement model for the pseudorange rates is:

$$\begin{bmatrix} \dot{\rho}_k^{1,Mech} - \dot{\rho}_k^{1,GPS} \\ \vdots \\ \dot{\rho}_k^{M,Mech} - \dot{\rho}_k^{M,GPS} \end{bmatrix} = \begin{bmatrix} 1_{x,k}^{1,Mech} \cdot (v_{x,k}^{Mech} - v_{x,k}^1) + 1_{y,k}^{1,Mech} \cdot \\ (v_{y,k}^{Mech} - v_{y,k}^1) + 1_{z,k}^{1,Mech} \cdot (v_{z,k}^{Mech} - v_{z,k}^1) \\ \vdots \\ 1_{x,k}^{M,Mech} \cdot (v_{x,k}^{Mech} - v_{x,k}^M) + 1_{y,k}^{M,Mech} \cdot \\ (v_{y,k}^{Mech} - v_{y,k}^M) + 1_{z,k}^{M,Mech} \cdot (v_{z,k}^{Mech} - v_{z,k}^M) \end{bmatrix} -$$

$$\begin{bmatrix} 1_{x,k}^{1,Corr} \cdot (v_{x,k}^{Corr} - v_{x,k}^M) + 1_{y,k}^{M,Corr} \cdot (v_{y,k}^{Corr} - v_{y,k}^1) + \\ 1_{z,k}^{1,Corr} \cdot (v_{z,k}^{Corr} - v_{z,k}^1) + d_{r,k} + \varepsilon_{\dot{\rho}}^1 \\ \vdots \\ 1_{x,k}^{M,Corr} \cdot (v_{x,k}^{Corr} - v_{x,k}^M) + 1_{y,k}^{M,Corr} \cdot (v_{y,k}^{Corr} - v_{y,k}^M) + \\ 1_{z,k}^{M,Corr} \cdot (v_{z,k}^{Corr} - v_{z,k}^M) + d_{r,k} + \varepsilon_{\dot{\rho}}^M \end{bmatrix}$$

where $$\begin{bmatrix} v_{x,k}^{Mech} \\ v_{y,k}^{Mech} \\ v_{z,k}^{Mech} \end{bmatrix} = R_{\ell,k}^{e,Mech} \begin{bmatrix} v_{e,k}^{Mech} \\ v_{n,k}^{Mech} \\ v_{u,k}^{Mech} \end{bmatrix} =$$

$$\begin{bmatrix} -\sin\lambda_k^{Mech} & -\sin\varphi_k^{Mech}\cos\lambda_k^{Mech} & \cos\varphi_k^{Mech}\cos\lambda_k^{Mech} \\ \cos\lambda_k^{Mech} & -\sin\varphi_k^{Mech}\sin\lambda_k^{Mech} & \cos\varphi_k^{Mech}\sin\lambda_k^{Mech} \\ 0 & \cos\varphi_k^{Mech} & \sin\varphi_k^{Mech} \end{bmatrix} \begin{bmatrix} v_{e,k}^{Mech} \\ v_{n,k}^{Mech} \\ v_{u,k}^{Mech} \end{bmatrix}$$

and $$\begin{bmatrix} v_{x,k}^{Corr} \\ v_{y,k}^{Corr} \\ v_{z,k}^{Corr} \end{bmatrix} = R_{\ell,k}^{e,Corr} \begin{bmatrix} v_{e,k}^{Corr} \\ v_{n,k}^{Corr} \\ v_{u,k}^{Corr} \end{bmatrix} =$$

$$\begin{bmatrix} -\sin(\lambda_k^{Mech} - \delta\lambda_k) & -\sin(\varphi_k^{Mech} - \delta\varphi_k) & \cos(\varphi_k^{Mech} - \delta\varphi_k) \\ & \cos(\lambda_k^{Mech} - \delta\lambda_k) & \cos(\lambda_k^{Mech} - \delta\lambda_k) \\ \cos(\lambda_k^{Mech} - \delta\lambda_k) & -\sin(\varphi_k^{Mech} - \delta\varphi_k) & \cos(\varphi_k^{Mech} - \delta\varphi_k) \\ & \sin(\lambda_k^{Mech} - \delta\lambda_k) & \sin(\lambda_k^{Mech} - \delta\lambda_k) \\ 0 & \cos(\varphi_k^{Mech} - \delta\varphi_k) & \sin(\varphi_k^{Mech} - \delta\varphi_k) \end{bmatrix}$$

$$\begin{bmatrix} v_{e,k}^{Mech} - \delta v_{e,k} \\ v_{n,k}^{Mech} - \delta v_{n,k} \\ v_{u,k}^{Mech} - \delta v_{u,k} \end{bmatrix}$$

Furthermore, the mechanization version of the line of sight unit vector from $m^{th}$ satellite to receiver is expressed as follows:

$$1_k^{m,Mech} = \frac{[(x_k^{Mech} - x_k^m), (y_k^{Mech} - y_k^m), (z_k^{Mech} - z_k^m)]^T}{\sqrt{(x_k^{Mech} - x_k^m)^2 + (y_k^{Mech} - y_k^m)^2 + (z_k^{Mech} - z_k^m)^2}}$$

$$= [1_{x,k}^{m,Mech}, 1_{y,k}^{m,Mech}, 1_{z,k}^{m,Mech}]^T$$

where the receiver position from mechanization is as defined above.

The corrected (or estimated) version of the line of sight unit vector from $m^{th}$ satellite to receiver is expressed as follows:

$$1_k^{m,Corr} = \frac{[(x_k^{Corr} - x_k^m), (y_k^{Corr} - y_k^m), (z_k^{Corr} - z_k^m)]^T}{\sqrt{(x_k^{Corr} - x_k^m)^2 + (y_k^{Corr} - y_k^m)^2 + (z_k^{Corr} - z_k^m)^2}}$$

$$= [1_{x,k}^{m,Corr}, 1_{y,k}^{m,Corr}, 1_{z,k}^{m,Corr}]^T$$

where the corrected receiver position is as defined above.

Optional Derived Updates for the Inertial Sensors Errors

In this option, a standalone mechanization routine has to run, as described earlier, whether in open loop or closed loop scheme. The aim of this option is to derive updates for some or all of the inertial sensors stochastic drift. One possible way to calculate these updates is described in Example 2.

Optional Automatic Detection of GNSS Degraded Performance in Case of Loosely-Coupled Integration An optional technique may be used for automatic assessment of GNSS information used for loosely-coupled integration and consequently detection of degraded performance. One of the criteria used in the checking of GNSS degraded performance is the number of satellites. If the number of satellites visible to receiver is four or more, the GPS reading passes the first check. The second check is using the standard deviation and/or the dilution of precision (DOP) of the calculated position solution by the GNSS receiver. In case of DOP, both the horizontal DOP (HDOP) and vertical DOP (VDOP) are used. Despite these two checks, some GNSS readings with degraded performance (especially because of some reflected signals reaching the receiver and not the original signal because of loss of direct line-of-sight between some satellites and the receiver) may still find their way to update the filter and can jeopardize its performance. Thus further checks have to be used.

Since this is an integrated solution, the estimation from Mixture PF with robust modeling is exploited to assess GNSS position and velocity observations. Furthermore motion constraints on the moving device may be exploited as well, when applicable, in connection with the sensors readings. The GNSS checks include GNSS horizontal position checking, GNSS altitude checking, GNSS azimuth update checking (only if azimuth update is applicable), and GNSS updates for the stochastic errors of inertial sensors (only if this option is used).

Only in applications where the device heading is the same as the moving platform heading or when the misalignment is resolved (such as in Example 4), azimuth update from GNSS may be used. In such case, some of the checks are for azimuth update from GNSS velocities. This update is not used unless the system is in motion. Furthermore, to have an azimuth update, the checks are tighter from those of position because the azimuth calculated from GNSS is a sensitive quantity. If the check is not met, azimuth update from GNSS is not performed.

In case another source of speed or velocity other than GNSS is used, it might be used to assess both GNSS position and velocity updates.

In case of pedestrian mode detected, such as in Example 3, acceptable stride lengths with tolerance may be used to assess both GNSS position and velocity updates.

In the case a barometer is available, its calculated altitude can also be used to assess the GNSS altitude.

The check for the update of the inertial sensors' errors is applicable only if such explicit updates are used. If the device is in motion, GNSS might be used for this update depending on further checking; if the device is stationary, this fact is also exploited to update the inertial sensors errors even without GNSS. Since these updates from GNSS are sensitive, the checks are much tighter than those for position updates.

Hybrid Loosely/Tightly Coupled Scheme

The proposed navigation module may adopt a hybrid loosely/tightly coupled solution and attempts to take advantage of the updates of the inertial sensors drift from GNSS when suitable, which rely on loosely-coupled updates from GNSS (since they rely in their calculations on GNSS position and velocity readings), as well as the benefits of tightly-coupled integration. Another advantage of loosely coupled that the hybrid solution may benefit from is the GNSS-derived heading update relying on GNSS velocity readings when in motion (this update is only applicable if misalignment was resolved or there is no misalignment in a certain application).

When the availability and the quality of GNSS position and velocity readings passes the assessment, loosely-coupled measurement update is performed for position, velocity, possibly azimuth (when applicable as discussed earlier), and possibly inertial sensors' stochastic errors (if this option is used). Each update can be performed according to its own quality assessment of the update. Whenever the testing procedure detects degraded GNSS performance either because the visible satellite number falls below four or because the GNSS quality examination failed, the filter can switch to a tightly-coupled update mode. Furthermore, each satellite can be assessed independently of the others to check whether it is adequate to use it for update. This check again may exploit improved performance of the Mixture PF with the robust modeling. Thus the pseudorange estimate for each visible satellite to the receiver position estimated from the prediction phase of the Mixture PF can be compared to the measured one. If the measured pseudorange of a certain satellite is too far off, this is an indication of degradation (e.g. the presence of reflections with loss of direct line-of-sight), and this satellite's measurements can be discarded, while other satellites can be used for the update.

Example 2

Mixture Particle Filter with Nonlinear Total-State System Model and Advanced Modeling of Inertial Sensor Errors In this example, the navigation module is utilized to determine a 3D navigation solution by calculating 3D position, velocity and attitude of a moving platform. Specifically, the module comprises absolute navigational information from a GNSS receiver, relative navigational information from MEMS-based inertial sensors consisting of three orthogonal accelerometers and three orthogonal gyroscopes, and a processor programmed to integrate the information using a nonlinear state estimation technique, such as for example, Mixture PF having the system and measurement models defined herein below. Thus, in this example, the present navigation module targets a 3D navigation solution employing MEMS-based inertial sensors/GPS integration using Mixture PF.

In this example the absolute navigational information from a GNSS receiver and the self-contained sensors which consist of three accelerometers and three gyroscopes are integrated using Mixture PF in either a loosely coupled, tightly coupled, or hybrid loosely/tightly coupled architecture, having a system and measurement model, wherein the system model is a nonlinear total-state system model without linearization or approximation that are used with the traditional KF-based solutions and their linearized error-state system models. The filter is programmed to comprise advanced modeling of inertial sensors stochastic drift and is programmed to use derived updates for such drift from GNSS, where appropriate. The filter may optionally be programmed to automatically detect and assess the quality of GNSS information, and further provide a means of discarding or discounting degraded information. The filter may optionally be programmed to automatically select between a loosely coupled and a tightly coupled integration scheme. Moreover, where tightly coupled architecture is selected, the GNSS information from each available satellite may be assessed independently and either discarded (where degraded) or utilized as a measurement update.

Navigation Solution

The state of the device whether tethered or non-tethered to the moving platform is $x_k = [\phi_k, \lambda_k, h_k, v_k^E, v_k^N, v_k^U, p_k, r_k, A_k]^T$, where $\phi_k$ is the latitude of the vehicle, $\lambda_k$ is the longitude, $h_k$ is the altitude, $v_k^E$ is the velocity along East direction, $v_k^N$ is the velocity along North direction, $v_k^U$ is the velocity along Up vertical direction, $p_k$ is the pitch angle, $r_k$ is the roll angle, and $A_k$ is the azimuth angle.

Since this is a total-state approach, the system model is the motion model itself, which is a nonlinear model as mentioned earlier, the output of this model is the navigation states of the module, such as position, velocity, and attitude. The state estimation or filtering technique estimates directly the navigation states themselves, so the estimated state vector by this state estimation or filtering technique is for the total states or the navigation states, and the system model is a total-state system model which transition the previous total-state to the current total-state. The traditional and commonly used navigation solutions uses a linearized error-state system model (to be used with KF-based solutions), but the work in this example uses a nonlinear total-state model to avoid the linearization and approximation.

The nonlinear total-state system model (also called state transition model) is given by $$x_k = f(x_{k-1}, u_{k-1}, w_{k-1})$$

where $u_{k-1}$ is the control input which is the inertial sensors readings that correspond to transforming the state from time epoch k−1 to time epoch k, this will be the convention used in this explanation for the sensor readings just used for nomenclature purposes. Furthermore, $w_k$ is the process noise which is independent of the past and present states and accounts for the uncertainty in the platform motion and the control inputs. The measurement model is $$z_k = h(x_k, v_k)$$

where $v_k$ is the measurement noise which is independent of the past and current states and the process noise and accounts for uncertainty in GNSS readings.

As discussed earlier, the basic PF which is the SIR PF have some shortcomings. In the prediction phase, the SIR PF samples from the system model, which does not depend on the last observation. In MEMS-based INS/GNSS integration, the sampling based on the system model, which depends on inertial sensor readings as control inputs, makes the SIR PF suffers from poor performance because with more drift this sampling operation will not produce enough samples in regions where the true PDF of the state is large, especially in the case of MEMS-based sensors. Because of the limitation of the SIR PF, it has to use a very large number of samples to assure good coverage of the state space, thus making it computationally expensive. Mixture PF is one of the variants of PF that aim to overcome this limitation of SIR and to use much less number of samples while not sacrificing the performance. The much lower number of samples makes Mixture PF applicable in real time.

As described above, in the SIR PF the samples are predicted from the system model, and then the most recent observation is used to adjust the importance weights of this prediction. The Mixture PF adds to the samples predicted from the system model some samples predicted from the most recent observation. The importance weights of these new samples are adjusted according to the probability that they came from the samples of the last iteration and the latest control inputs.

For the application at hand, in the sampling phase of the Mixture PF used in the present embodiment proposed in this example, some samples predicted according to the most recent observation are added to those samples predicted according to the system model. The most recent observation is used to adjust the importance weights of the samples predicted according to the system model. The importance weights of the additional samples predicted according to the most recent observation are adjusted according to the probability that they were generated from the samples of the last iteration and the system model with latest control inputs. When GNSS signal is not available, only samples based on the system model are used, but when GNSS is available both types of samples are used which gives better performance and thus leads to a better performance during GNSS outages. Also adding the samples from GNSS observation leads to faster recovery to true position after GNSS outages.

A set of common reference frames is used in this example for demonstration purposes, other definitions of reference frames may be used. The body frame of the vehicle has the X-axis along the transversal direction, Y-axis along the forward longitudinal direction, and Z-axis along the vertical direction of the vehicle completing a right-handed system. The local-level frame is the ENU frame that has axes along East, North, and vertical (Up) directions. The inertial frame is Earth-centered inertial frame (ECI) centered at the center of mass of the Earth and whose the Z-axis is the axis of rotation of the Earth. The Earth-centered Earth-fixed (ECEF) frame has the same origin and z-axis as the ECI frame but it rotates with the Earth (hence the name Earth-fixed).

The System Model

The system model is the state transition model, since this is a total state system model, this system model transition from the total state of the previous iteration k−1 to the total state of the current iteration k.

Before describing the system model utilized in the present example, the control inputs are first introduced. The measurement provided by the IMU is the control input; $u_{k-1} = [f_{k-1}^x, f_{k-1}^y, f_{k-1}^z, \omega_{k-1}^x, \omega_{k-1}^y, \omega_{k-1}^z]^T$ where $f_{k-1}^x$, $f_{k-1}^y$, and $f_{k-1}^z$ are the readings of the accelerometer triad, and $\omega_{k-1}^x$, $\omega_{k-1}^y$, and $\omega_{k-1}^z$ are the readings of the gyroscope triad. As mentioned earlier these are the sensors' readings that correspond to transforming the state from time epoch k−1 to time epoch k, this is the convention used in this explanation for the sensor readings just used for nomenclature purposes.

To describe the system model utilized in the present example, which is the nonlinear total-state system model, the total state vector has to be described first. The state consist of the navigation states themselves, and the errors in the sensors readings (i.e. the errors in the control input). The navigation states are $[\phi_k, \lambda_k, h_k, v_k^E, v_k^N, v_k^U, p_k, r_k, A_k]^T$, which are the latitude, longitude, altitude, velocity along East, North, and Up directions, pitch, roll, and azimuth, respectively. The errors associated with the different control inputs (the sensors' errors): $[\delta f_k^x \; \delta f_k^y \; \delta f_k^z \; \delta \omega_k^x \; \delta \omega_k^y \; \delta \omega_k^z]^T$ where $\delta f_k^x$, $\delta f_k^y$, and $\delta f_k^z$ are the stochastic errors in accelerometers readings, and $\delta \omega_k^x$, $\delta \omega_k^y$, and $\delta \omega_k^z$ are the stochastic errors in gyroscopes readings.

The rotation matrix that transforms from the vehicle body frame to the local-level frame at time k−1 is $$R_{b,k-1}^r = \begin{bmatrix} \cos A_{k-1} \cos r_{k-1} + \sin A_{k-1} \sin p_{k-1} \sin r_{k-1} & \sin A_{k-1} \cos p_{k-1} & \cos A_{k-1} \sin r_{k-1} - \sin A_{k-1} \sin p_{k-1} \cos r_{k-1} \\ -\sin A_{k-1} \cos r_{k-1} + \cos A_{k-1} \sin p_{k-1} \sin r_{k-1} & \cos A_{k-1} \cos p_{k-1} & -\sin A_{k-1} \sin r_{k-1} - \cos A_{k-1} \sin p_{k-1} \cos r_{k-1} \\ -\cos p_{k-1} \sin r_{k-1} & \sin p_{k-1} & \cos p_{k-1} \cos r_{k-1} \end{bmatrix}$$

Modeling the Sensors' Errors

A system model for the sensors' errors may be used. For example the traditional model for these sensors errors in the literature, is the first order Gauss Markov model, which can be used here, but other models as well can be used. For example, a higher order Auto-Regressive (AR) model to model the drift in each one of the inertial sensors may be used and is demonstrated here. The general equation of the AR model of order p is in the form $$y_k = -\sum_{n=1}^{p} \alpha_n y_{k-n} + \beta_0 \omega_k$$

where $\omega_k$ is white noise which is the input to the AR model, $y_k$ is the output of the AR model, the $\alpha$'s and $\beta$ are the parameters of the model. It should be noted that such a higher order AR model is difficult to use with KF, despite the fact that it is a linear model. This is because for each inertial sensor error to be modeled the state vector has to be augmented with a number of elements equal to the order of the AR model (which is 120). Consequently, the covariance matrix, and other matrices used by the KF will increase drastically in size (an increase of 120 in rows and an increase of 120 in columns for each inertial sensor), which make this difficult to realize.

In general, if the stochastic gyroscope drift is modeled by any model such as for example Gauss Markov (GM), or AR, in the system model, the state vector has to be augmented accordingly. The normal way of doing this augmentation will lead to, for example in the case of AR with order 120, the addition of 120 states to the state vector. Since this will introduce a lot of computational overhead and will require an increase in the number of used particles, another approach is used in this work. The flexibility of the models used by PF was exploited together with an approximation that experimentally proved to work well. The state vector in PF is augmented by only one state for the gyroscope drift. So at the k-th iteration, all the values of the gyroscope drift state in the particle population of iteration k−1 will be propagated as usual, but for the other previous drift values from k−120 to k−2, only the mean of the estimated drift will be used and propagated. This implementation makes the use of higher order models possible without adding a lot of computational overhead. The experiments with Mixture PF demonstrated that this approximation is valid.

If 120 states were added to the state vector, i.e. all the previous gyroscope drift states in all the particles of the population of iteration k−120 to k−1 were to be used in the k-th iteration, then the computational overhead would have been very high. Furthermore, when the state vector is large PF computational load is badly affected because a larger number of particles may be used. But this is not the case in this implementation because of the approximation discussed above.

The Attitude Equations

One possible way to calculate the attitude angles is to use quaternions through the following equations. The relation between the vector of quaternion parameters and the rotation matrix from body frame to local-level frame is as follows $$q_{k-1} = \begin{bmatrix} q_{k-1}^1 \\ q_{k-1}^2 \\ q_{k-1}^3 \\ q_{k-1}^4 \end{bmatrix} = \begin{bmatrix} 0.25\{R_{b,k-1}^l(3,2) - R_{b,k-1}^l(2,3)\}/q_{k-1}^4 \\ 0.25\{R_{b,k-1}^l(1,3) - R_{b,k-1}^l(3,1)\}/q_{k-1}^4 \\ 0.25\{R_{b,k-1}^l(2,1) - R_{b,k-1}^l(1,2)\}/q_{k-1}^4 \\ 0.5\sqrt{1 + R_{b,k-1}^l(1,1) + R_{b,k-1}^l(2,2) + R_{b,k-1}^l(3,3)} \end{bmatrix}$$

The three gyroscopes readings should be compensated for the stochastic errors as well as the Earth rotation rate and the change in orientation of the local-level frame. The latter two are monitored by the gyroscope and form a part of the readings, so they have to be removed in order to get the actual turn. These angular rates are assumed to be constant in the interval between time steps k−1 and k and they are integrated over time to give $$\begin{bmatrix} \theta_x \\ \theta_y \\ \theta_z \end{bmatrix} = \begin{bmatrix} \omega_{k-1}^x \\ \omega_{k-1}^y \\ \omega_{k-1}^z \end{bmatrix} \Delta t - (R_{b,k-1}^e)^T \begin{bmatrix} \dfrac{-v_{k-1}^N}{R_{M,k-1} + h_{k-1}} \\ \omega^e \cos \varphi_{k-1} + \dfrac{v_{k-1}^E}{R_{N,k-1} + h_{k-1}} \\ \omega^e \sin \varphi_{k-1} + \dfrac{v_{k-1}^E \tan \varphi_{k-1}}{R_{N,k-1} + h_{k-1}} \end{bmatrix} \Delta t$$

where $\omega^e$ is the Earth rotation rate, $R_M$ is the Meridian radius of curvature of the Earth's reference ellipsoid and is given by $$R_{M,k-1} = \frac{a(1-e^2)}{(1-e^2 \sin^2(\varphi_{k-1}))^{3/2}}$$

$R_N$ is the normal radius of curvature of the Earth's reference ellipsoid and is given by $$R_{N,k-1} = \frac{a}{(1-e^2 \sin^2(\varphi_{k-1}))^{1/2}}$$

Δt is the sampling time, a is the semimajor axis (equatorial radius) of a Meridian ellipse of the Earth's ellipsoid a=6,378,137.0 m, e is the eccentricity $$e = \sqrt{\frac{a^2 - b^2}{a^2}} = \sqrt{f(2-f)} = 0.08181919,$$

b is the semiminor axis of a Meridian ellipse of the Earth's ellipsoid b=a(1−f)=6356752.3142 m and f is the flatness $$f = \frac{a-b}{a} = 0.00335281.$$

The quaternion parameters are propagated with time as follows $$q_k = \begin{bmatrix} q_k^1 \\ q_k^2 \\ q_k^3 \\ q_k^4 \end{bmatrix} = \begin{bmatrix} q_{k-1}^1 \\ q_{k-1}^2 \\ q_{k-1}^3 \\ q_{k-1}^4 \end{bmatrix} + \frac{1}{2} \begin{bmatrix} 0 & \theta_z & -\theta_y & \theta_x \\ -\theta_z & 0 & \theta_x & \theta_y \\ \theta_y & -\theta_x & 0 & \theta_z \\ -\theta_x & -\theta_y & -\theta_z & 0 \end{bmatrix} \begin{bmatrix} q_{k-1}^1 \\ q_{k-1}^2 \\ q_{k-1}^3 \\ q_{k-1}^4 \end{bmatrix}$$

The definition of the quaternion parameters implies that $$(q_k^1)^2 + (q_k^2)^2 + (q_k^3)^2 + (q_k^4)^2 = 1$$

Due to computational errors, the above equality may be violated. To compensate for this, the following special normalization procedure is performed. If the following error exists after the computation of the quaternion parameters $$\Delta = 1 - ((q_k^1)^2 + (q_k^2)^2 + (q_k^3)^2 + (q_k^4)^2)$$

then the vector of quaternion parameters should be updated as follows $$q_k = \frac{q_k}{\sqrt{1-\Delta}}$$

The new rotation matrix from body frame to local-level frame is computed as follows $$R_{b,k}^l = \begin{bmatrix} R_{b,k}^l(1,1) & R_{b,k}^l(1,2) & R_{b,k}^l(1,3) \\ R_{b,k}^l(2,1) & R_{b,k}^l(2,2) & R_{b,k}^l(2,3) \\ R_{b,k}^l(3,1) & R_{b,k}^l(3,2) & R_{b,k}^l(3,3) \end{bmatrix} =$$

$$\begin{bmatrix} (q_k^1)^2 - (q_k^2)^2 - (q_k^3)^2 + (q_k^4)^2 & 2(q_k^1 q_k^2 - q_k^3 q_k^4) & 2(q_k^1 q_k^3 + q_k^2 q_k^4) \\ 2(q_k^1 q_k^2 + q_k^3 q_k^4) & (q_k^2)^2 - (q_k^1)^2 - (q_k^3)^2 + (q_k^4)^2 & 2(q_k^2 q_k^3 - q_k^1 q_k^4) \\ 2(q_k^1 q_k^3 - q_k^2 q_k^4) & 2(q_k^2 q_k^3 + q_k^1 q_k^4) & (q_k^3)^2 - (q_k^1)^2 - (q_k^2)^2 + (q_k^4)^2 \end{bmatrix}$$

The attitude angles are obtained from this rotation matrix as follows $$p_k = \tan^{-1}\left(\frac{R_{b,k}^l(3,2)}{\sqrt{(R_{b,k}^l(1,2))^2 + (R_{b,k}^l(2,2))^2}}\right)$$

$$r_k = \tan^{-1}\left(\frac{-R_{b,k}^l(3,1)}{R_{b,k}^l(3,3)}\right)$$

$$A_k = \tan^{-1}\left(\frac{R_{b,k}^l(1,2)}{R_{b,k}^l(2,2)}\right)$$

Another solution for attitude angles calculation is as follows:

The skew symmetric matrix of the angle increments corresponding to the rotation vector from the local-level frame to the body frame depicted in the body frame is calculated as follows:

$$S_{lb,k}^b = \begin{bmatrix} 0 & -\theta_z & \theta_y \\ \theta_z & 0 & -\theta_x \\ -\theta_y & \theta_x & 0 \end{bmatrix}$$

The new $R_{b,k}^l$ matrix is calculated as follows:

$$R_{b,k}^l = (R_{b,k\_1}^l)\exp(S_{lb,k}^b)$$

where $\theta_k = \sqrt{(\theta_x)^2 + (\theta_y)^2 + (\theta_z)^2}$ and $\exp(S_{lb,k}^b)$ may be either the exponential of a matrix implemented numerically or may be calculated as follows:

$$\exp(S_{lb,k}^b) = I + S_{lb,k}^b\left(\frac{\sin\theta_k}{\theta_k}\right) + (S_{lb,k}^b)^2\left(\frac{1-\cos\theta_k}{(\theta_k)^2}\right)$$

The attitude angles are then obtained from this $R_{b,k}^l$ matrix as mentioned above.

the Position and Velocity Equations

The velocity is calculated as follows:

$$\begin{bmatrix} v_k^E \\ v_k^N \\ v_k^{Up} \end{bmatrix} = \begin{bmatrix} v_{k-1}^E \\ v_{k-1}^N \\ v_{k-1}^{Up} \end{bmatrix} + R_{b,k}^l \begin{bmatrix} f_{k-1}^x \\ f_{k-1}^y \\ f_{k-1}^z \end{bmatrix} \Delta t + \begin{bmatrix} 0 \\ 0 \\ -g_{k-1} \end{bmatrix}$$

$$\Delta t - \begin{bmatrix} 0 & -2\omega^e \sin\varphi_{k-1} - \frac{v_{k-1}^E \tan\varphi_{k-1}}{R_{N,k-1} + h_{k-1}} & 2\omega^e \cos\varphi_{k-1} + \frac{v_{k-1}^E}{R_{N,k-1} + h_{k-1}} \\ 2\omega^e \sin\varphi_{k-1} + \frac{v_{k-1}^E \tan\varphi_{k-1}}{R_{N,k-1} + k_{k-1}} & 0 & \frac{v_{k-1}^N}{R_{M,k-1} + h_{k-1}} \\ -2\omega^e \cos\varphi_{k-1} - \frac{v_{k-1}^E}{R_{N,k-1} + h_{k-1}} & \frac{-v_{k-1}^N}{R_{M,k-1} + h_{k-1}} & 0 \end{bmatrix} \begin{bmatrix} v_{k-1}^E \\ v_{k-1}^N \\ v_{k-1}^{Up} \end{bmatrix} \Delta t$$

where $g_k$ is the acceleration of the gravity, that may be calculated through a model, such as for example:

$$g_k = a_1(1 + a_2 \sin^2\phi_k + a_3 \sin^4\phi_k) + (a_4 + a_5 \sin^2\phi_k)h_k + a_6(h_k)^2$$

where, the coefficients $a_1$ through $a_6$ for Geographic Reference System (GRS) 1980 are defined as: $a_1$=9.7803267714 m/s$^2$; $a_2$=0.0052790414; $a_3$=0.0000232718;

$a_4=0.000003087691089$ $1/s^2$; $a_5=0.000000004397731$ $1/s^2$; $a_6=0.000000000000721$ $1/ms^2$.

One possible calculation for the latitude may be as follows:

$$\varphi_k = \varphi_{k-1} + \left.\frac{d\varphi}{dt}\right|_{k-1}\Delta t = \varphi_{k-1} + \frac{v^N_{k-1}}{R_{M,k-1}+h_{k-1}}\Delta t$$

Similarly, one possible calculation for the longitude may be expressed as:

$$\lambda_k = \lambda_{k-1} + \left.\frac{d\lambda}{dt}\right|_{k-1}\Delta t = \lambda_{k-1} + \frac{v^E_{k-1}}{(R_{N,k-1}+h_{k-1})\cos\varphi_{k-1}}\Delta t$$

One possible calculation for the altitude may be given by:

$$h_k = h_{k-1} + \left.\frac{dh}{dt}\right|_{k-1}\Delta t = h_{k-1} + v^{Up}_{k-1}\Delta t$$

In general, it has to be noted that the system model equations for attitude, velocity and position may be implemented differently, such as for example, using a better numerical integration technique for position. Furthermore, coning and sculling may be used to provide more precise navigation states output.

the Measurement Model in Case of Loosely-Coupled Integration

In case loosely-coupled integration is used, position and velocity updates are obtained from the GNSS receiver. Thus the measurements are given as $z_k=[\phi_k^{GPS} \lambda_k^{GPS} h_k^{GPS} v_k^{E,GPS} v_k^{N,GPS} v_k^{U,GPS}]^T$ which consists of the GNSS readings for the latitude, longitude, altitude, and velocity components along East, North, and Up directions respectively. The measurement model can therefore be given as:

$$z_k = \begin{bmatrix} z_k^\varphi \\ z_k^\lambda \\ z_k^h \\ z_k^{v_e} \\ z_k^{v_n} \\ z_k^{v_u} \end{bmatrix} = h(x_k, v_k) = \begin{bmatrix} \varphi_k^{GPS} \\ \lambda_k^{GPS} \\ h_k^{GPS} \\ v_k^{E,GPS} \\ v_k^{N,GPS} \\ v_k^{U,GPS} \end{bmatrix} + \begin{bmatrix} v_k^\varphi \\ v_k^\lambda \\ v_k^h \\ v_k^E \\ v_k^N \\ v_k^U \end{bmatrix}$$

where $v_k=[v_k^\phi v_k^\lambda v_k^h v_k^{v_e} v_k^{v_n} v_k^{v_u} v_k^p v_k^r]^T$ is the noise in the GNSS observations used for update.

Tightly-Coupled Integration

Augmenting the System Model

The system model can be augmented with two states, namely: the bias of the GPS receiver clock $b_r$, and its drift $d_r$. Both of these are modeled as follows:

$$\begin{bmatrix} b_r \\ \dot{d}_r \end{bmatrix} = \begin{bmatrix} d_r + w_b \\ w_d \end{bmatrix}$$

where $w_b$ and $w_d$ are the noise terms In discrete form it can be written as:

$$\begin{bmatrix} b_{r,k} \\ d_{r,k} \end{bmatrix} = \begin{bmatrix} b_{r,k-1} + (d_{r,k-1} + w_{b,k-1})\Delta t \\ d_{r,k-1} + w_{d,k-1}\Delta t \end{bmatrix}$$

where $\Delta t$ is the sampling time. This model is used as part of either the system model described earlier.

the Measurement Model in Case of Tightly-Coupled Integration

In this example, since this is a total state solution, the measurement model in the case of tightly-coupled integration is a nonlinear model that relates the GPS raw measurements (pseudorange measurements and pseudorange rates) at a time epoch k, $z_k$, to the states at time k, $x_k$, and the measurement noise $\epsilon_k$. First, the GPS raw measurements are $z_k=[\rho_{c,k}^{1,GPS} \ldots \rho_{c,k}^{M,GPS} \dot\rho_k^{1,GPS} \ldots \dot\rho_k^{M,GPS}]^T$ for M visible satellites. The nonlinear measurement model for tightly-coupled integration can be in the form:

$$z_k = h(x_k, \epsilon_k)$$

where $$\epsilon_k[\tilde\epsilon_{\rho,k}^1 \ldots \tilde\epsilon_{\rho,k}^M \tilde\epsilon_{\dot\rho,k}^1 \ldots \tilde\epsilon_{\dot\rho,k}^M]^T$$

The part of the measurement model for the pseudoranges is:

$$\begin{bmatrix} \rho_{c,k}^{1,GPS} \\ \vdots \\ \rho_{c,k}^{M,GPS} \end{bmatrix} = \begin{bmatrix} \sqrt{(x_k-x_k^1)^2+(y_k-y_k^1)^2+(z_k-z_k^1)^2}+b_{r,k}+\tilde\epsilon_\rho^1 \\ \vdots \\ \sqrt{(x_k-x_k^M)^2+(y_k-y_k^M)^2+(z_k-z_k^M)^2}+b_{r,k}+\tilde\epsilon_\rho^M \end{bmatrix}$$

where the receiver position is $$x_k = \begin{bmatrix} x_k \\ y_k \\ z_k \end{bmatrix} = \begin{bmatrix} (R_{N,k}+h_k)\cos\varphi_k\cos\lambda_k \\ (R_{N,k}+h_k)\cos\varphi_k\sin\lambda_k \\ \{R_{N,k}(1-e^2)+h_k\}\sin\varphi_k \end{bmatrix}$$

and $x_k^m=[x_k^m y_k^m z_k^m]^T$ is the position of the $m^{th}$ satellite at the corrected transmission time but seen in the ECEF frame at the corrected reception time of the signal.

The part of the measurement model for the pseudorange rates is:

$$\begin{bmatrix} \dot\rho_k^{1,GPS} \\ \vdots \\ \dot\rho_k^{M,GPS} \end{bmatrix} =$$

$$\begin{bmatrix} 1_{x,k}^1 \cdot (v_{x,k}-v_{x,k}^1) + 1_{y,k}^1 \cdot (v_{y,k}-v_{y,k}^1) + 1_{z,k}^1 \cdot (v_{z,k}-v_{z,k}^1) + d_{r,k} + \varepsilon_{\dot\rho}^1 \\ \vdots \\ 1_{x,k}^M \cdot (v_{x,k}-v_{x,k}^M) + 1_{y,k}^M \cdot (v_{y,k}-v_{y,k}^M) + 1_{z,k}^M \cdot (v_{z,k}-v_{z,k}^M) + d_{r,k} + \varepsilon_{\dot\rho}^M \end{bmatrix}$$

where $v^m=[v_x^m, v_y^m, v_z^m]$ is the $m^{th}$ satellite velocity in the ECEF frame, and $v=[v_x, v_y, v_z]$ is the true receiver velocity in the ECEF frame and thus:

$$\begin{bmatrix} v_{x,k} \\ v_{y,k} \\ v_{z,k} \end{bmatrix} = R_{L,k}^{e,Mech} \begin{bmatrix} v_{e,k} \\ v_{n,k} \\ v_{u,k} \end{bmatrix} = \begin{bmatrix} -\sin\lambda_k & -\sin\varphi_k\cos\lambda_k & \cos\varphi_k\cos\lambda_k \\ \cos\lambda_k & -\sin\varphi_k\sin\lambda_k & \cos\varphi_k\sin\lambda_k \\ 0 & \cos\varphi_k & \sin\varphi_k \end{bmatrix} \begin{bmatrix} v_{e,k} \\ v_{n,k} \\ v_{u,k} \end{bmatrix}$$

Furthermore, the line of sight unit vector from $m^{th}$ satellite to receiver is expressed as follows:

$$1_k^m = \frac{[(x_k - x_k^m), (y_k - y_k^m), (z_k - z_k^m)]^T}{\sqrt{(x_k - x_k^m)^2 + (y_k - y_k^m)^2 + (z_k - z_k^m)^2}}$$

$$= [1_{x,k}^m, 1_{y,k}^m, 1_{z,k}^m]^T$$

where the receiver position is as defined above.

Derived Updates for the Inertial Sensors Errors

In this option, a standalone mechanization routine has to run, in a similar manner to the mechanization described in Example 1, whether in open loop or closed loop scheme. The aim of this option is to derive updates for some or all of the inertial sensors stochastic drift. These additional updates will be labelled $$\begin{bmatrix} z_k^{\delta f^x} & z_k^{\delta f^y} & z_k^{\delta f^z} & z_k^{\delta \omega^x} & z_k^{\delta \omega^y} & z_k^{\delta \omega^z} \end{bmatrix}^T.$$

One possible way, for example, of calculating these values that can be used for updating these sensors errors is the following.

First, The Meridian and normal radii of curvature of the Earth's ellipsoid are calculated for the mechanization version and the GPS version as follows:

$$R_{M,k}^{Mech} = \frac{a(1-e^2)}{(1 - e^2 \sin^2(\varphi_k^{Mech}))^{3/2}}$$

$$R_{N,k}^{Mech} = \frac{a}{(1 - e^2 \sin^2(\varphi_k^{Mech}))^{1/2}}$$

$$R_{M,k}^{GPS} = \frac{a(1-e^2)}{(1 - e^2 \sin^2(\varphi_k^{GPS}))^{3/2}}$$

$$R_{N,k}^{GPS} = \frac{a}{(1 - e^2 \sin^2(\varphi_k^{GPS}))^{1/2}}$$

$g_k$ is the acceleration of the gravity, that may be calculated through a model, such as for example what was mentioned earlier for $g_k^{Mech}$. Similarly the GPS version can be calculated as follows:

$$g_k^{GPS} = a_1(1 + a_2 \sin^2 \phi_k^{GPS} + a_3 \sin^4 \phi_k^{GPS}) + (a_4 + a_5 \sin^2 \phi_k^{GPS}) h_k^{GPS} + a_6 (h_k^{GPS})^2$$

where, the coefficients $a_1$ through $a_6$ for Geographic Reference System (GRS) 1980 are defined as: $a_1$=9.7803267714 m/s$^2$; $a_2$=0.0052790414; $a_3$=0.0000232718; $a_4$=−0.000003087691089 1/s$^2$; $a_5$=0.000000004397731 1/s$^2$; $a_6$=0.000000000000721 1/ms$^2$.

The $R_{b,k-1}^l$ from the estimated values from the filter (i.e. the corrected values) is $$R_{b,k-1}^{l,Corrected} =$$

$$\begin{bmatrix} \cos A_{k-1}\cos r_{k-1} + \sin A_{k-1}\sin p_{k-1}\sin r_{k-1} & \sin A_{k-1}\cos p_{k-1} & \cos A_{k-1}\sin r_{k-1} - \sin A_{k-1}\sin p_{k-1}\cos r_{k-1} \\ -\sin A_{k-1}\cos r_{k-1} + \cos A_{k-1}\sin p_{k-1}\sin r_{k-1} & \cos A_{k-1}\cos p_{k-1} & -\sin A_{k-1}\sin r_{k-1} - \cos A_{k-1}\sin p_{k-1}\cos r_{k-1} \\ -\cos p_{k-1}\sin r_{k-1} & \sin p_{k-1} & \cos p_{k-1}\cos r_{k-1} \end{bmatrix}$$

In the following it is assumed that the indices k and k−1, and the sampling time Δt are not at the high rate (i.e. the inertial sensors rate) but at the GPS rate (which can be for the sake of example only 1 Hz). The inertial sensors readings are averaged, to downsample them from their higher rate to the GPS rate.

The equation for velocities from mechanization is as shown in Appendix 2, equation (1).

The terms in the equation can be rearranged, so that the term containing the accelerometers readings is on the right hand side as shown in Appendix 2, equation (2).

Similar to the mechanization, the equation for velocities from GPS is as shown in Appendix 2, equation (3).

The terms in the equation can be rearranged, so that the term containing the accelerometers readings is on the right hand side as shown in Appendix 2, equation (4).

The measurement updates for the stochastic drift of the accelerometers are calculated as shown in Appendix 2, equation (5).

To obtain measurement updates for the gyroscopes stochastic drift, the following technique may be used.

First, using the following relationship:

$$R_{b,k}^{l,Corrected} = R_{b,k}^{l,Corrected} \exp(S_{lb,k}^{b,Corrected})$$

$S_{lb,k}^{b,Corrected}$ can be computed by an algorithm that calculates the natural logarithm of a matrix:

$$S_{lb,k}^{b,Corrected} = \text{len}(R_{b,k-1}^{l,Corrected})^T R_{b,k}^{l,Corrected})$$

An alternative solution is to use the following relation:

$$\exp(S_{lb,k}^{b,Corrected}) =$$

$$I + S_{lb,k}^{b,Corrected}\left(\frac{\sin\theta_k^{Corrected}}{\theta_k^{Corrected}}\right) + (S_{lb,k}^{b,Corrected})^2 \left(\frac{1 - \cos\theta_k^{Corrected}}{(\theta_k^{Corrected})^2}\right)$$

where $$S_{lb,k}^{b,Corrected} = \begin{bmatrix} 0 & -\theta_{lb,k}^{b,Corrected}(3) & \theta_{lb,k}^{b,Corrected}(2) \\ \theta_{lb,k}^{b,Corrected}(3) & 0 & -\theta_{lb,k}^{b,Corrected}(1) \\ -\theta_{lb,k}^{b,Correct}(2) & \theta_{lb,k}^{b,Corrected}(1) & 0 \end{bmatrix},$$

$$\theta_{lb,k}^{b,Corrected} = \begin{bmatrix} \theta_{lb,k}^{b,Corrected}(1) \\ \theta_{lb,k}^{b,Corrected}(2) \\ \theta_{lb,k}^{b,Corrected}(3) \end{bmatrix} \text{ and}$$

$$\theta_k^{Correct} = \sqrt{\left(\theta_{lb,k}^{b,Corrected}(1)\right)^2 + \left(\theta_{lb,k}^{b,Correct}(2)\right)^2 + \left(\theta_{lb,k}^{b,Corrected}(3)\right)^2}.$$

If the above-mentioned relation is used, one has:

$$\left(R_{b,k-1}^{l,Corrected}\right)^T R_{b,k}^{l,Corrected} = \exp(S_{lb,k}^{b,Corrected})$$

$$= I + S_{lb,k}^{b,Corrected}\left(\frac{\sin\theta_k^{Corrected}}{\theta_k^{Corrected}}\right) +$$

$$(S_{lb,k}^{b,Corrected})^2\left(\frac{1 - \cos\theta_k^{Corrected}}{(\theta_k^{Corrected})^2}\right)$$

This relation can be used to solve for $\theta_{lb,k}^{b,Correct}(1)$, $\theta_{lb,k}^{b,Correct}(2), \theta_{lb,k}^{b,Correct}(3)$.

By either of the above alternatives, $S_{lb,k}^{b,Corrected}$ and $\theta_{lb,k}^{b,Corrected}$ are now computed.

Thus, $$\omega_{lb,k}^{b,Corrected} = \frac{1}{\Delta t}\left(\theta_{lb,k}^{b,Corrected}\right)$$

And consequently $$\delta\omega_{lb,k}^{b} = \omega_{lb,k}^{b,Mech} - \omega_{lb,k}^{b,Corrected}.$$

The rotation vector from the inertial frame to the local-level frame depicted in the local-level frame from the mechanization is given as follows:

$$\omega_{il,k}^{l,Mech} = \omega_{ie,k}^{l,Mech} + \omega_{el,k}^{l,Mech} = \begin{bmatrix} 0 \\ \omega^e \cos(\varphi_k^{Mech}) \\ \omega^e \sin(\varphi_k^{Mech}) \end{bmatrix} + \begin{bmatrix} \frac{-v_k^{N,Mech}}{R_{M,k}^{Mech} + h_k^{Mech}} \\ \frac{v_k^{E,Mech}}{(R_{N,k}^{Mech} + h_k^{Mech})} \\ \frac{v_k^{E,Mech}\tan(\varphi_k^{Mech})}{(R_{N,k}^{Mech} + h_k^{Mech})} \end{bmatrix}$$

The rotation vector from the inertial frame to the local-level frame depicted in the body frame of the device from the mechanization is given as follows:

$$\omega_{il,k}^{b,Mech} = R_{l,k}^{b,Mech}\omega_{il,k}^{l,Mech} = (R_{b,k}^{l,Mech})^T \omega_{il,k}^{l,Mech}$$

The rotation vector from the inertial frame to the local-level frame depicted in the local-level frame from GPS is given as follows:

$$\omega_{il,k}^{l,GPS} = \omega_{ie,k}^{l,GPS} + \omega_{el,k}^{l,GPS} = \begin{bmatrix} 0 \\ \omega^e \cos(\varphi_k^{GPS}) \\ \omega^e \sin(\varphi_k^{GPS}) \end{bmatrix} + \begin{bmatrix} \frac{-v_k^{N,GPS}}{R_{M,k}^{GPS} + h_k^{GPS}} \\ \frac{v_k^{E,Mech}}{(R_{N,k}^{GPS} + h_k^{GPS})} \\ \frac{v_k^{E,GPS}\tan(\varphi_k^{GPS})}{(R_{N,k}^{GPS} + h_k^{GPS})} \end{bmatrix}$$

The rotation vector from the inertial frame to the local-level frame depicted in the body frame of the device from GPS is given as follows:

$$\omega_{il,k}^{b,GPS} = R_{l,k}^{b,Correced}\omega_{il,k}^{l,GPS} = (R_{b,k}^{l,Corrected})^T \omega_{il,k}^{l,GPS}$$

The error in the rotation vector from the inertial frame to the local-level frame depicted in the body frame is calculated as follows:

$$\delta\omega_{il,k}^{b} = \omega_{il,k}^{b,Mech} - \omega_{il,k}^{b,GPS}$$

The measurement updates for the stochastic drift of the gyroscopes are calculated as follows:

$$\begin{bmatrix} z_k^{\delta\omega^x} \\ z_k^{\delta\omega^y} \\ z_k^{\delta\omega^z} \end{bmatrix} = \delta\omega_{ik,k}^{b} = \delta\omega_{il,k}^{b} + \delta\omega_{lb,k}^{b}$$

Optional Automatic Detection of GNSS Degraded Performance in Case of Loosely-Coupled Integration An optional technique may be used for automatic assessment of GNSS information used for loosely-coupled integration and consequently detection of degraded performance. One of the criteria used in the checking of GNSS degraded performance is the number of satellites. If the number of satellites visible to receiver is four or more, the GPS reading passes the first check. The second check is using the standard deviation and/or the dilution of precision (DOP) of the calculated position solution by the GNSS receiver. In case of DOP, both the horizontal DOP (HDOP) and vertical DOP (VDOP) are used. Despite these two checks, some GNSS readings with degraded performance (especially because of some reflected signals reaching the receiver and not the original signal because of loss of direct line-of-sight between some satellites and the receiver) may still find their way to update the filter and can jeopardize its performance. Thus further checks have to be used.

Since this is an integrated solution, the estimation from Mixture PF with robust modeling is exploited to assess GNSS position and velocity observations. Furthermore motion constraints on the moving device may be exploited as well, when applicable, in connection with the sensors readings. The GNSS checks include GNSS horizontal position checking, GNSS altitude checking, GNSS azimuth update checking (only if azimuth update is applicable), and GNSS updates for the stochastic errors of inertial sensors.

Only in applications where the device heading is the same as the moving platform heading, azimuth update from GNSS may be used. In such case, some of the checks are for azimuth update from GNSS velocities. This update is not used unless the system is in motion. Furthermore, to have an azimuth update, the checks are tighter from those of position because the azimuth calculated from GNSS is a sensitive quantity. If the check is not met, azimuth update from GNSS is not performed.

In case another source of speed or velocity other than GNSS is used, it might be used to assess both GNSS position and velocity updates.

In case of pedestrian mode detected, such as in Example 3, acceptable stride lengths with tolerance may be used to assess both GNSS position and velocity updates.

In the case a barometer is available, its calculated altitude can also be used to assess the GNSS altitude.

For the check for the update of the inertial sensors' errors, if the device is in motion, GNSS might be used for this update depending on further checking; if the device is stationary, this fact is also exploited to update the inertial sensors errors even without GNSS. Since these updates from GNSS are sensitive, the checks are much tighter than those for position updates.

Hybrid Loosely/Tightly Coupled Scheme

The proposed navigation module may adopt a hybrid loosely/tightly coupled solution and attempts to take advantage of the updates of the inertial sensors drift from GNSS when suitable, which rely on loosely-coupled updates from GNSS (since they rely in their calculations on GNSS position and velocity readings), as well as the benefits of tightly-coupled integration. Another advantage of loosely coupled that the hybrid solution may benefit from is the GNSS-derived heading update relying on GNSS velocity readings when in motion (this update is only applicable if misalignment was resolved or there is no misalignment in a certain application).

When the availability and the quality of GNSS position and velocity readings passes the assessment, loosely-coupled measurement update is performed for position, velocity, possibly azimuth (when applicable as discussed earlier), and inertial sensors' stochastic errors. Each update can be performed according to its own quality assessment of the update. Whenever the testing procedure detects degraded GNSS performance either because the visible satellite number falls below four or because the GNSS quality examination failed, the filter can switch to a tightly-coupled update mode. Furthermore, each satellite can be assessed independently of the others to check whether it is adequate to use it for update. This check again may exploit improved performance of the Mixture PF with the robust modeling. Thus the pseudorange estimate for each visible satellite to the receiver position estimated from the prediction phase of the Mixture PF can be compared to the measured one. If the measured pseudorange of a certain satellite is too far off, this is an indication of degradation (e.g. the presence of reflections with loss of direct line-of-sight), and this satellite's measurements can be discarded, while other satellites can be used for the update.

Example 3

Different Modes of Conveyance

In this example, the present navigation module may operate to determine a 3D navigation solution by calculating position, velocity and attitude of a moving platform, wherein the module is operating as in Example 1 or as in Example 2, while a routine for detecting the mode in which the system is operating whether walking mode (i.e. the moving platform is a person) or driving mode (the moving platform is a vehicle).

The mode of conveyance algorithm uses inertial sensors readings and may use also magnetometer and barometer signals (if they are available) to determine the physical state of the sensor module, i.e., if the module is carried by a person or inside a land vehicle. By way of example, mode of transit can be determined by using fast fourier transform (FFT) with appropriate thresholding on the sensor signals. Other techniques such as artificial intelligence methods or other classification methods may also be implemented for mode detection. Furthermore, different features may be used such as for example, mean and variance of the sensors signals, FFT as mentioned earlier, or other features or feature extraction techniques.

If in driving mode the system may use the speed of the platform either calculated from GNSS velocity readings or provided by another sensor or system connected to the navigation module via a wired or wireless connection for one or more of different usages, such as: (i) decoupling the actual motion from the accelerometers readings to obtain better estimates of pitch and roll, because after the decoupling the remaining accelerometers will be measuring mainly components of gravity. For this purpose the accelerometer readings has to be downsampled (for example by averaging) to be at the rate where the other source of speed or velocity readings is. (ii) detecting misalignment of the device with respect to the moving platform as will be discussed in Example 4.

If in driving mode, and if speed or velocity readings are available from another sensor or system (such as for example odometer or wheel encoder) connected to the navigation module via a wired or wireless connection for one or more of different usages, such as: (i) deriving and/or providing velocity updates for the solution; (ii) vehicular dead reckoning may be applied if misalignment between device and platform (as discussed in Example 4) was resolved or in applications with no misalignment; (iii) if the application has a misalignment and it was not resolved, the forward and normal accelerations of the moving platform can be derived from this relative speed or velocity of the platform and the heading rate (for example from gyroscope), and these synthetic accelerations are used together with correlation techniques with the accelerometer readings to calculate the misalignment between the portable device (i.e. accelerometer triad) and the moving platform; (iv) if the misalignment was resolved or there is no misalignment in the application at hand, the relative speed or velocity of the platform can be used to decouple the platform motion from the accelerometers readings to obtain the device pitch and roll.

If walking mode is detected, PDR can be used and its solution can be integrated with the main navigation solution by either: using it as measurement update, using least square to combine the two solutions, or using any other integration technique to combine them. PDR takes as input the heading of the platform (which is here a person) and the stride length and calculate a new 2D position of the person based on the his last 2D position through the following equations:

$$\varphi_k = \varphi_{k-1} + \frac{SL_k * \cos(A_k^{person})}{(R_{M,k-1} + h_{k-1})}$$

$$\lambda_k = \lambda_{k-1} + \frac{SL_k * \sin(A_k^{person})}{(R_{N,k-1} + h_{k-1})\cos(\varphi_{k-1})}$$

where $SL_k$ is the stride length between time epoch k−1 and k, and $A_k^{person}$ is the person heading, and the time epoch denoted by index k are at the rate of the PDR.

If in walking mode, the accelerometers' readings are averaged either by a fixed time average (to provide lower rate downsampled accelerometers readings) or a moving average. The averaging operations decrease the noise and suppress the dynamics, so that the averaged accelerometers readings will be measuring mainly components of gravity, and they are used to estimate pitch and roll. These pitch and roll estimates whether in driving or walking modes may be used as extra measurement updates during GNSS availability and/or during GNSS outages.

To give more details on the pitch and roll calculation from accelerometers, the following is presented. In case of pedestrian (walking mode) or stationary, if three accelerometers along the X, Y, and Z directions are utilized and are downsampled (by averaging as mentioned above), the pitch and the roll angles can be calculated as follows:

$$p = \tan^{-1}\left(\frac{f^y}{\sqrt{(f^x)^2 + (f^z)^2}}\right)$$

$$r = \tan^{-1}\left(\frac{-f^x}{f^z}\right)$$

In case of driving mode and the device is not stationary and either GNSS or the optional source of speed or velocity readings (such as for example odometer) is available (sent wired or wirelessly to the module) and in case mounting misalignment is resolved (using technique such as those in Example 4) or there is no misalignment in a certain application, then the motion obtained from these sources may be decoupled from the accelerometer readings, so that the remaining quantity measured by these accelerometers are components of gravity, which enables the calculation of pitch and roll as follows:

$$p = \tan^{-1}\left(\frac{f^y - Acc}{\sqrt{(f^x - \text{Speed} \cdot \omega^z)^2 + (f^z)^2}}\right)$$

$$r = \tan^{-1}\left(\frac{-(f^x - \text{Speed} \cdot \omega^z)}{f^z}\right)$$

where the speed and acceleration derived from form GNSS or other source are labelled Speed and Acc.

In case of driving, where the device is not stationary, either GNSS-derived speed or the optional source of speed or velocity readings (such as for example odometer) are available, and the heading misalignment is resolved (in application that can have changing misalignment between the device and platform), then pitch and roll of the device (or pitch and roll misalignments) can be obtained as per the following. The forward and normal accelerations of the moving platform can be derived from the speed or velocity of the platform. One possible way to obtain these accelerations is as follows: the forward acceleration of the platform is the time derivative of the forward speed of the platform, the normal or lateral acceleration is the negative of the product of the forward speed and the counterclockwise turning rate of the vehicle which can be obtained, for example, from gyroscopes. The pitch and roll of the moving platform are used to transform the synthetic accelerations to the local level frame; for platforms such as land vehicle the pitch and roll values are near zeros and this step may be skipped. Then the gravity acceleration from a gravity model (such as for example what was described in Example 1 and Example 2) is added to the vertical channel to get specific forces in the local level frame. Different candidate pitch and roll of the device are calculated to cover the ranges of these unknown angles in a manner similar to what is described in Example 4 for the candidate heading misalignments. The candidate pitch and roll of the device, and the resolved heading misalignment between the device and platform are used to transform these specific forces to the device frame. These specific forces in the device frame are compared to the measured specific forces by the accelerometers in the device (or from a down-sampled or averaged version of these latter to have the same rate as the former). The comparisons can be achieved by means of mathematical operations such as but not limited to cross correlation or differencing of the two accelerations. The technique is achieved and stopped in a similar manner to the technique explained in Example 4.

In case of driving, the device is not stationary, and neither GNSS nor the optional source of speed or velocity readings (such as for example odometer) are available, then a relatively longer time averaging may be used on the accelerometer readings to suppress the motion components, then the above formulas without the decoupling may be used with the averaged accelerometers data to give an idea about pitch and roll. The pitch and roll obtained through this averaging during driving and in motion are not accurate, but they can give a general idea about pitch and roll especially in cases where the device can have any misalignment without constraints with respect to the moving platform. The length of the time frame used for averaging may depend on the application.

In general, the benefits of calculating pitch and roll as described above:
1. The roll and pitch information may be used as measurement update in the state estimation technique which benefits the navigation solution especially in case of portable devices as follows:
   a. No drift in Roll/Pitch because there is no mathematical integration operation involved in calculating them from accelerometers.
   b. This will lead consequently to less drift in velocity
   c. And subsequently to less drift in position
   d. Furthermore better pitch and roll estimates will lead to better heading estimation
2. The roll and pitch calculated from accelerometers may also be used to "pull back" the 3D gyroscopes and the optional 3D magnetometer to get a levelled synthetic gyroscope and magnetometer readings in a local level frame. These pulled back synthetic readings may be used to get heading which can be either:
   a. Combined with the 3D accelerometers to provide a navigation solution.
   b. In case misalignment is resolved (as in Example 4) or there is no misalignment in a certain application: to get heading for PDR in case of walking mode or for vehicular dead reckoning in case of driving mode.

Example 4

Misalignment Detection and Estimation

In this example, the present navigation module may optionally be programmed to operate a misalignment procedure, which calculates the relative orientation between the coordinate frame of the sensor assembly (i.e. device frame) and the coordinate frame of the moving platform within which the device is either tethered or moving freely without constraints. This misalignment detection and estimation is intended to enhance the navigation solution. This will be extremely useful in case of portable navigation devices, especially if they move freely without constraints within another moving platform.

Initial Misalignment Estimation Module with Absolute Velocity Updates

The device heading can be different than the heading of the platform and to get a navigation solution for the platform and/or device (processed on the device) with accuracy, the navigation algorithm should have the information about the misalignment as well as the absolute attitude of the platform. In this case, the absolute heading of the platform is known from the absolute velocity updates from a receiver such as a GNSS receiver, however, the unknown misalignment makes certain navigational constraints impossible to apply.

In order to calculate the portable device heading from gyroscopes an initial heading of the device has to be known. If an absolute velocity source (such as from GNSS) is not available (for example because of interruption) but a magnetometer is available and with adequate readings, it will be used to get the initial device heading. If an absolute velocity source is available and if a magnetometer is not available or not with adequate readings, the velocity source will be used to get the initial heading of the moving platform, and a routine is run to get the initial heading misalignment of the portable device with respect to the moving platform (which is described below), then the initial device heading can be obtained. If an absolute velocity source is available and if a magnetometer is available and with adequate readings, a blended version of the initial device heading calculated from the above two options can be formed.

This section is aimed at explaining the routine to get the initial heading misalignment of the portable device with respect to the moving platform if an absolute velocity source is available (such as GNSS). This routine needs: (i) a very first heading of the platform (person or vehicle or other) that can be obtained from the source of absolute velocity provided that the device is not stationary, (ii) the source of absolute velocity to be available for a short duration such as for example about 5 seconds, but there are no constraints on user motion during this period.

The procedure of this routine is to use the absolute velocity in the local level frame to generate acceleration in the local level frame, add gravity acceleration from a gravity model, then use the pitch and roll together with different heading values (device heading corrected for different heading misalignment values) to calculate the accelerations (more literally the specific forces) in the estimated sensor frame. The different heading misalignments are first chosen to cover all the 360 degrees ambiguity. The actual accelerometer readings, after being corrected for the sensor errors (such as biases, scale factors and non-orthogonalities), are compared to all the different calculated ones (example of techniques that can be used here are correlation techniques). A best sector of possible heading misalignments is chosen and divided into more candidates of heading misalignment in this sector. Different accelerations in the estimated sensor frame are generated and again compared to the actual sensor readings. The operation continues either until the accuracy of the solution saturates and no longer improves or until a pre-chosen depth of comparisons is received.

As mentioned above, if an absolute velocity source (such as from GNSS) is not available (for example because of interruption) but a magnetometer is available and with adequate readings, it will be used to get the initial device heading. If an absolute velocity source is available and if a magnetometer is not available or not with adequate readings, the velocity source will be used to get the initial heading of the moving platform when it starts moving as follows:

$$A_k^{platform} = a\tan 2(v k^e, v_k^n)$$

Where k in general is the time index of the absolute velocity readings, and for the first reading. A routine is run to get the initial heading misalignment of the portable device with respect to the moving platform $\Delta A_{initial}$ (this routine is described below), then the initial device heading is obtained as $$A_{initial}^{device} = A_{initial}^{platform} + \Delta A_{initial}$$

It has to be noted that heading misalignment can be defined either as the difference between the device heading and the platform heading or as the difference between the platform heading and the device heading. Here the former is used as the definition of misalignment.

Where a magnetometer is available and with adequate readings, a better blended version of the initial device heading calculated from both the initial misalignment technique described herein and from the magnetometer can be formed.

The routine needs:
1) The track of heading of the platform (person or vehicle or other) during a short period (such as for example, of about 5 seconds), but there are almost no constraints on platform motion during this period except that the platform cannot be stationary the whole period, but temporary static period is accepted. This heading can be obtained by either one of the following:
    i) the first heading of the platform that can be obtained from the source of absolute velocity provided that the platform is not stationary, this heading is followed (for example) by a gyroscope-based calculation of heading to keep track of the platform heading if the device misalignment with respect to the platform is kept near constant (might slightly change but does not undergo big changes).
    ii) the track of absolute heading of the platform might be obtained from the absolute source of velocity during the short period during which this routine will run. If during this period the platform stops temporarily the last heading is used for the temporary stop period.
2) the source of absolute velocity to be available for the same short period discussed above. This means that $v_k^e$, $v_k^n$, and $v_k^u$ have to be available during this short period, at whatever data rate this absolute source provides.

The first step of this routine is to use the absolute velocity in the local level frame to generate acceleration in the local level frame $$a_k^e = \frac{v_k^e - v_{k-1}^e}{\Delta t}$$

$$a_k^n = \frac{v_k^n - v_{k-1}^n}{\Delta t}$$

$$a_k^u = \frac{v_k^u - v_{k-1}^u}{\Delta t}$$

where $\Delta t$ is the sampling rate of the absolute velocity source. The next step is to add gravity acceleration from a gravity model to get specific forces in the local level frame $$\begin{bmatrix} f_k^e \\ f_k^n \\ f_k^u \end{bmatrix} = \begin{bmatrix} a_k^e \\ a_k^n \\ a_k^u \end{bmatrix} + \begin{bmatrix} 0 \\ 0 \\ g_k \end{bmatrix}$$

then use the pitch $p_k^{device}$ and roll $r_A^{device}$ together with different candidate device heading values (calculated from the platform heading corrected for different candidate heading misalignment values) to calculate the accelerations (more literally the specific forces) in the estimated candidate sensor frame. Different heading misalignments are first chosen to cover all the 360 degrees ambiguity, for example, if the heading space is divided equally to 8 options, the following misalignments are the possible candidates to use $$\Delta A^{candidate} \text{ one from } \left[ -pi \quad \frac{-3pi}{4} \quad \frac{-pi}{2} \quad \frac{-pi}{4} \quad 0 \quad \frac{pi}{4} \quad \frac{pi}{2} \quad \frac{3pi}{4} \right]$$

And the corresponding device headings (as per the earlier definition of misalignment) are:

$$A_k^{device} = A_k^{platform} + \Delta A^{candidate}$$

The rotation matrix from the device frame (i.e. the accelerometer frame) to the local level (ENU) frame is as shown in Appendix 3, equation (1) and one have the following relation:

$$\begin{bmatrix} f_k^{x,candidate} \\ f_k^{y,candidate} \\ f_k^{z,candidate} \end{bmatrix} = (R_{device,k}^l)^T \begin{bmatrix} f_k^e \\ f_k^n \\ f_k^u \end{bmatrix}$$

The actual accelerometers readings are $[f_j^x \; f_j^y \; f_j^z]^T$ where j is the timing index for the higher rate inertial readings (preferably these accelerometers readings are used after removal of the estimated sensor errors). These actual sensors readings are downsampled to the relatively lower rate of the absolute velocity readings, for example, either by averaging or by dropping of the extra samples. The downsampled version of these actual accelerometers readings are compared to all the different candidate accelerometer readings (example of comparison techniques that can be used here are correlation techniques some of which can be bias independent, differencing or calculating root mean squared (RMS) errors). A best sector of possible heading misalignments is chosen and divided into further candidates of heading misalignment in this sector.

For example, if the best sector was from a misalignment of $$\frac{-3pi}{4}$$

to a misalignment of $$\frac{-pi}{2},$$

this range will be further divided into 8 new candidates as provided below:

$$\Delta A^{candidate} \text{ one from } \left[ \frac{-3pi}{4} \quad \frac{-20pi}{28} \quad \frac{-19pi}{28} \quad \frac{-18pi}{28} \quad \frac{-17pi}{28} \quad \frac{-16pi}{28} \quad \frac{-15pi}{28} \quad \frac{-pi}{2} \right]$$

Then the previously described operations are repeated. Different candidate accelerations (or more literally specific forces) in the estimated sensor frame are generated and again compared to the downsampled actual sensor readings. The operation continues either until the accuracy of the solution saturates and no longer improves or until a specific pre-chosen depth of comparison is achieved. An estimate of the misalignment between the portable device heading and the platform heading is obtained as the best $\Delta A^{candidate}$ together with an indication or measure of its accuracy from the depth of divisions the technique had undergone and the step separation of the last candidate pool for the misalignment. Thus, the initial device heading (that will be used to start the full navigation in this case) is computed from the platform heading and the estimated initial misalignment.

Continued Misalignment Estimation Using Absolute Velocity Updates or During Short Absolute Velocity Interruption/Degradation The misalignment is required on a continuous basis as the user can be changing the orientation of the device continually. This method needs absolute velocity updates (can work for short interruptions in these updates).

The main idea is to determine the heading mismatch or misalignment between the device and the moving platform using velocity derived heading and the sensor derived heading. There are three possible sensor derived headings that can be used in device heading estimation. The first sensor derived heading comes from an aided or unaided mechanization solution if it is available (this method for getting heading needs the routine for initial misalignment detection described above to run first). The second option for device heading is computed by integrating the angular rate from a levelled synthetic gyroscope (this method for getting heading needs the routine for initial misalignment detection described above to run first). For the third option, if a magnetometer is present, the device heading can be obtained by the magnetometer after levelling the magnetometer triad (this method for getting heading does not need the routine for initial misalignment detection described above to run first). The device heading is then compared with the arctangent or velocity derived heading of the moving platform for the misalignment estimation. Alternatively, mechanization or levelled synthetic gyroscope derived heading (whichever is available) and magnetometer derived heading can be merged together to get a better integrated heading for the device and thus a better heading misalignment solution can be achieved.

The absolute heading for the platform is obtained using $A_k^{platform} = a\tan2(v_k^e, v_k^n)$: (i) if the absolute velocity source such as GNSS is available, or (ii) by using predicted velocity values (by the state estimation technique or the filtering technique in Example 1 or Example 2) during short absolute velocity interruption or degradation, or (iii) by using the filtered velocity values (by the state estimation technique or the filtering technique in Example 1 or Example 2) when the absolute velocity source is available. Alternatively, if a digital map is available (for example, indoor maps or street maps) the heading of the moving platform (whether a person or vehicle or any other platform) can be estimated from the map. Using the definition of misalignment presented earlier $\Delta A_k = A_k^{device} - A_k^{platform}$, the misalignment between the portable navigation capable device and the platform can be obtained independent of the absolute velocity source being interrupted or degraded.

Initial and Continued Misalignment Estimation During the Absence of Absolute Velocity Updates As mentioned earlier, the device heading can be different than the heading of the platform and to get a navigation solution for the platform with accuracy, the navigation algorithm should have the information about the misalignment to be able to apply constraints in the platform frame to enhance the navigation solution.

For example, in case the device is a smart/mobile phone, one method that can estimate an approximate misalignment is based on the common usage scenario associated with such phone based navigation. This method uses the roll and pitch information or averaged accelerometer signals to determine certain use cases and thus the approximate misalignments that are associated with them.

If a person is navigating with a smart phone, for example, the phone will be in front of the person so that the person can view the current location. In this case, there are two possibilities of misalignment. The first one is when the phone is in portrait mode with a misalignment of 0 degrees and the second is when the phone is in landscape mode with an absolute misalignment of 90 degrees (depending on the rotation of the phone clockwise or counterclockwise from the portrait mode, the misalignment will be either +90 or −90 deg). These two are the most common scenarios and the misalignment can be estimated for them on the basis of the accelerometer signals. Other common cases such as talking and on-belt mode misalignments are also incorporated based on the raw accelerometer signals or the roll and pitch values derived from the accelerometer signals. Another optional method to calculate misalignment in absence of GNSS is using classification of device motion patterns. Furthermore other sensors or detections can be used for helping this misalignment calculation, such as, proximity sensors (e.g. Infra-red, sonar, or others) and transceivers that can get Doppler shifts and thus derive velocities or detections of answering calls with speaker phone off and headphones unplugged.

These methods can be used to resolve initial misalignment even in case of absence of absolute velocity updates, provided that other heading devices are available such as, for example, magnetometer.

In addition, these methods can be used to resolve continued misalignment (i.e. the misalignments happening after the initial start of the navigation solution at any time continuously afterward) in case of absence of absolute velocity updates after the initial start. Consequently, the device heading and the platform heading can be both continuously obtained provided that: (i) other mean for obtaining device heading are available such as, for example, magnetometer, AND/OR (ii) initial misalignment was resolved (such as for example what was explained earlier in another subsection in this example), the initial platform heading is available, consequently the initial device heading, and therefore any gyroscope-based solution can then be run to get the continuous device heading.

General Benefits of Resolving Misalignment

To improve the navigation by applying constraints on the motion of the moving platform (for example in the form of specific updates), the platform heading has to be known. Since the device heading is known, the misalignment between the device and platform frame is required. If the misalignment is known the below constraints are examples of what can be implemented to constrain the navigation solution especially during long absolute velocity outages (such as GNSS signals outages).

Some example uses:
1. Nonholonomic constraints.
2. Pedestrian dead reckoning in case of walking mode.
3. Vehicular dead reckoning in case of driving mode.
4. Any other position or velocity constraint that may be applied to the platform after the resolution of the attitude.

Example 5

Backward Smoothed Solution

In this example, the present navigation module may optionally be programmed to determine a low-cost backward smoothed positioning solution, such a positioning solution might be used for different applications, for example, by mapping systems. In this example, the foregoing navigation module with nonlinear filtering technique and nonlinear models, may be further enhanced by exploiting the fact that mapping problem accepts post-processing and that nonlinear backward smoothing may be achieved. The post-processing might happen (i) after the mission (i.e. after finishing data logging and the forward navigation solution) whether on-site or any time afterward, or (ii) within the mission by having blocks of logged receiver and sensor readings as well as forward filtering results, and either run the backward smoothing (a) in a background routine or on another processor or core, or (b) during intentional stopping periods aimed especially for the purpose of running backward smoothing. In case (ii) above, the results of the backward smoothed solution may be used to benefit the future forward solution (i.e. the forward solution that will run after the background routine has finished running), for example, by having better estimates for the sensors errors and/or by starting by the future forward solution from a better state estimate.

As is known, not all the techniques that apply to KF-based smoothing apply to nonlinear smoothing. Because the state estimation technique used is nonlinear and the models are nonlinear models, the appropriate backward smoothing idea utilized in the present Example is the two filter smoothing (TFS) approach. The forward filter is the nonlinear filter that can be applied as detailed in the previous Examples. The backward filter proposed is not based on using the inverse of the system model to get the backward transition, which is commonly done in existing smoothing techniques based on TFS. Exploiting the nature of the problem at hand, which is 3D motion, the present navigation module implements the backward filter through correctly transforming mathematically all the sensor readings to have a problem of a moving platform starting at the end of the trajectory and proceeding towards the original start. Thus, another instance of the forward solution with the same equations for the system model of the filter and when applicable the same equations for mechanization can be applied to the transformed sensors data to provide the backward solution. The two filters can then be blended together to give the smoothed positioning solution.

The following is a description of the transformation applied to the readings to have a scenario of a moving platform starting at the end of the trajectory and proceeding towards the original start. GNSS position is kept the same, GNSS velocity components along North and East are negated, but the vertical component is kept the same. The optionally available platform speed readings derived from odometer or wheel encoders or any other source are kept the same. If velocity readings are available instead of speed, the horizontal components are negated in a similar manner as GNSS velocity. To transform the accelerometers' readings, first the gravity components are removed from the readings, also the parts measured due to earth rotation rate are removed, then the accelerometer readings are negated, then the removed components are added once again. To transform the gyroscopes' readings, the components measured due to earth rotation rate are removed, then the gyroscope readings are negated, then the removed components are added once again. If present, the barometer readings are kept the same. Furthermore, if magnetometer readings are available, the azimuth angle derived from the magnetometer readings is transformed by adding 180 degrees to it. These newly transformed readings are applied to another instance of the program implementing the same forward filter and models, thereby providing a backward filter solution. The backward filter benefits from the information available for the forward filter and then the two solutions are subsequently blended together.

One benefit of the smoothed solution provided herein is during GNSS outages where the positioning error grows. Since the backward filter can make use of all the advantages of the forward filter, the final smoothed solution can improve the forward solution alone and the performance of this low-cost solution is closer to that of higher cost and higher grade inertial sensors.

APPENDICES

Appendix 1—Some Equations from Example 1:

$$R_{b,k-1}^{l,Mech} = \begin{bmatrix} \cos A_{k-1}^{Mech}\cos r_{k-1}^{Mech} + \sin A_{k-1}^{Mech}\sin p_{k-1}^{Mech}\sin r_{k-1}^{Mech} & \sin A_{k-1}^{Mech}\cos p_{k-1}^{Mech} & \cos A_{k-1}^{Mech}\sin r_{k-1}^{Mech} - \sin A_{k-1}^{Mech}\sin p_{k-1}^{Mech}\cos r_{k-1}^{Mech} \\ -\sin A_{k-1}^{Mech}\cos r_{k-1}^{Mech} + \cos A_{k-1}^{Mech}\sin p_{k-1}^{Mech}\sin r_{k-1}^{Mech} & \cos A_{k-1}^{Mech}\cos p_{k-1}^{Mech} & -\sin A_{k-1}^{Mech}\sin r_{k-1}^{Mech} - \cos A_{k-1}^{Mech}\sin p_{k-1}^{Mech}\cos r_{k-1}^{Mech} \\ -\cos p_{k-1}^{Mech}\sin r_{k-1}^{Mech} & \sin p_{k-1}^{Mech} & \cos p_{k-1}^{Mech}\cos r_{k-1}^{Mech} \end{bmatrix} \quad (1)$$

$$\begin{bmatrix} v_k^{E,Mech} \\ v_k^{N,Mech} \\ v_k^{Up,Mech} \end{bmatrix} = \begin{bmatrix} v_{k-1}^{E,Mech} \\ v_{k-1}^{N,Mech} \\ v_{k-1}^{Up,Mech} \end{bmatrix} + R_{b,k}^{l,Mech}\begin{bmatrix} f_{k-1}^x \\ f_{k-1}^y \\ f_{k-1}^z \end{bmatrix}\Delta t + \begin{bmatrix} 0 \\ 0 \\ -g_{k-1}^{Mech} \end{bmatrix} + $$

$$\Delta t - \begin{bmatrix} 0 & -2\omega^e \sin\varphi_{k-1}^{Mech} - \dfrac{v_{k-1}^{E,Mech}\tan\varphi_{k-1}^{Mech}}{R_{N,k-1}^{Mech} + h_{k-1}^{Mech}} & 2\omega^e\cos\varphi_{k-1}^{Mech} + \dfrac{v_{k-1}^{E,Mech}}{R_{N,k-1}^{Mech} + h_{k-1}^{Mech}} \\ 2\omega^e\sin\varphi_{k-1}^{Mech} + \dfrac{v_{k-1}^{E,Mech}\tan\varphi_{k-1}^{Mech}}{R_{N,k-1}^{Mech} + h_{k-1}^{Mech}} & 0 & \dfrac{v_{k-1}^{N,Mech}}{R_{M,k-1}^{Mech} + h_{k-1}^{Mech}} \\ -2\omega^e\cos\varphi_{k-1}^{Mech} - \dfrac{v_{k-1}^{E,Mech}}{R_{N,k-1}^{Mech} + h_{k-1}^{Mech}} & \dfrac{-v_{k-1}^{N,Mech}}{R_{M,k-1}^{Mech} + h_{k-1}^{Mech}} & 0 \end{bmatrix}\begin{bmatrix} v_{k-1}^{E,Mech} \\ v_{k-1}^{N,Mech} \\ v_{k-1}^{Up,Mech} \end{bmatrix}\Delta t \quad (2)$$

Appendix 2—Some Equations from Example 2:

$$\begin{bmatrix} v_k^{E,Mech} \\ v_k^{N,Mech} \\ v_k^{Up,Mech} \end{bmatrix} = \begin{bmatrix} v_{k-1}^{E,Mech} \\ v_{k-1}^{N,Mech} \\ v_{k-1}^{Up,Mech} \end{bmatrix} + R_{b,k}^{l,Mech}\begin{bmatrix} f_{k-1}^x \\ f_{k-1}^y \\ f_{k-1}^z \end{bmatrix}\Delta t + \begin{bmatrix} 0 \\ 0 \\ -g_k^{Mech} \end{bmatrix}$$

$$\Delta t - \begin{bmatrix} 0 & -2\omega^e\sin\varphi_k^{Mech} - \dfrac{v_k^{E,Mech}\tan\varphi_k^{Mech}}{R_{N,k}^{Mech} + h_k^{Mech}} & 2\omega^e\cos\varphi_k^{Mech} + \dfrac{v_k^{E,Mech}}{R_{N,k}^{Mech} + h_k^{Mech}} \\ 2\omega^e\sin\varphi_k^{Mech} + \dfrac{v_k^{E,Mech}\tan\varphi_k^{Mech}}{R_{N,k}^{Mech} + h_k^{Mech}} & 0 & \dfrac{v_k^{N,Mech}}{R_{M,k}^{Mech} + h_k^{Mech}} \\ -2\omega^e\cos\varphi_k^{Mech} - \dfrac{v_k^{E,Mech}}{R_{N,k}^{Mech} + h_k^{Mech}} & \dfrac{-v_k^{N,Mech}}{R_{M,k}^{Mech} + h_k^{Mech}} & 0 \end{bmatrix}\begin{bmatrix} v_{k-1}^{E,Mech} \\ v_{k-1}^{N,Mech} \\ v_{k-1}^{Up,Mech} \end{bmatrix}\Delta t \quad (1)$$

$$R_{b,k}^{l,Mech}\begin{bmatrix} f_{k-1}^x \\ f_{k-1}^y \\ f_{k-1}^z \end{bmatrix} = \left\{ \dfrac{1}{\Delta t}\left(\begin{bmatrix} v_k^{E,Mech} \\ v_k^{N,Mech} \\ v_k^{Up,Mech} \end{bmatrix} - \begin{bmatrix} v_{k-1}^{E,Mech} \\ v_{k-1}^{N,Mech} \\ v_{k-1}^{Up,Mech} \end{bmatrix}\right) - \begin{bmatrix} 0 \\ 0 \\ -g_k^{Mech} \end{bmatrix} + \right.$$

$$\left.\begin{bmatrix} 0 & -2\omega^e\sin\varphi_k^{Mech} - \dfrac{v_k^{E,Mech}\tan\varphi_k^{Mech}}{R_{N,k}^{Mech} + h_k^{Mech}} & 2\omega^e\cos\varphi_k^{Mech} + \dfrac{v_k^{E,Mech}}{R_{N,k}^{Mech} + h_k^{Mech}} \\ 2\omega^e\sin\varphi_k^{Mech} + \dfrac{v_k^{E,Mech}\tan\varphi_k^{Mech}}{R_{N,k}^{Mech} + h_k^{Mech}} & 0 & \dfrac{v_k^{N,Mech}}{R_{M,k}^{Mech} + h_k^{Mech}} \\ -2\omega^e\cos\varphi_k^{Mech} - \dfrac{v_k^{E,Mech}}{R_{N,k}^{Mech} + h_k^{Mech}} & \dfrac{-v_k^{N,Mech}}{R_{M,k}^{Mech} + h_k^{Mech}} & 0 \end{bmatrix}\begin{bmatrix} v_{k-1}^{E,GPS} \\ v_{k-1}^{N,GPS} \\ v_{k-1}^{Up,GPS} \end{bmatrix}\right\} \quad (2)$$

$$\begin{bmatrix} v_k^{E,GPS} \\ v_k^{N,GPS} \\ v_k^{Up,GPS} \end{bmatrix} = \begin{bmatrix} v_{k-1}^{E,GPS} \\ v_{k-1}^{N,GPS} \\ v_{k-1}^{Up,GPS} \end{bmatrix} + R_{b,k}^{l,Corrected} \begin{bmatrix} f_{k-1}^{x,Corrected} \\ f_{k-1}^{y,Corrected} \\ f_{k-1}^{z,Corrected} \end{bmatrix} \Delta t + \begin{bmatrix} 0 \\ 0 \\ -g_k^{GPS} \end{bmatrix} \quad (3)$$

$$\Delta t - \begin{bmatrix} 0 & -2\omega^e \sin\varphi_k^{GPS} - \dfrac{v_k^{E,GPS}\tan\varphi_k^{GPS}}{R_{N,k}^{GPS}+h_k^{GPS}} & 2\omega^e \cos\varphi_k^{GPS} + \dfrac{v_k^{E,GPS}}{R_{N,k}^{GPS}+h_k^{GPS}} \\ 2\omega^e \sin\varphi_k^{GPS} + \dfrac{v_k^{E,GPS}\tan\varphi_k^{GPS}}{R_{N,k}^{GPS}+h_k^{GPS}} & 0 & \dfrac{v_k^{N,GPS}}{R_{M,k}^{GPS}+h_k^{GPS}} \\ -2\omega^e \cos\varphi_k^{GPS} - \dfrac{v_k^{E,GPS}}{R_{N,k}^{GPS}+h_k^{GPS}} & \dfrac{-v_k^{N,GPS}}{R_{M,k}^{GPS}+h_k^{GPS}} & 0 \end{bmatrix}$$

$$\begin{bmatrix} v_{k-1}^{E,GPS} \\ v_{k-1}^{N,GPS} \\ v_{k-1}^{Up,GPS} \end{bmatrix} \Delta t$$

$$R_{b,k}^{l,Corrected}\begin{bmatrix} f_{k-1}^{x,Corrected} \\ f_{k-1}^{y,Corrected} \\ f_{k-1}^{z,Corrected} \end{bmatrix} = \left\{ \dfrac{1}{\Delta t}\left(\begin{bmatrix} v_k^{E,GPS} \\ v_k^{N,GPS} \\ v_k^{Up,GPS} \end{bmatrix} - \begin{bmatrix} v_{k-1}^{E,GPS} \\ v_{k-1}^{N,GPS} \\ v_{k-1}^{Up,GPS} \end{bmatrix}\right) - \begin{bmatrix} 0 \\ 0 \\ -g_k^{GPS} \end{bmatrix} + \right. \quad (4)$$

$$\begin{bmatrix} 0 & -2\omega^e \sin\varphi_k^{GPS} - \dfrac{v_k^{E,GPS}\tan\varphi_k^{GPS}}{R_{N,k}^{GPS}+h_k^{GPS}} & 2\omega^e \cos\varphi_k^{GPS} + \dfrac{v_k^{E,GPS}}{R_{N,k}^{GPS}+h_k^{GPS}} \\ 2\omega^e \sin\varphi_k^{GPS} + \dfrac{v_k^{E,GPS}\tan\varphi_k^{GPS}}{R_{N,k}^{GPS}+h_k^{GPS}} & 0 & \dfrac{v_k^{N,GPS}}{R_{M,k}^{GPS}+h_k^{GPS}} \\ -2\omega^e \cos\varphi_k^{GPS} - \dfrac{v_k^{E,GPS}}{R_{N,k}^{GPS}+h_k^{GPS}} & \dfrac{-v_k^{N,GPS}}{R_{M,k}^{GPS}+h_k^{GPS}} & 0 \end{bmatrix}$$

$$\left.\begin{bmatrix} v_{k-1}^{E,GPS} \\ v_{k-1}^{N,GPS} \\ v_{k-1}^{Up,GPS} \end{bmatrix}\right\} = R_{b,k}^{l,Corrected}\left(\begin{bmatrix} f_{k-1}^{x} \\ f_{k-1}^{y} \\ f_{k-1}^{z} \end{bmatrix} - \begin{bmatrix} z_k^{\delta f^x} \\ z_k^{\delta f^y} \\ z_k^{\delta f^z} \end{bmatrix}\right)$$

$$\begin{bmatrix} z_k^{\delta f^x} \\ z_k^{\delta f^y} \\ z_k^{\delta f^z} \end{bmatrix} = \left(R_{b,k}^{l,Corrected}\right)^T \quad (5)$$

$$\left(\dfrac{1}{\Delta t}\left\{\left(\begin{bmatrix} v_k^{E,Mech} \\ v_k^{N,Mech} \\ v_k^{Up,Mech} \end{bmatrix} - \begin{bmatrix} v_{k-1}^{E,Mech} \\ v_{k-1}^{N,Mech} \\ v_{k-1}^{Up,Mech} \end{bmatrix}\right) - \left(\begin{bmatrix} v_k^{E,GPS} \\ v_k^{N,GPS} \\ v_k^{Up,GPS} \end{bmatrix} - \begin{bmatrix} v_{k-1}^{E,GPS} \\ v_{k-1}^{N,GPS} \\ v_{k-1}^{Up,GPS} \end{bmatrix}\right)\right\} + \right.$$

$$\begin{bmatrix} 0 & -2\omega^e \sin\varphi_k^{Mech} - \dfrac{v_k^{E,Mech}\tan\varphi_k^{Mech}}{R_{N,k}^{Mech}+h_k^{Mech}} & 2\omega^e \cos\varphi_k^{Mech} + \dfrac{v_k^{E,Mech}}{R_{N,k}^{Mech}+h_k^{Mech}} \\ 2\omega^e \sin\varphi_k^{Mech} + \dfrac{v_k^{E,Mech}\tan\varphi_k^{Mech}}{R_{N,k}^{Mech}+h_k^{Mech}} & 0 & \dfrac{v_k^{N,Mech}}{R_{M,k}^{Mech}+h_k^{Mech}} \\ -2\omega^e \cos\varphi_k^{Mech} - \dfrac{v_k^{E,Mech}}{R_{N,k}^{Mech}+h_k^{Mech}} & \dfrac{-v_k^{N,Mech}}{R_{M,k}^{Mech}+h_k^{Mech}} & 0 \end{bmatrix}$$

$$\begin{bmatrix} v_{k-1}^{E,Mech} \\ v_{k-1}^{N,Mech} \\ v_{k-1}^{Up,Mech} \end{bmatrix} -$$

$$\begin{bmatrix} 0 & -2\omega^e \sin\varphi_k^{GPS} - \dfrac{v_k^{E,GPS}\tan\varphi_k^{GPS}}{R_{N,k}^{GPS}+h_k^{GPS}} & 2\omega^e \cos\varphi_k^{GPS} + \dfrac{v_k^{E,GPS}}{R_{N,k}^{GPS}+h_k^{GPS}} \\ 2\omega^e \sin\varphi_k^{GPS} + \dfrac{v_k^{E,GPS}\tan\varphi_k^{GPS}}{R_{N,k}^{GPS}+h_k^{GPS}} & 0 & \dfrac{v_k^{N,GPS}}{R_{M,k}^{GPS}+h_k^{GPS}} \\ -2\omega^e \cos\varphi_k^{GPS} - \dfrac{v_k^{E,GPS}}{R_{N,k}^{GPS}+h_k^{GPS}} & \dfrac{-v_k^{N,GPS}}{R_{M,k}^{GPS}+h_k^{GPS}} & 0 \end{bmatrix}$$

$$\begin{bmatrix} v_{k-1}^{E,GPS} \\ v_{k-1}^{N,GPS} \\ v_{k-1}^{Up,GPS} \end{bmatrix} - \begin{bmatrix} 0 \\ 0 \\ -g_k^{Mech} \end{bmatrix} + \begin{bmatrix} 0 \\ 0 \\ -g_k^{GPS} \end{bmatrix} -$$

$$\left.\left(R_{b,k}^{l,Mech} - R_{b,k}^{l,Corrected}\right)\begin{bmatrix} f_{k-1}^{x} \\ f_{k-1}^{y} \\ f_{k-1}^{z} \end{bmatrix}\right)$$

Appendix 3—Some Equations from Example 4

$$R^l_{device,k} = \begin{bmatrix} \cos A_k^{device}\cos r_k^{device} + & & \cos A_k^{device}\sin r_k^{device} - \\ \sin A_k^{device}\sin p_k^{device} & \sin A_k^{device}\cos p_k^{device} & \sin A_k^{device}\sin p_k^{device} \\ \sin r_k^{device} & & \cos r_k^{device} \\ -\sin A_k^{device}\cos r_k^{device} + & & -\sin A_k^{device}\sin r_k^{device} - \\ \cos A_k^{device}\sin p_k^{device} & \cos A_k^{device}\sin p_k^{device} & \cos A_k^{device}\sin p_k^{device} \\ \sin r_k^{device} & & \cos r_k^{device} \\ -\cos p_k^{device}\sin r_k^{device} & \sin p_k^{device} & \cos p_k^{device}\cos r_k^{device} \end{bmatrix} \quad (1)$$

The embodiments in which an exclusive property or privilege is claimed are defined as follows:

1. A navigation module, for providing an integrated navigation solution for a device within a moving platform, the module comprising:
   a receiver for receiving absolute navigational information about the device from an external source, and producing an output of navigational information indicative thereof,
   an assembly of self-contained sensors comprising at least three accelerometers and at least three gyroscopes and capable of obtaining readings relating to navigational information about the device and producing an output indicative thereof, wherein said sensor readings may contain sensor errors, and
   at least one processor, coupled to receive and integrate the output information from the receiver and the sensor assembly, operative to produce a navigation solution for the device, wherein the navigation solution consists of estimated position, velocity and attitude, and programmed to:
      utilize a nonlinear error-state model, wherein the error-state model is without approximation, to reduce errors in the estimated position, velocity and attitude, whereby the processor predicts the errors in the position, velocity and attitude, and the sensor errors, and utilizes the nonlinear error-state model to relate: a) the errors in the estimated position and velocity, and b) the errors in the estimated attitude and the sensor errors;
      utilize the output information from the receiver to improve the estimation of the errors in the position and velocity, and whereby the relation of a) and b) indirectly improves the estimation of the errors in the attitude and sensor errors, wherein the device may be tethered or non-tethered to the moving platform; and
      produce a navigation solution compensated by the nonlinear error-state model.

2. A navigation module, for providing an integrated navigation solution for a device within a moving platform, the module comprising:
   a receiver for receiving absolute navigational information about the device from an external source, and producing an output of navigational information indicative thereof,
   an assembly of self-contained sensors comprising at least three accelerometers and at least three gyroscopes and capable of obtaining readings relating to navigational information about the device and producing an output indicative thereof, wherein said sensor readings may contain sensor errors from the at least three accelerometers and the at least three gyroscopes, and
   at least one processor, coupled to receive and integrate the output information from the receiver and the sensor assembly, operative to produce a navigation solution for the device, the navigation solution consisting of estimated position, velocity and attitude, and programmed to utilize a nonlinear total-state model and updates for at least the errors from the at least three accelerometers and the errors from the at least three gyroscopes, wherein the updates are derived from the output information from the receiver, wherein the device may be tethered or non-tethered within the moving platform, and wherein the navigation solution is output by the nonlinear total-state model.

3. The navigation module in claim 1 or 2, wherein the receiver for receiving absolute navigational information is a GNSS receiver.

4. The navigation module in claim 3, wherein the GNSS receiver is a Global Positioning System receiver.

5. The navigation module in claim 1 or 2, wherein the at least one processor is programmed to use a state estimation technique.

6. The navigation module in claim 5, wherein the state estimation technique is non-linear.

7. The navigation module in claim 6, wherein the state estimation technique is a Particle Filter.

8. The navigation module in claim 6, wherein the state estimation technique is a Mixture Particle Filter.

9. The navigation module in anyone of claims 5 to 8, wherein the state estimation technique uses a system and measurement model.

10. The navigation module in claim 1 or 2, wherein the moving platform is a vehicle, a vessel or a person.

11. The navigation module in claim 1 or 2, wherein the processor has an additional means for obtaining speed information about the platform using a wired or wireless connection to the module.

12. The navigation module in claim 1 or 2, wherein the navigation solution is determined via an algorithm comprising a loosely coupled integration scheme, or a tightly coupled integration scheme.

13. The navigation module in claim 1 or 2, wherein the absolute navigational information is degraded or denied.

14. The navigation module in anyone of claim 1 or 2, wherein the at least one processor is further programmed to either: (a) use an algorithm capable of modeling the errors in the sensor readings, (b) use an algorithm capable of modeling advanced models of the errors in the sensor readings, (c) use an algorithm capable of modeling advanced models of the errors in the sensor readings, such that the advanced model of the errors in the sensor readings are non-linear or linear models with increased memory length, or (d) anyone of (a), (b), or (c) wherein the at least one processor is further programmed to provide additional measurement updates for the errors in the sensor readings.

15. The navigation module in anyone of claim 1 or 2, wherein the at least one processor is further programmed to either: (a) automatically assess the output of absolute navigational information and detect degradation or denial of the information, (b) automatically switch between a loosely coupled integration scheme and a tightly coupled integration scheme, (c) automatically assess the measurements from each external source visible to the receiver and detect degraded measurements, when in tightly coupled integration scheme, (d) perform (a) and (b), (e) perform (b) and (c), or (f) perform (a), (b) and (c).

16. The navigation module in anyone of claim 1 or 2, wherein the at least one processor is further programmed to calculate misalignment between the sensor assembly and the platform.

17. The navigation module in anyone of claim 1 or 2, wherein the at least one processor is further programmed to perform a mode detection routine to detect the mode of conveyance.

18. The navigation module in anyone of claim 1 or 2, wherein the at least one processor is further programmed to calculate pitch and roll values from the output of the at least three accelerometers, and to use the pitch and roll values as measurement updates.

19. The navigation module in claim 17 or 18, wherein the calculated pitch and roll values are dependent on the detected mode of conveyance.

20. The navigation module in claim 17, wherein the detected mode of conveyance is walking mode and wherein the at least one processor is further programmed to perform pedestrian dead-reckoning and to use the positioning results as a measurement update for the navigation solution.

21. The navigation module in anyone of claim 1 or 2 wherein the at least one processor is further programmed to perform one of: (a) static period detection, or (b) static period detection and use zero velocity updates as a measurement update.

22. The navigation module in anyone of claim 1 or 2, wherein the at least one processor is further programmed to utilize motion constraints on the moving platform.

23. The navigation module in claim 22, wherein the motion constraints on the moving platform are non-holonomic constraints.

24. The navigation module in anyone of claim 1, 2, 20 or 23, wherein the at least one processor is further programmed to perform a backward smoothed solution subsequent to the navigation solution and blend the two solutions to provide an enhanced solution.

25. A method for determining an integrated navigation solution for a device within a moving platform, wherein the device may be tethered or non-tethered to the moving platform, the method comprising the steps of:
   a) receiving absolute navigational information about the device from an external source and producing output readings indicative thereof;
   b) obtaining readings relating to navigational information about the device, at a self-contained sensor assembly comprising at least three accelerometers and at least three gyroscopes, and producing an output indicative thereof, wherein said readings may contain sensor errors; and
   c) providing at least one processor that:
      is capable of processing and filtering the absolute navigational information and sensor readings,
      is operative to produce a navigation solution for the device, wherein the navigation solution consists of estimated position, velocity and attitude,
      is programmed to utilize a nonlinear error-state model, wherein the error-state model is without approximation, to reduce errors in the estimated position, velocity and attitude, and predicts the errors in the estimated position, velocity and attitude and the sensor errors and utilizes the nonlinear error-state model to relate: a) the estimated errors in the position and velocity, and b) the estimated errors in the attitude errors and the sensor errors, wherein the output information from the receiver is utilized to improve the estimation of the errors in the position and velocity, whereby the relation of a) and b) indirectly improves the estimation of the errors in the attitude and sensor errors, and
      produces a navigation solution compensated by the nonlinear error-state model.

26. A method for determining an integrated navigation solution for a device within a moving platform, wherein the device may be tethered or non-tethered to the moving platform, the method comprising the steps of:
   a) receiving absolute navigational information about the device from an external source and producing output readings indicative thereof;
   b) obtaining readings relating to navigational information about the device, at a self-contained sensor assembly comprising at least three accelerometers and at least three gyroscopes, and producing an output indicative thereof, wherein said readings may contain sensor errors; and
   c) providing at least one processor that: is capable of processing and filtering the absolute navigational information and sensor readings, operative to produce a navigation solution for the device, wherein the navigation solution consists of estimated position, velocity and attitude, and is programmed to utilize a nonlinear total-state model and updates for at least the errors of the at least three accelerometers and the errors of the at least three gyroscopes, wherein the updates are derived from the received absolute navigational information, and wherein the navigation solution is output by the nonlinear total-state model.

27. The navigation module in claim 1 or 2, wherein the at least one processor is further programmed to perform any combination of operations from the group consisting of:
   a) determine the navigation solution via an algorithm comprising a loosely coupled integration scheme or a tightly coupled integration scheme;
   b)(i) use an algorithm capable of modeling the errors in the sensor readings, (ii) use an algorithm capable of modeling advanced models of the errors in the sensor readings, (iii) use an algorithm capable of modeling advanced models of the errors in the sensor readings, such that the advanced model of the errors in the sensor readings are non-linear or linear models with increased memory length, or (iv) anyone of (i), (ii), or (iii) wherein the at least one processor is further programmed to provide additional measurement updates for the errors in the sensor readings;
   c)(i) automatically assess the output of absolute navigational information and detect degradation or denial of the information, (ii) automatically switch between a loosely coupled integration scheme and a tightly coupled integration scheme, (iii) automatically assess the measurements from each external source visible to the receiver and detect degraded measurements, when in tightly coupled integration scheme, (iv) perform (i) and (ii), (v) perform (ii) and (iii), or (vi) perform (i), (ii) and (iii);
   d) calculate misalignment between the sensor assembly and the platform;
   e) detect the mode of conveyance using a mode detection routine;
   f) calculate pitch and roll values from the output of the at least three accelerometers, and to use the pitch and roll values as measurement updates;
   g) calculate pitch and roll values from the output of the at least three accelerometers, and to use the pitch and roll values as measurement updates, wherein the calculated pitch and roll values are dependent on a detected mode of conveyance;

h) detect the mode of conveyance using a mode detection routine, wherein the detected mode of conveyance is walking mode, wherein the at least one processor is further programmed to perform pedestrian dead-reckoning and to use the positioning results as a measurement update for the navigation solution;

i) detect static periods;

j) detect static periods and use zero velocity updates as a measurement update;

l) utilize motion constraints on the moving platform;

k) utilize motion constraints comprising non-holonomic constraints on the moving platform; and m) perform a backward smoothed solution subsequent to the navigation solution and blend the two solutions to provide an enhanced solution.

* * * * *